United States Patent
Agee

(10) Patent No.: US 10,812,955 B2
(45) Date of Patent: Oct. 20, 2020

(54) GENERATION OF SIGNALS WITH UNPREDICTABLE TRANSMISSION PROPERTIES FOR WIRELESS M2M NETWORKS

(71) Applicant: Brian G Agee, San Jose, CA (US)

(72) Inventor: Brian G Agee, San Jose, CA (US)

(*) Notice: Subject to any disclaimer, the term of this patent is extended or adjusted under 35 U.S.C. 154(b) by 0 days.

(21) Appl. No.: 16/160,764

(22) Filed: Oct. 15, 2018

(65) Prior Publication Data

US 2019/0320303 A1   Oct. 17, 2019

Related U.S. Application Data

(63) Continuation of application No. 15/246,121, filed on Aug. 24, 2016, now Pat. No. 10,154,397, which is a
(Continued)

(51) Int. Cl.
*H04B 1/00* (2006.01)
*H04W 4/70* (2018.01)
(Continued)

(52) U.S. Cl.
CPC .............. *H04W 4/70* (2018.02); *H04B 1/692* (2013.01); *H04B 1/7103* (2013.01);
(Continued)

(58) Field of Classification Search
CPC ....... H04W 4/70; H04B 1/692; H04B 1/7103; H04B 1/7156; H04B 2001/7154; H04J 13/0007
(Continued)

(56) References Cited

U.S. PATENT DOCUMENTS 5,260,968 A   11/1993   Gardner et al.
5,343,496 A    8/1994   Honig et al.
(Continued)

FOREIGN PATENT DOCUMENTS

GB   2491835   12/2012
GB   2491836   12/2012
(Continued)

OTHER PUBLICATIONS

A. Roessler, et al.; "LTE-Advanced (3GPP Rel.11) Technology Introduction"; Rohde&Schwarz, 7.2013-1MA232_1E.
(Continued)

*Primary Examiner* — Helene E Tayong
(74) *Attorney, Agent, or Firm* — Steven J Shattil

(57) ABSTRACT

Signals with unpredictable transmission properties enabling physically secure, unscheduled and interference-resistant machine-to-machine (M2M) communication are described. A physical dwell structure containing time slots and frequency channels is established, and a combination of unpredictable physical dwells, spread spectrum modulation with unpredictable spreading vectors, and unpredictable selection of intended receivers is described. These unpredictable transmission properties enable receivers to detect and extract transmissions intended for the receiver, and excise transmissions not intended for the receiver, even if they are received at much higher power levels than the intended transmissions. The system eliminates the ability for an adversary to predict and override M2M transmissions; allows reception of ad-hoc transmissions in dense environments without scheduling, carrier-sense multiple access with collision avoidance (CSMA/CA) protocols, or scheduling feedback paths; and allows macrodiverse reception of transmissions at networks of connected receivers, thereby providing addi-
(Continued)

tional efficiency and security improvements exploiting route diversity of the network.

20 Claims, 37 Drawing Sheets

Related U.S. Application Data continuation of application No. 13/999,040, filed on Jan. 6, 2014, now Pat. No. 9,648,444.

(60) Provisional application No. 61/849,745, filed on Feb. 1, 2013, provisional application No. 61/848,463, filed on Jan. 5, 2013.

(51) Int. Cl.
*H04J 13/00* (2011.01)
*H04B 1/7103* (2011.01)
*H04B 1/7156* (2011.01)
*H04B 1/692* (2011.01)
*H04B 1/715* (2011.01)

(52) U.S. Cl.
CPC ........ *H04B 1/7156* (2013.01); *H04J 13/0007* (2013.01); *H04B 2001/7154* (2013.01)

(58) Field of Classification Search
USPC ........................................................ 375/133
See application file for complete search history.

(56) References Cited

U.S. PATENT DOCUMENTS

| | | | |
|---|---|---|---|
| 5,692,006 A | 11/1997 | Ross | |
| 5,848,105 A | 12/1998 | Gardner et al. | |
| 6,175,587 B1 | 1/2001 | Madhow et al. | |
| 6,175,588 B1 | 1/2001 | Visotsky et al. | |
| 6,426,973 B1 | 7/2002 | Madhow et al. | |
| 6,616,035 B2 | 9/2003 | Ehrensvard et al. | |
| 6,621,851 B1 | 9/2003 | Agee et al. | |
| 6,658,047 B1 | 12/2003 | Komulainen et al. | |
| 6,771,690 B2 | 8/2004 | Heikkila | |
| 6,975,666 B2 | 12/2005 | Affes et al. | |
| 7,050,490 B2 | 5/2006 | Chi et al. | |
| 7,079,480 B2 | 7/2006 | Agee | |
| 7,099,372 B2 | 8/2006 | Niecyporowioz et al. | |
| 7,126,982 B1 | 10/2006 | Barham et al. | |
| 7,130,333 B2 | 10/2006 | Gibson, Jr. et al. | |
| 7,161,927 B2 | 1/2007 | Wu et al. | |
| 7,248,841 B2 | 7/2007 | Agee et al. | |
| 7,301,985 B1 | 11/2007 | Hall et al. | |
| 7,313,164 B1 | 12/2007 | Wilson et al. | |
| 7,321,564 B2 | 1/2008 | Ikram et al. | |
| 7,336,930 B2 | 1/2008 | Larsson et al. | |
| 7,443,909 B2 | 10/2008 | Nguyen et al. | |
| 7,453,855 B1 | 11/2008 | Madhow | |
| 7,483,480 B2 | 1/2009 | Guo et al. | |
| 7,492,815 B2 | 2/2009 | Guo et al. | |
| 7,539,239 B2 | 5/2009 | Barham | |
| 7,701,999 B1 | 4/2010 | Schlegel et al. | |
| 7,706,477 B2 | 4/2010 | Larsson | |
| 7,764,747 B2 | 7/2010 | Ionescu | |
| 7,876,845 B2 | 1/2011 | Karabinis | |
| 7,978,747 B1 | 7/2011 | Harris et al. | |
| 8,036,255 B1 | 10/2011 | Harris et al. | |
| 8,036,601 B2 | 10/2011 | Prasad et al. | |
| 8,050,337 B2 | 11/2011 | Karabinis | |
| 8,059,610 B2 | 11/2011 | Li et al. | |
| 8,130,693 B2 | 3/2012 | Miller et al. | |
| 8,144,668 B1 | 3/2012 | Madhow | |
| 8,290,074 B2 | 10/2012 | Annavajjala et al. | |
| 8,345,693 B1 | 1/2013 | Kim | |
| 8,345,733 B2 | 1/2013 | Ghosh | |
| 8,358,613 B1 | 1/2013 | Giallorenzi et al. | |
| 8,412,129 B2 | 4/2013 | Himayat et al. | |
| 8,666,368 B2 | 3/2014 | Schell et al. | |
| 8,670,493 B2 | 3/2014 | Karabinis | |
| 8,806,586 B2 | 8/2014 | Ehrensvard et al. | |
| 8,811,502 B2 | 8/2014 | Karabinis | |
| 8,943,580 B2 | 1/2015 | Fadell et al. | |
| 9,122,860 B2 | 9/2015 | Ehrensvard et al. | |
| 2006/0281476 A1* | 12/2006 | Lane ..................... H04B 7/2125 455/502 |
| 2006/0285481 A1* | 12/2006 | Lane ..................... G06Q 50/22 370/208 |
| 2008/0194211 A1* | 8/2008 | Suehiro .................. H04J 13/10 455/75 |
| 2008/0291972 A1 | 11/2008 | Chin Po Shin et al. | |
| 2010/0182989 A1 | 7/2010 | Ramesh et al. | |
| 2011/0134841 A1 | 6/2011 | Shaheen | |
| 2011/0970984 | 11/2011 | Park | |
| 2011/0306318 A1 | 12/2011 | Rodgers et al. | |
| 2012/0230178 A1 | 9/2012 | Wang et al. | |
| 2012/0231828 A1 | 9/2012 | Wang et al. | |
| 2014/0056221 A1 | 2/2014 | Lt et al. | |

FOREIGN PATENT DOCUMENTS

| | | |
|---|---|---|
| GB | 2491840 | 12/2012 |
| WO | 2012171867 | 12/2012 |

OTHER PUBLICATIONS

"Part 11: Wireless LAN Medium Access Control (MAC) and Physical Layer (PHY) Specifications"; IEEE Std 802.11™-2012; IEEE Std 802.11-2007; IEEE, Mar. 29, 2012; ISBN 978-0-7381-7245-3 STDPD97218.
S.M. Sajjad, et al.; "Security Analysis of IEEE 802.15.4 MAC in the context of Internet of Things (IoT)"; 2014 Conf. on Information Assurance and Cyber Security (CIACS); Jun. 12-13, 2014.
"IEEE Std 802.15.4: IEEE Standard for Local and metropolitan area networks—Part 15.4: Low-Rate Wireless Personal Area Networks (LR-WPANs)"; IEEE, Sep. 5, 2011; ISBN 978-0/7381-6684-1 STDPD97126.
"IEEE Std 802.155: Part 15.5: Mesh Topology Capability in Wireless Personal Area Networks (WPANs)"; IEEE, May 8, 2009; ISBN 978-0-7381-5918-8 STDPD9591.
"IEEE Std 802.15.6: IEEE Standard for Local and metropolitan area networks Part 15.6: Wireless Body Area Networks"; IEEE, Feb. 29, 2012; ISBN 978-0-7381-7206-4 STD97213.
"IEEE Std 802.15.7: IEEE Standard for Local and metropolitan area networks—Part 15.7: Short-Range Wireless Optical Communication Using Visible Light"; IEEE, Sep. 6, 2011; ISBN 978-0-7381-6665-0 STD97117.
"IEEE Std 802.16: IEEE Standard for Local and metropolitan area networks Part 16: Air Interface for Broadband Wireless Access Systems"; IEEE May 29, 2009; ISBN 978-0-7381-5919-5 STD95914.
"Specification of the Bluetooth System"; Version 4.1, vol. 0; Dec. 3, 2013.
"ISO/IEC International Standard: Information technology—Telecommunications and information exchange between systems—Near Field Communication—Interface and Protocol (NFCIP-1)"; 2013, ISO/IEC 18092:2013(E).
ECMA International; "Standard ECMA-368: High Rate Ultra Wideband PHY and MAC Standard"; 3rd Edition / Dec. 2008.
B.G. AGEE; "802.11 Overview"; May 14, 2008.
G.M. Dillard, et al.; "Cyclic Code Shift Keying: A Low Probability of Intercept Communication Technique"; IEEE Transactions on Aerospace and Electronic Systems (vol. 39 , Issue: 3 , Jul. 2003); pp. 786-798.
R. Kempter, et al.; "On coverage and routing in wireless ad hoc networks"; IEEE Signal Processing Magazine (vol. 23 , Issue: 5 , Sep. 2006); pp. 50-62.
K. Stamatiou, et al.; "Channel Diversity in Random Wireless Networks"; IEEE Transactions on Wireless Communications (vol. 9, Issue: 7 , Jul. 2010); pp. 2280-2289.

(56) References Cited

OTHER PUBLICATIONS

Agarwal, et. al., Optimal Bandwidth Allocation to Coding and Spreading in DS-CDMA Systems Using LMMSE Front-End Detector, IEEE Trans. Wireless Comms., vol. 4, No. 6, Nov. 2005, pp. 2636-2641.

Agee, The Property-Restoral Approach to Blind Adaptive Signal Extraction, Ph.D. Dissertation, Jun. 1989, Davis, CA.

Agee, et. al., Spectral Self-Coherence Restoral: A New Approach to Blind Adaptive Signal Extraction Using Antenna Arrays, Proc. IEEE, vol. 78, No. 4, Apr. 1990, pp. 753-767.

Agee, Maximum-Likelihood Approaches to Blind Adaptive Signal Extraction Using Narrowband Antenna Arrays, in Proc. Twenty-Fifth Asilomar Conference on Signals, Systems and Computers, Nov. 1991.

Comaniciu, et. al., Jointly Optimal Power and Admission Control for Delay Sensitive Traffic in CDMA Networks With LMMSE Receivers, IEEE Trans. Signal Processing, vol. 51, No. 8, Aug. 2003, pp. 2031-2042.

Comaniciu, et. al., Capacity Regions and Optimal Power Allocation for Groupwise Multiuser Detection, IEEE Trans. Wireless Comms., vol. 4, No. 2, Mar. 2005, pp. 349-352.

Etkin, et. al., Degrees of Freedom in Underspread MIMO Fading Channels, in Proc. ISIT 2003, Jun. 2003, p. 323, Yokohama, Japan.

Evans, et. al., Large System Performance of Linear Multiuser Receivers in Multipath Fading Channels, IEEE Trans. Info. Theory, vol. 46, No. 6, Sep. 2000, pp. 2059-2078.

Kammoun, et. al., A Central Limit Theorem for the SINR at the LMMSE Estimator Output for Large-Dimensional Signals, IEEE Trans. Info. Theory, vol. 55, No. 11, Sep. 2006, pp. 5048-5063.

Kempter, et. al., Capacity and QoS Analysis for a Novel Packet Based Wireless Access System, in Proc. 2003 IEEE 58th Vehicular Tech., Conf.,, Oct. 2003, pp. 1432-1436, Orlando, FL.

Mirbagheri, et. al., A linear MMSE Receiver for Multipath Asynchronous Random-CDMA With Chup Pulse Shaping, IEEE Trans. Vehicular Tech., vol. 51, No. 5, Sep. 2002, pp. 1072-1086.

Montanari, et. al., Analysis of Belief Propagation for Non-Linear Problems: The Example of CDMA (or: How to Prove Tanaka's Formula), in Proc. 2006 IEEE Info. Theory Workshop, Mar. 2006, pp. 160-164, Punta del Este, Uruguay.

Morrow, et. al., Packet Throughput in Slotted ALOHA DS/SSMA Radio Systems with Random Signature Sequences, IEEE Trans. Comms., vol. 40, No. 7, Jul. 1992, pp. 1223-1230.

Ng, et. al., On the Capacity of Cellular Networks with Global LMMSE Receiver, in Proc. 2007 IEEE Intl. Comms. Conf.,, Jun. 2007, pp. 870-876, Glasgow, UK.

Schizas, et. al., Consensus-Based Distributed Estimation of Random Signals with Wireless Sensor Networks, in Proc. 40th Asilomar Conf. Signals, Systems, and Comp., Oct. 2006, pp. 530-534, Pacific Grove, CA.

Schlegel, et. al., A Novel Random Wireless Packet Multiple Access Method Using CDMA, IEEE Trans. Wireless Comms., vol. 5, No. 6, Jun. 2006, pp. 1362-1370.

Shekhar, et. al., Closed Form Throughput of a Slotted ALOHA Network Using LMMSE Receiver, in Proc. 42st Asilomar Conf. Signals, Systems, and Comp., Nov. 2007, pp. 2128-2132, Pacific Grove, CA.

Shekhar, et. al., On the use of LMMSE Receiver for Single and Multiple Packet Reception in Stabilized Multi-channel Slotted ALOHA, in Proc. 2008 IEEE Radio and Wireless Symp., Jan. 2008, pp. 215-218, Orlando, FL.

Shi, et. al., On the Performance of Partitioned-Spreading CDMA with Multistage Demodulation, in Proc. 2006 40th Annual Conf. Info. Sciences and Systems, Mar. 2006, pp. 1522-1527, Princeton, NJ.

Tajer, et. al., Coordination Limits in MIMO Networks, in Proc. 2011 IEEE Intl. Symbp. on Info. Theory, Aug. 2011, pp. 933-937, St. Petersburg, Russia.

Tse, et. al., Linear Multiuser Receivers: Effective Interference, Effective Bandwidth and User Capacity, IEEE Trans., Info. Theory, vol. 45, No. 2, Mar. 1999, pp. 641-657.

Veeravalli, et. al., The Coding-Spreading Tradeoff in CDMA Systems, IEEE J. Selected Areas in Comms., vol. 20, No. 2, Feb. 2002, pp. 396-408.

Verdu, et. al., Spectral Efficiency of CDMA with Random Spreading, IEEE Trans. Info. Theory, vol. 45, No. 2, Mar. 1999, pp. 622-640.

Wang, et. al., Blind Multiuser Detection: A Subspace Approach, IEEE Trans. Info. Theory, vol. 44, No. 4, Mar. 1998, pp. 677-690.

Zaidel, et. al., Multicell Uplink Spectral Efficiency of Coded DS-CDMA With Random Signatures, IEEE J. Selected Areas in Comms., vol. 19, No. 8, Aug. 2001, pp. 1556-1569.

Webb, Understanding Weightless: Technology, Equipment, and Network Deployment for M2M Communications in White Space, Cambridge University Press, 2012.

* cited by examiner

GENERATION OF SIGNALS WITH UNPREDICTABLE TRANSMISSION PROPERTIES FOR WIRELESS M2M NETWORKS

FIELD OF THE INVENTION

The present invention relates generally to digital signal processing, with particular emphasis on machines wirelessly communicating with each other ("machine to machine" or "M2M" intercommunication) in noisy, crowded, multiple-use and multiple-overlap environments. A majority of this wireless intercommunication may occur with indirect remote, or otherwise removed human oversight focusing on the network and specific communications rather than implementing and effecting each, or even the majority, of such, as part of a broader intercommunication background of multiple networks of machines comprising what has been called the internet of things' or IoT. The environment for such wireless intercommunication may be 'noisy' as there may be multiple, chaotic networks operating with different standards and disparate organization, often transmitting highly bursty, asymmetric traffic from many different sources. Blind linear signal separating secure digital processing methods can be used to provide physically secure wireless M2M intercommunications in such environments, without direct human management and in a manner that is robust efficient and interference-resistant.

Signal generation for message and addressing content (respectively, the 'data' containing the information to be communicated and 'metadata' describing the sourcing, routing, and receiver for the message being communicated) is no more to be confused with the specific signals forming the message itself, than the process of combining letters and words of a language into a message and delivering it to a recipient are with formation and delivery of meaning that that message conveys.

BACKGROUND OF THE INVENTION

Machine-to-machine (M2M) networks comprise a thick mesh of tiered hardware forming the skeleton and body of a communications network, incorporating as desired sensor- and-reporting elements, which effectively comprise a 'nervous system'. Avoiding the time, expense, and effort of physically installing, maintaining, and most particularly adapting wired intercommunication linkages requires that the elements use wireless signals in any, or any set of electromagnetic spectrum bands.

For any wireless network, providing feedback for regular, directed, and emergency reporting processes all are useful to its continuous operation (particularly when under stress or upon experiencing a failure, whether point localized, or central, with recovery desired both 'as soon, and as safe, as possible' or 'AS, AAS, AP').

At the 'edges' of the wireless network, every nodal point (home, building, or mobile station) may be a Signaling Machine (SM). Any finite number of Signaling Machines can be aggregated to a lesser order set of Data Aggregation Points (DAP's) each of which serving as an intermediate network distribution point to provide a set of delivery paths with their own capacity or divisibility indices; and these DAP's must also be monitored to avoid unthinking overloads or under-utilizations. DAP's may then transfer the signaling to a wired 'trunk' or background line; but the communication between DAP and SM's may assuredly be in a 'noisy' environment for at least two readily foreseeable causes.

First the physical environment of the SM's and DAPs may vary from sub-cell (one DAP, many SM's) to the next and even within the same sub-cell as vehicles move about doors open and close, and other physical events occur. So there may be also issues of interference for the network— both within one sub-cell (between SM's and their assigned DAP), and between sub-cells (from adjacent i.e. geographically, immediately adjacent or overlapping) that are neighbors within the overall network.

Second, the communication between DAP and SM's, in one embodiment operates in the ISM band—which is a shared media. Other devices (e.g. smartphones, wireless printers, and computers) whose penetration and number are rapidly growing, and thus their message traffic, use the ISM band for their own purposes and with their own protocols, timing, and placements that may be ever-changing and unpredictable.

To effect wireless communication under such conditions reliably and efficiently needs digital signal processing which can handle complex, noisy, 'dirty' and above all—uncontrolled and unpredictably varying—communication conditions. This is the background in which the present description takes form.

The principle areas in which M2M communications may take place include (but are not limited to: utility networks (electricity, water, natural gas); industrial operations (as an obvious extension from the former, refineries; but also including manufacturing, distribution/logistical processing, warehousing, and transshipment operations—particularly those switching between modes of transport, e.g. rail-and-truck or truck-and-ship); agricultural and pastoral production (large-scale planting, care, harvesting of grain, truck, or tree crops; or open- or closed-range herds); transportation networks (riverine, including barge/lock/bridge interactions; seaborne in channels, harbors, straits, or other 'narrows'; airborne (around or between terminals); and road (including 'convoy' or 'aggregate' vehicle groupings or clusters); healthcare (intra- and inter-provider operations, remote servicing and communications); education (also intra- and inter-provider operations, remote servicing, Massively On-Line Open Courses, reverse-pyramid tutorial schemes, 'educational portal' services); all aspects of value exchange and financial transactions (credit debit swap; goods, services, or financial and other 'intangibles'); and social media (ad-hoc peer narrow-, group-, peer-, or open-ended 'casting'; messaging; social calendaring & coordination of 'agents'). The similarity amongst these areas include the following key aspects:
  (a) Potentially high asymmetry between numbers of SM's at the lowest tier or "edge" of the network, and DAP's at higher tiers in the network.
  (b) Potentially high asymmetry in uplink and downlink transmission requirements between network tiers. In the most extreme case (and, in one embodiment an advantageous case for this invention), SM's at the network edge may preferentially communicate data units to DAP's without any need to requirement for feedback from those DAP's, except for transport of infrequent physical-layer (PHY) messages to set or reset security protocols between the SM's and DAP's. Example services that meet this criterion include User Data Protocol (UDP) and Trivial File Transfer Protocol (TFTF) services.

(c) Potentially high asymmetry in cost complexity, size-weight-and-power (SWaP), and energy usage requirements between (typically "dumb") SM's at the network edge and DAP's at higher tiers in the network.
(b) Transmission of small data bursts, rather than extensive data-heavy, continuing linkages, with low average rate relative to human-centric operational 'norm' at the respective time.
(d) Rapidly varying and highly dynamic variation in interference observed by SM's and DAP's, comprising both interference generated by the M2M network, and interference generated from emitters operating 'outside' the M2M network.

An individual human may have multiple terminals' in such an M2M network—everything from physiological sensors in his clothing and accessories, to multiple communications and information-processing devices. An individual 'origination point' may be a single person, a single machine, a single household, or a single building—with greater or lesser 'interior' differentiation and demands.

Power efficiency may be an important criterion for at least some members of the network, as wireless operations may require self-sufficiency for extended periods at non-predictable intervals; without fixed wires, power is more likely to be provisioned by batteries with weight and capacity limitations and thus be more expensive.

Additional important criteria for M2M networks and elements include: mobility, ubiquity, and minimization of maintenance costs (of servicing, of replacement elements, and of 'opportunity of use', i.e. downtime), especially at the network edge; and avoidance of network-centric SM authentication, association, and provisioning requirements that can unduly load the network downlink and create critical points of failure in the network. In particular, the ability to operate with limited or "local" provisioning of security keys can greatly improve robustness and scalability of the network, and (if successfully implemented) eliminate critical points of attack by adversaries seeking to corrupt or penetrate the M2M network.

All of the above criteria (and others known to the field but not specifically described here) generally militate towards a least-cost economic pressure; the networks that are pragmatically operable may be those that can most readily adapt to such. Unlike critical-path, 'must succeed' operations, M2M communications may have to accommodate localized failures, environmentally-caused intermittency, and be able to fail and then recover. The elements and networks can tolerate lower data transmission rates, transmission delays, and flawed communication handovers—using the principle benefit of machines, persistence and exact repetition—to overcome transient faults. They need not be as perfect as possible (in comparison to, say, a human-implanted medical support device), as durable as manufacturable (in comparison to, say, a multi-decade geosynchronous-orbit communications satellite), or even as secure against failure as imaginable (in comparison, say, to a nuclear reactor's in-pile operational machinery). Yet M2M networks and thus the individual elements therein must still be resistant ('hardened') against both inadvertent and intentional 'spoofing' effects (whether these arise from unintentional or intentional mistakes, environmentally-sourced distortions, and sabotage). Continued public acceptance of this approach to M2M networks and their intercommunications requires sustainably high confidence in the validity, verity, and non-distortability of such network's operations, for all SM's and DAP's, all of the time. The security of the network must be trusted even when real-world dangers, be those mistakes or temporary failures, or intentional efforts to misguide, intercept spoof, or substitute network signals, are present. This security must be secured in and by the real world, rather than exist solely in some perfect model or algorithmic abstraction.

At the present time there are no fixed standards for M2M wireless communications networks that are universal, global, or national. There are cellular, Wi-Fi, and other 'bands' in the electromagnetic spectrum which might be used (and multiple combinations therein might be, also); and the distance ranges for such can shift from short, to close, to mid, to long range—crossing the boundaries of skin, clothing, walls, and geography respectively.

Furthermore, because this is an evolving domain, changes can be anticipated to stay both rapid and continuing. Thus an open-ended, rather than closed, proprietary, solution may have the greatest utility. Changes may come to and from each and all of the use of the network, its provisioning and servicing capital (hardware and institutions), its spectra of transmission and reception ('transception'); and its mode of interstitial operation (amplitude, frequency, temporal, spatial, and other diversities of transmission and reception). Chief concerns may include avoiding interference, using low-output power (if only to avoid deafening itself with 'white noise' from such), and intelligent application, sensitive to both the environmental conditions and human-imposed restrictions and requirements (whether regulatory, operational, or standards-compliant).

SUMMARY OF THE INVENTION

The present invention is a method for wireless intercommunication between a set of Signaling Machines (SM's) and a set of Data Aggregation Points (DAP's), comprising within a selected frequency range (in one embodiment the 902-928 MHz ISM band) a frequency-hop direct-sequence (FHDS) spread-spectrum modulation format which provides cyclic chip-level and symbol-level cyclic prefixes to control channel multipath and interference loading, and which preferentially employs transmission information that is randomly determined at every node in the network, and neither known to the receivers in the network nor provisioned by the network. On the uplink, this randomly determined transmission information includes:

the physical dwell (time slot and frequency channel) used by each uplink transmit node in the network, which physical dwell is randomly varied over every time frame;

the spreading code used by each uplink transmit node in the network, which spreading code is also randomly varied over every time frame; and elements of a source symbol mask applied to the data bursts prior to spreading, which source symbol mask is also randomly varied over every time frame.

Additionally, if multiple uplink receivers are in the field-of-view (FoV) of the uplink transmitter and have pathless communication with those receivers, the uplink receiver selected by the uplink transmit node can also be randomly varied over each time frame. On the downlink, this randomly determined transmission information includes:

the spreading code used by each downlink transmit node in the network, which spreading code is randomly varied in every time slot of each time frame; and elements of a source symbol mask applied to the data bursts prior to spreading, which source spreading mask is also randomly varied over every time frame.

Additionally, each downlink transmit node in the network transmits over a downlink frequency channel that is preferentially pseudorandomly varied over each time slot of each frame, using an algorithm that is provided to, known to, or learnable by each downlink receivers) allowed to communicate with that downlink transmit node, and which algorithm is locally and independently set at each downlink transmitter.

This randomly-determined transmission information can be provisioned at and by each transmitter, with each intended receiver being blind (no pre-set agreement or provisioning between transmitter and receiver) to the choice of that transmission information, and using only rudimentary provisioning from any specific transmitter in the network to only its set of intended receivers in the network of a commonly-known and shared receive symbol mask for all signals intended for a given receiver(s) so as to differentiate them from transmissions by that specific transmitter intended for other nodes in the network, as well as transmissions from other transmitters in the network intended for that particular receiver(s). The random spreading codes are further exploited at each receiver to differentiate between subsets of nodes transmitting to the same or different receivers in the network, preferentially using linear digital signal processing methods that can separate signals with widely varying receive power, and experiencing arbitrary channel multipath with group delay less than or equal to the cyclic prefix imposed during the spreading operation. This further permits the use of multiple time and frequency coincident transmissions and also avoids provisioning overhead (which reduces data transmission rates) required by using matched-filter despreading.

All of these enable higher security, by greatly complicating the task for any observer to determine actual in-use transmissions from noise; by eliminating the ability for an observer to predict the randomly determined transmission information used at the nodes in the network; and by using linear digital signal processing methods to excise intruders from legitimate network transmissions. For example, even if an intruder has learned the uplink receive symbol mask, so that the intruder can pose as a legitimate uplink transmission, the intruder may not be able to predict the randomly determined uplink transmission information used by any uplink transmitter in the network; will not be able to consistently jam any uplink transmitter in the network; may be instantly identified as a duplicated authorized node, or an unauthorized node, by the uplink receiver, allowing the uplink receive symbol mask to be reset by the system; and may in any event be excised by the linear digital signal processing methods employed by the uplink receiver.

One embodiment has the network exploit these arbitrary spreading codes, enabling this method to be used in any ad-hoc (not previously designated) set of SM's and DAP's, requiring only the preliminary commonalization (i.e. provisioning, of the symbol mask to the set of SM's and DAP's forming the ad-hoc network); and this method can be employed in any FDMA, TDMA, FHMA or OFDMA (Frequency Diverse Multiple Access; Time Diverse Multiple Access, Frequency Hop Multiple Access, Orthogonal Frequency Diverse Multiple Access) network without scheduling of intercommunications, thereby reducing the feedback response overhead cost Because the despreading algorithms are not required to be pre-arranged, hard-coded, or otherwise communicated throughout the network, but can be least-common-knowledge shared, fully-blind in nature, they present the lowest overhead for any such approach, do not require carrier synchronization, and enable the SM's and DAP's (the network) to operate without either knowledge of a carrier offset or 'handshake' overhead signaling.

BRIEF DESCRIPTION OF THE DRAWINGS

The present invention is illustrated in the attached presentation explaining some aspects of the present invention, which include Signaling Machine networks (SM's and DAP's) working under various 'loads' of interfering, same-band signals from non-network sources as well as potentially-interfering within-network signals from the sets of SM's and DAP's.

DETAILED DESCRIPTION OF THE DRAWINGS

Figure 1:
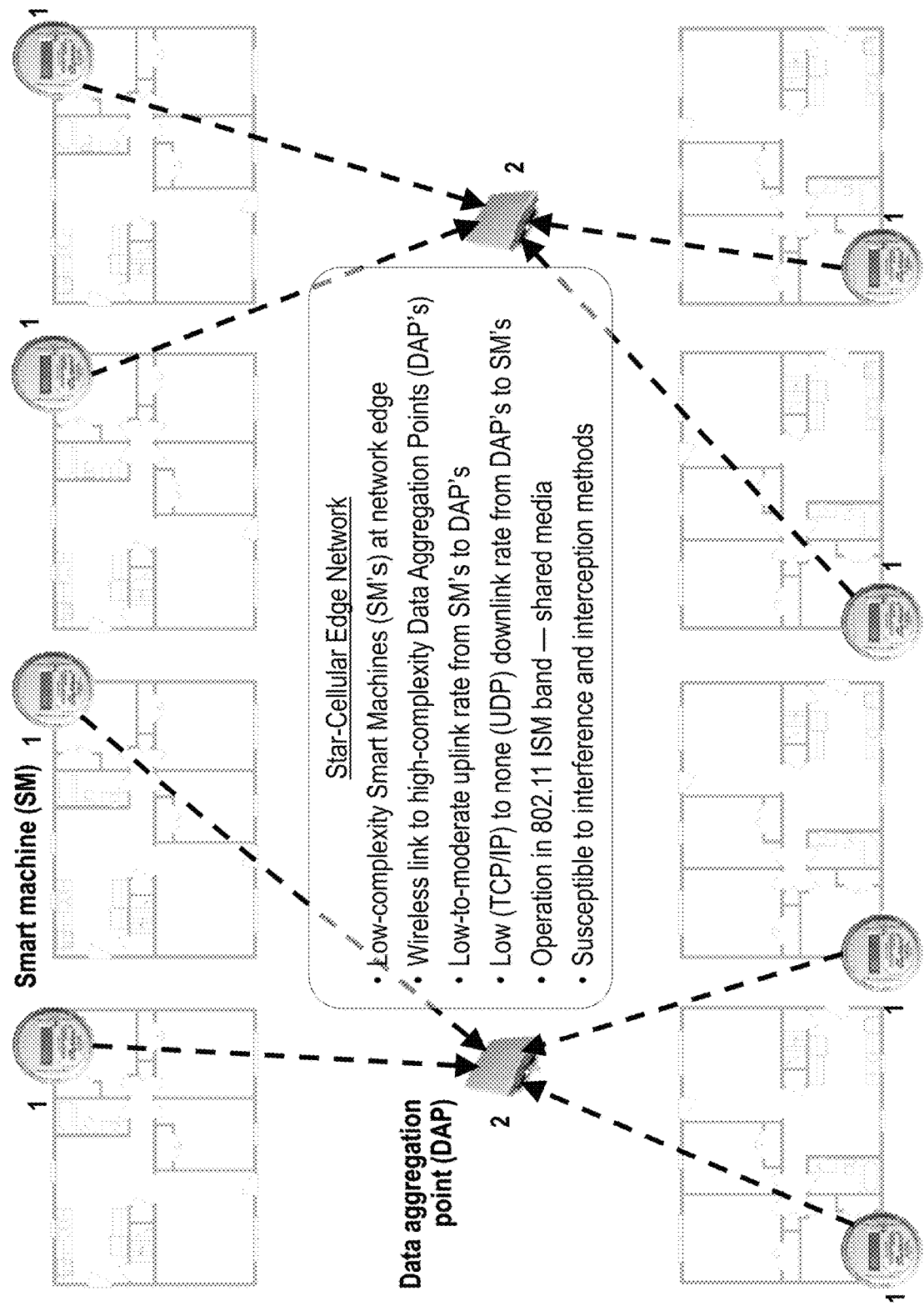
FIG. 1 is a drawing of overlapping and non-cooperating machine-to-machine (M2M) transceivers operating in an exemplary medium-range network, with each sub-network, or cell, containing multiple SM's connecting with a single DAP.

FIG. 1, in one embodiment is the drawing of overlapping and non-cooperating machine-to-machine (M2M) transceivers operating in an exemplary medium-range network, with each sub-network, or cell, containing multiple SM's (1) connecting with a single DAP (2). Connections between the DAP's (2) or with any other part of a network, are not shown but are not excluded.

Figure 2:
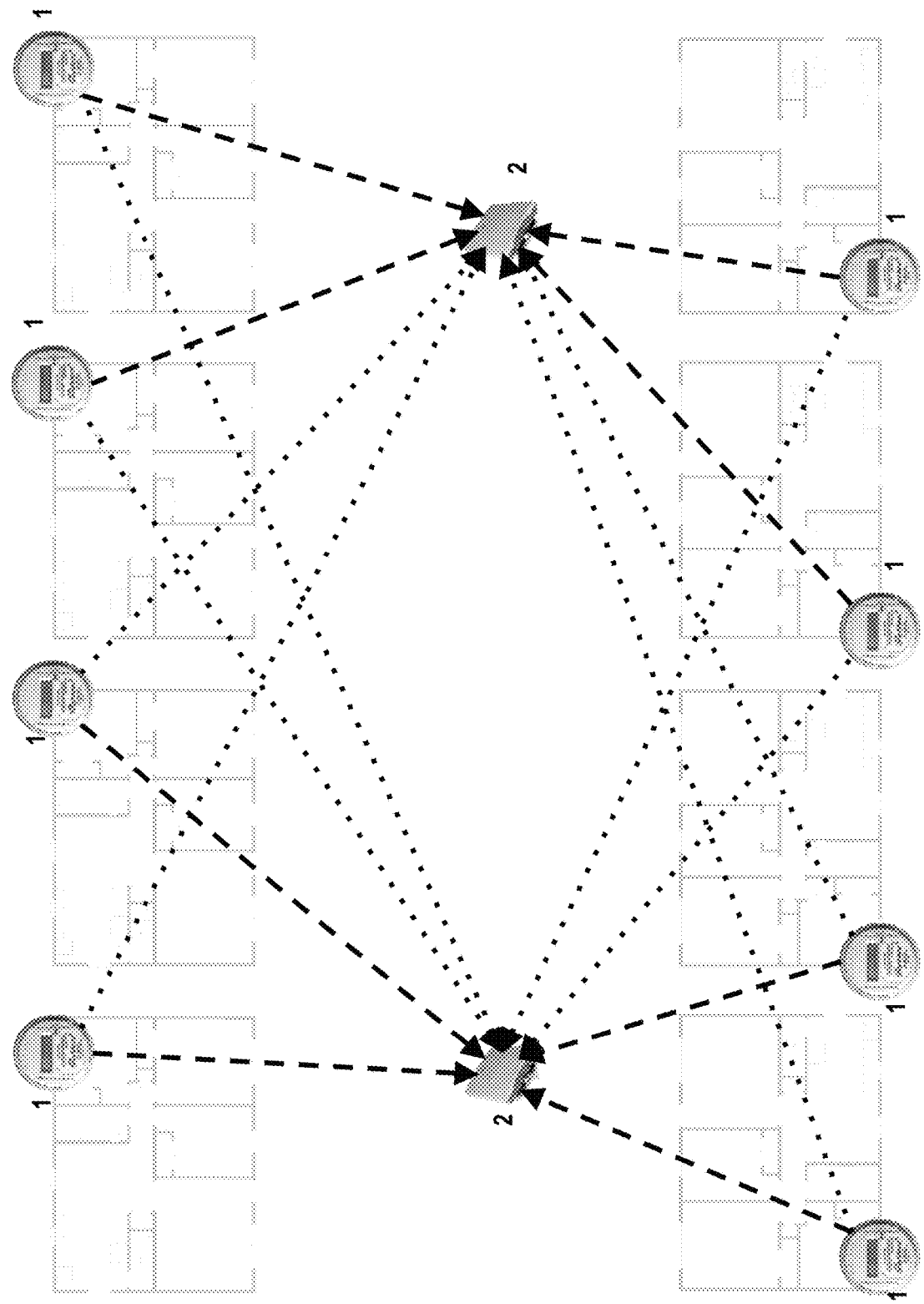
FIG. 2 is a drawing of overlapping and non-cooperating medium-range M2M networks, each with multiple SM's connecting to a single DAP, showing the interference between multiple networks.

FIG. 2, in one embodiment is the drawing of overlapping and non-cooperating medium-range M2M networks, each with multiple SM's (1) connecting to a single DAP (2), showing the interference (the dotted lines) between multiple networks (specifically, adjacent-cell interference).

Figure 3:
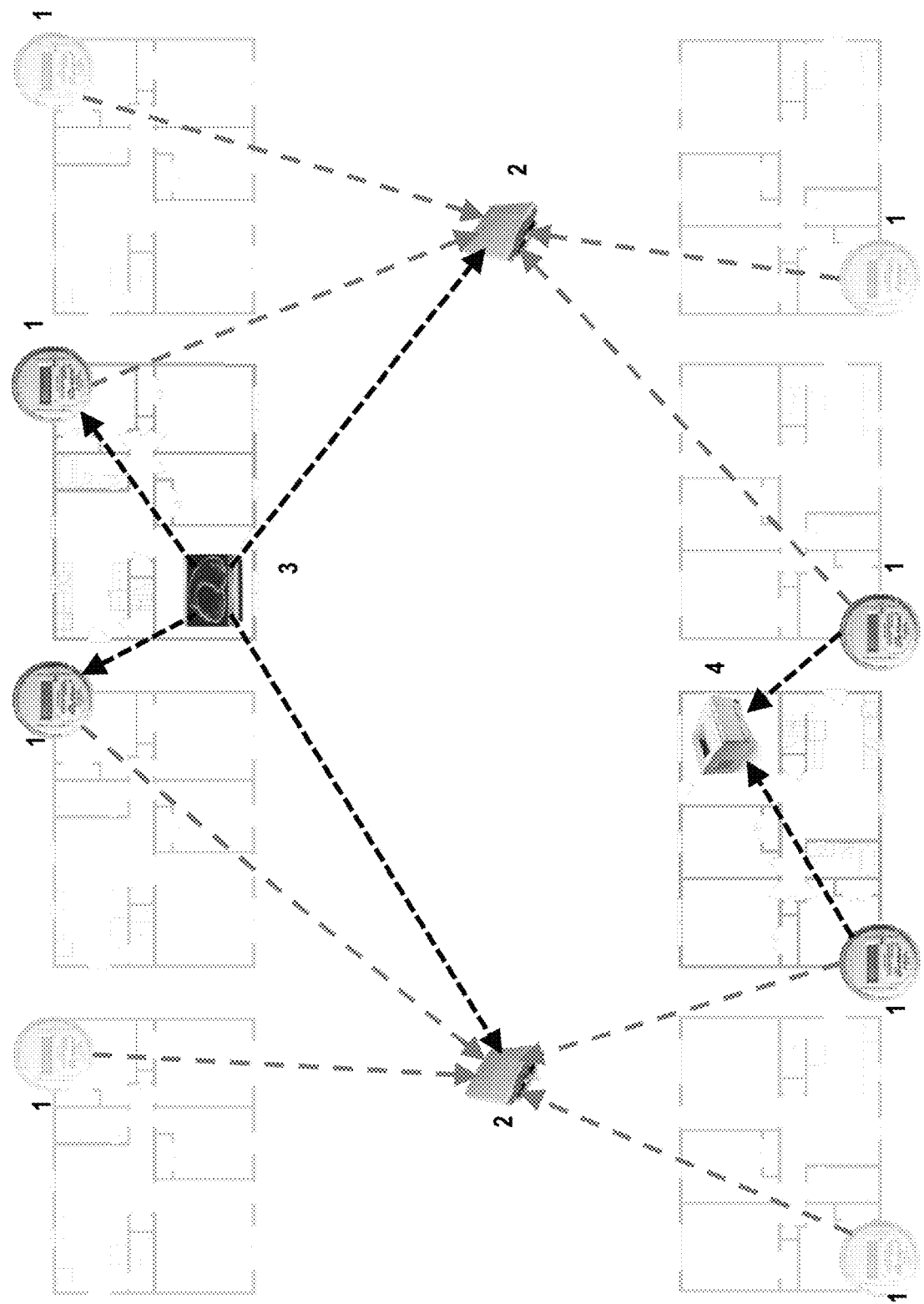
FIG. 3 is a drawing of overlapping and non-cooperating medium-range M2M networks, each with multiple SM's connecting to a single DAP, showing the interference from out-of-network devices.

FIG. 3, in one embodiment is the drawing of overlapping and non-cooperating medium-range M2M networks, each with multiple SM's (1) connecting to a single DAP (2), showing the interference from or with out-of-network devices (emitters (3) or receivers (4), respectively).

Figure 4:
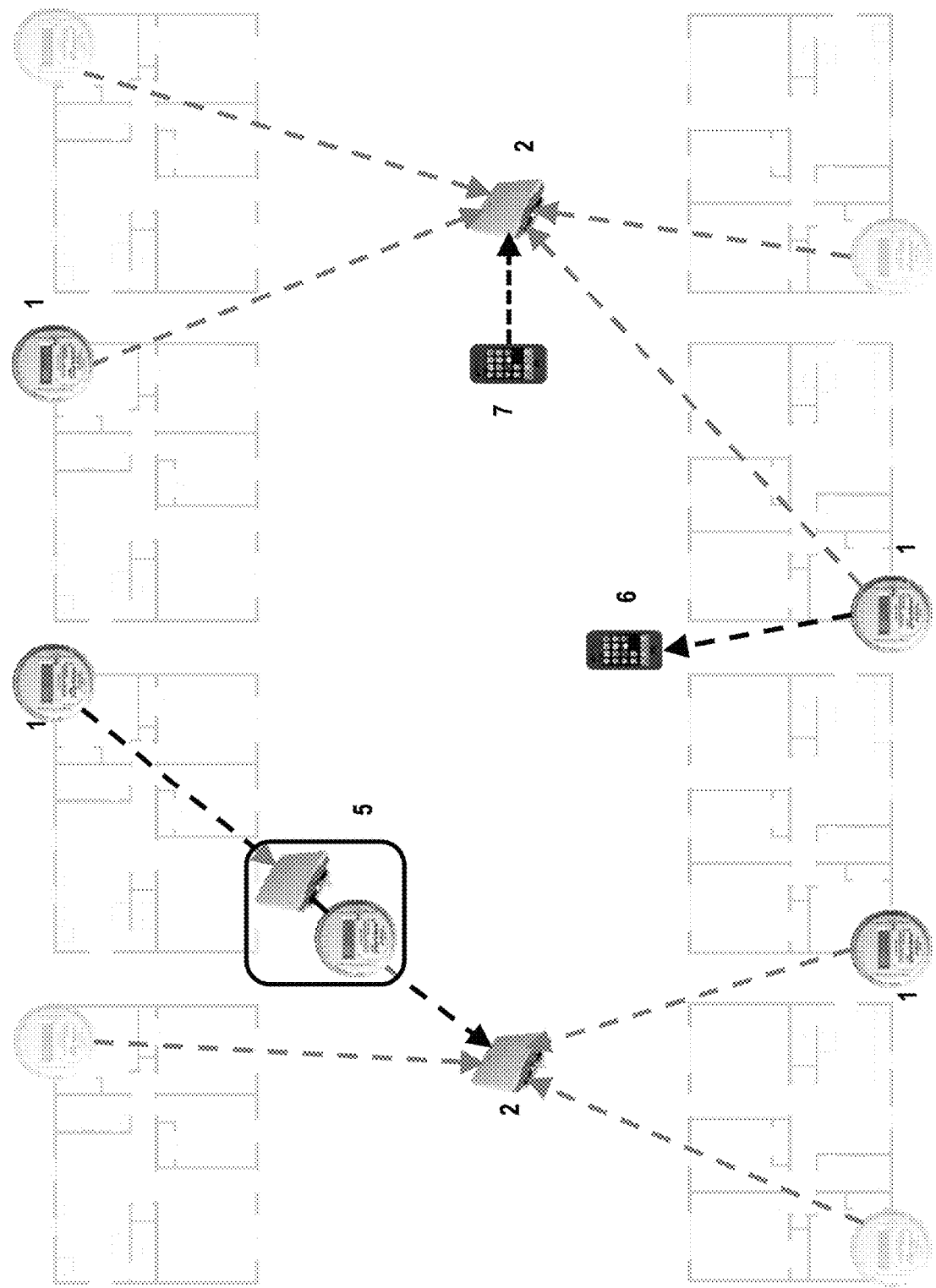
FIG. 4 is a drawing of overlapping and non-cooperating medium-range M2M networks, each with multiple SM's connecting to a single DAP, with an additional intrusive element shown respectively attempting to eavesdrop on, intercept or interfere with, a network.

FIG. 4, in one embodiment is the drawing of overlapping and non-cooperating medium-range M2M networks, each with multiple SM's (1) connecting to a single DAP (2), with at least one additional intrusive element attempting to intercept (and potentially spoof in a 'man-in-the-middle' attack) (5), eavesdrop on or monitor (6), or interfere with (7), a network.

Figure 5:
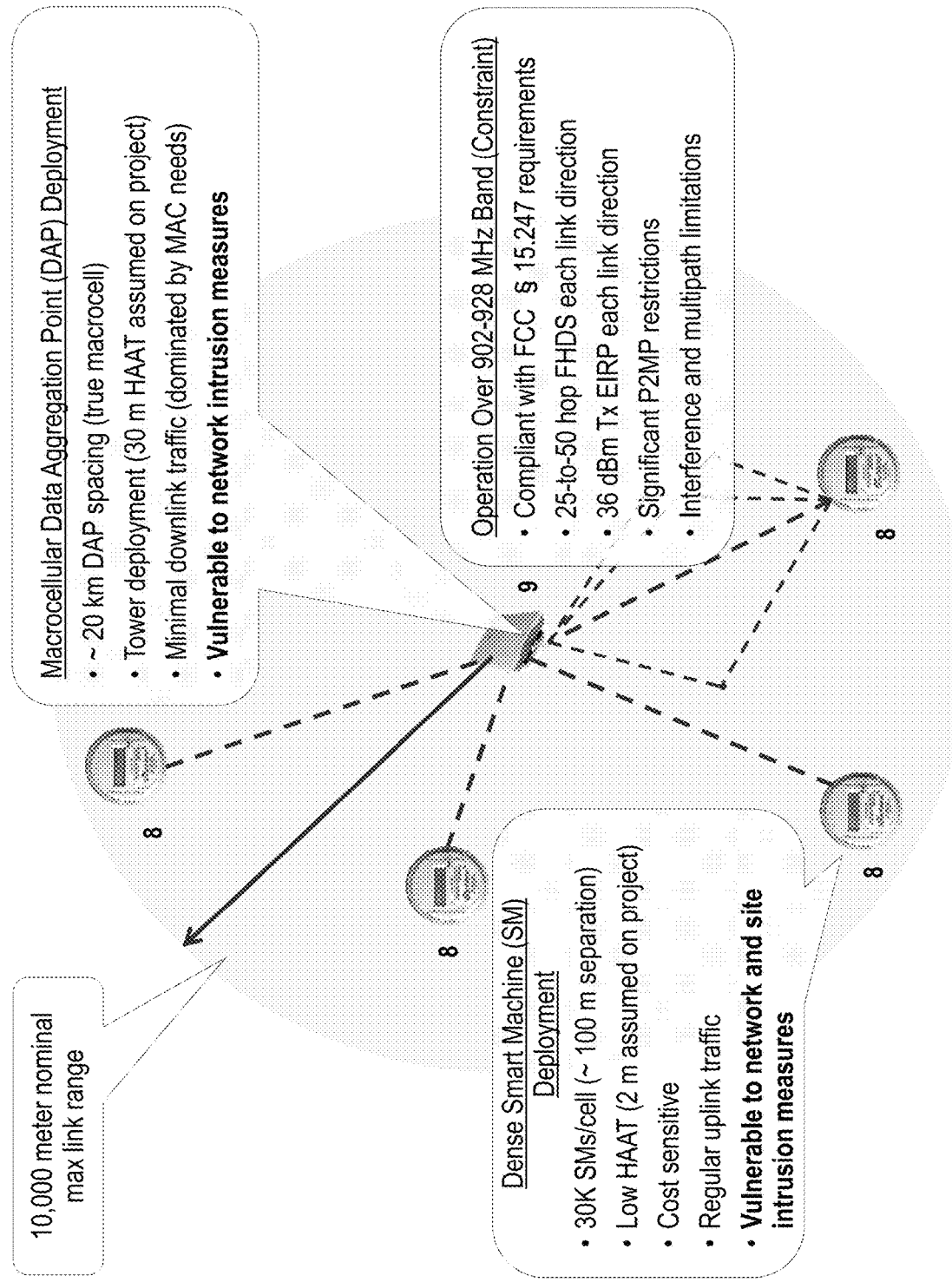
FIG. 5 is a drawing of overlapping and non-cooperating machine-to-machine (M2M) transceivers operating in the long-range M2M network, in which a large number of tow-complexity M2M transceivers are communicating with a small number of higher-complexity M2M transceivers.

FIG. 5, in one embodiment is the drawing of overlapping and non-cooperating machine-to-machine (M2M) transceivers ('nodes') operating in the long-range M2M network, in which a large number of low-complexity M2M transceivers are communicating with a small number of higher-complexity M2M transceivers; with this drawing showing an exemplary application for this network: a wireless, Smart Grid, edge network, in which the low-complexity M2M nodes are Smart Meters (SM's) (8) and the higher-complexity M2M transceivers ('Nodes') are Data Aggregation Points (DAPs) (9). It is assumed that the low-complexity M2M nodes (8) are at a lower elevation restricting their view to a small number of higher-complexity Nodes (9), similar to user equipment ('UE's) in a cellular telephony network, and that the low-complexity M2M nodes (8) have identified a primary or "nearest neighbor" higher-complexity M2M Node (9) in the network. However, it is not assumed that the low-complexity M2M nodes (8) are restricted to, or even preferentially transmit to that primary higher-complexity Node (9).

Figure 6:
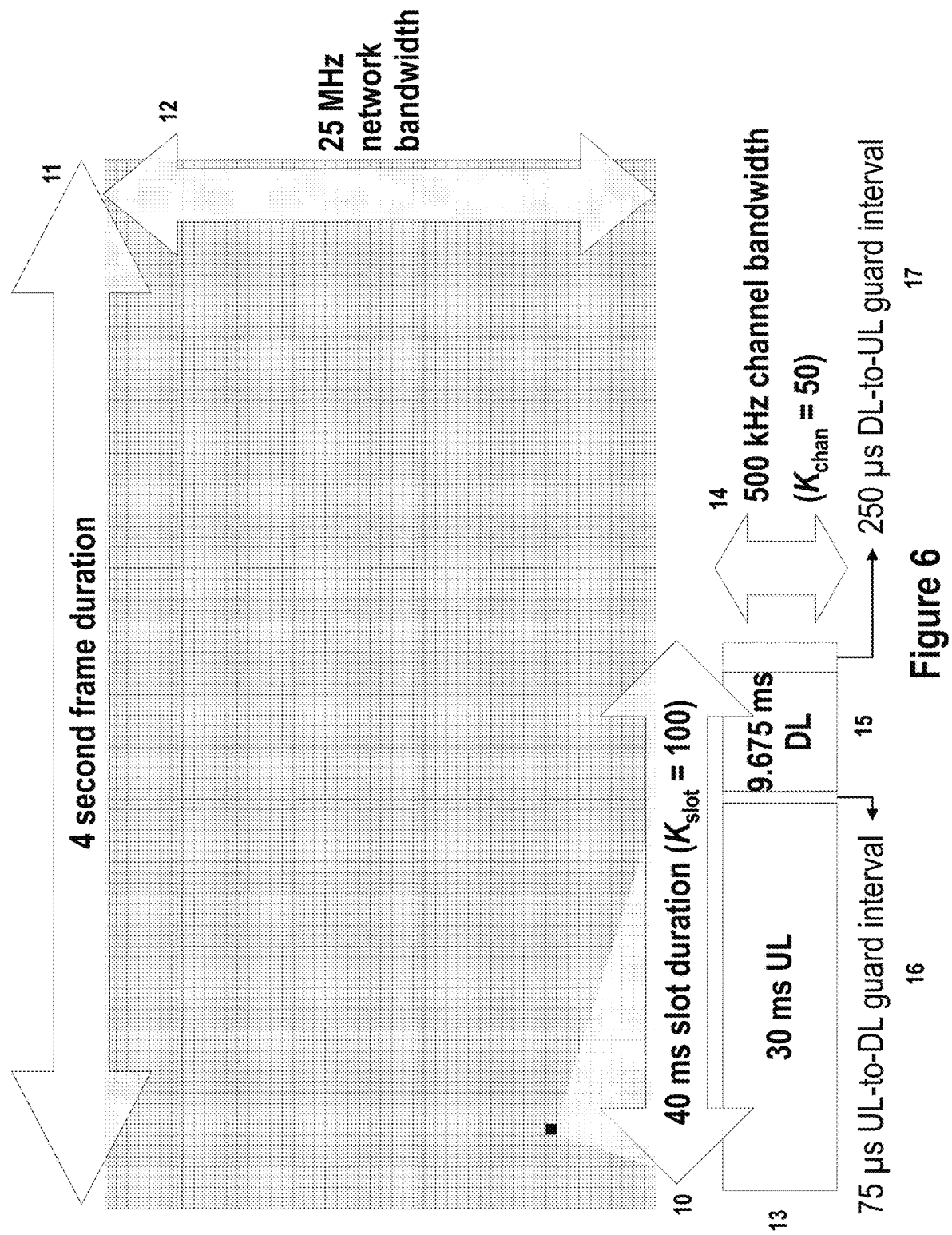
FIG. 6 is a drawing of the time-frequency structure and parameters of each 'frame' used in the Cyclic-Prefix Direct-Sequence (CPDS) system embodiment for the long-range M2M network shown in FIG. 5.

FIG. 6, in one embodiment is the drawing of the time-frequency structure and parameters of each 'frame' used in the preferred Cyclic-Prefix Direct-Sequence (CPDS) system embodiment for the long-range M2M cell shown in FIG. 5, shows how on the uplink, each Smart Machine (SM) intending to transmit data to a Data Aggregation Point (DAP) in a 4 second frame first randomly selects one of 5,000 physical time-frequency dwells, comprising 100 contiguous 40 ms physical time slots (10) covering the 4 second frame (11), and frequency-channelized into 50 contiguous 500 kHz physical frequency channels (12) covering 25 MHz of the 902-928 MHz ISM band. The SM then transmits its intended information over a 30 ms uplink (UL) subslot (13) of that time-frequency dwell using a signal employing a cyclic-prefix Direct-Sequence modulation format. On the downlink, over each 30 ms time slot each DAP selects one (14) of the 50 physical frequency channels (12) using a pseudo-random selection algorithm known to its intended SM's. The DAP then broadcasts its intended information over a 9.675 ms downlink (DL) subslot (15) of that frequency channel. Each time slot has an additional 75 μs UL-to-DL guard interval (16) to allow timing advancement of the SM UL transmissions to its primary (but not necessarily preferential) DAP, and a 250 μs DL-to-UL guard interval (17) to prevent DAP-to-DAP interference from the DAP DL transmissions. Each frequency channel has an additional set-aside of ±50 kHz guard band to account for carrier local oscillator ('LO') uncertainty and power amplifier ('PA') intermodulation distortion ('IMD') in the transmitted SM and DAP signals. This framing structure allows the SM's and DAP's to be fully compliant with FCC § 15.247 regulation for frequency-hop spread spectrum intentional radiators in the 902-928 MHz band. However, the framing structure shown in FIG. 6 can be used with any long-range M2M network in which a large number of low-complexity M2M transceivers are communicating with a small number of higher-complexity M2M transceivers in a manner that is compliant with 902-928 MHz ISM band emission restrictions.

Figure 7:
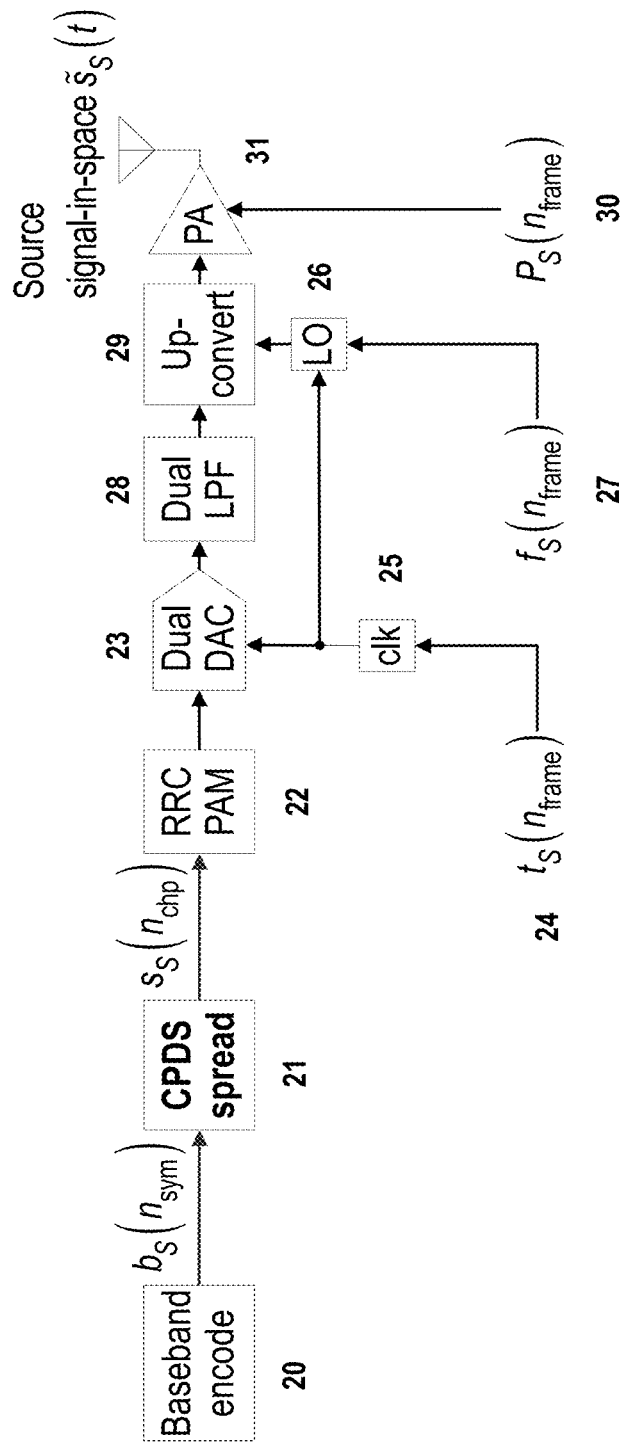
FIG. 7 is a drawing of the hardware implementation at each cyclic-prefix Direct-Sequence (CPDS) uplink transmitter used in the long-range M2M network embodiment.

FIG. 7, in one embodiment is the drawing of the hardware implementation at each cyclic-prefix Direct-Sequence (CPDS) uplink transmitter used in the long-range M2M network embodiment. The information to be sent in the intended transmission passes from a baseband encoder (20) successively to the CPDS spreader (21), the raised-root cosine ('RRC') interpolation pulse and pulse-amplitude modulator ('PAM') (22), and into at least one digital-to-analog converter ('DAC') (in one embodiment dual converters) (23). A source transmit start time ('$t_s$') for each time frame ('$n_{fame}$') (24) is sent to the clock (25) which is both connected to the DAC (23) and the LO (26), which also receives a selected source transmit center frequency ('$f_s$') for each time frame $n_{frame}$ (27). From the DAC the now-analog signal is sent through the at least one LPF (28) (in one embodiment dual LPF's are used) and then to the upconverter (29), which also takes the frequency-specific input from the LO (26). The upconverter (29) then sends the converted digital signal to the power amplifier PA (31), which also receives a power setting ('$P_S(n_{fame})$') for each time frame $n_{fame}$ (30), from where the transmission becomes a wireless signal.

Figure 8:
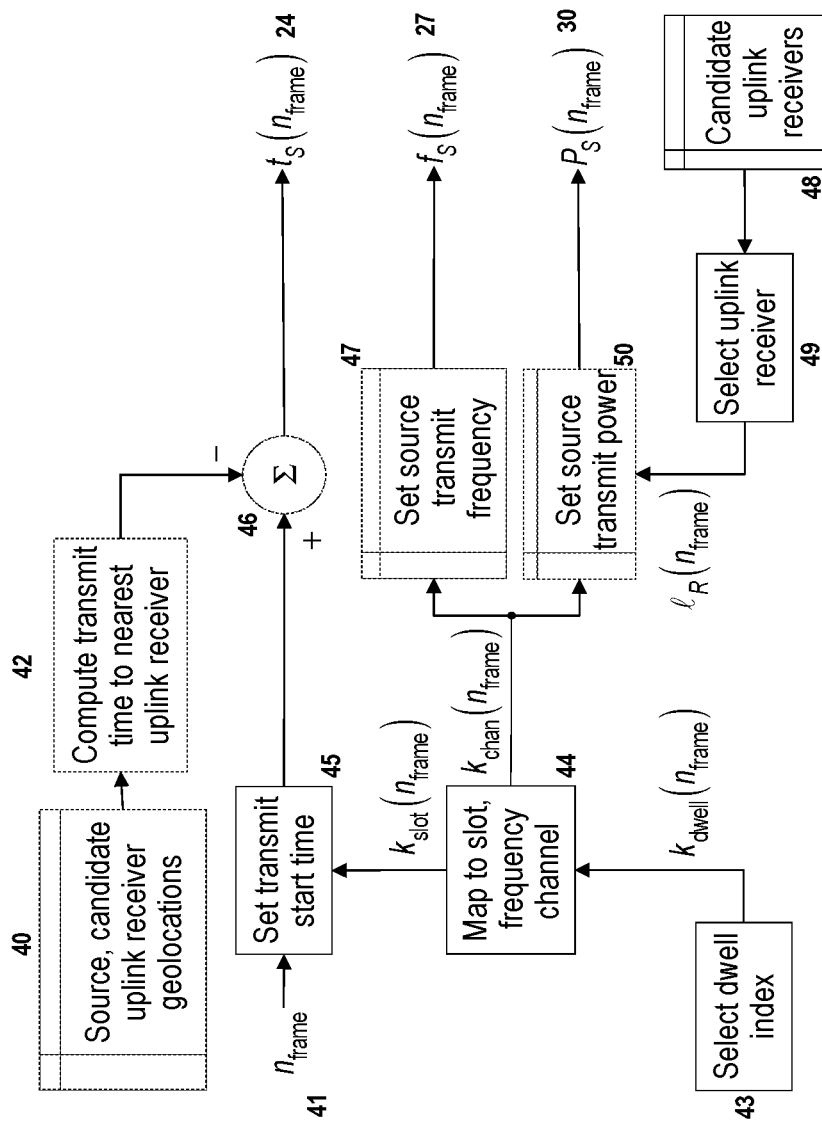
FIG. 8 is a drawing of the logical and computational processes performed in each time frame to self-provision network resources used by the CPDS uplink transmitter shown in FIG. 7.

FIG. 8, in one embodiment is the drawing of the logical and computational processes performed in each time frame to self-provision network resources used by the CPDS uplink transmitter shown in FIG. 7, showing that information is taken from a database of geolocations for both source and candidate uplink receivers (40) and then used to compute the best timing advance to the 'nearest' (which may measure not just geographic separation, but Quality of Signal, least-interference, least-problematic multipath, or other alternate values) uplink receiver (42); that the selection of the dwell index (43) of $k_{dwell}(n_{frame})$ inputs into the calculation of a mapping (44) of $k_{dwell}(n_{frame})$ to the correct time slot index $k_{slot}(n_{frame})$ and frequency channel index $k_{chan}(n_{frame})$, with the correct slot being combined with the frame index $n_{fame}$ to generate the transmit start time (45) which then is used with the best timing advance to calculate (46) the slot start time for each frame index $n_{frame}$, $t_S(n_{frame})$ (24) (which in FIG. 7 is shown sent to the clock). The frequency channel index $k_{chan}(n_{frame})$ is used to compute (47) both the source transmit center frequency for each $n_{frame}$, $f_S(n_{frame})$ (27) (which in FIG. 7 is shown sent to the LO), and also along with information taken from a database of candidate uplink receivers (48) from which the intended uplink receivers) for each frame index $n_{frame}$, $l_R(n_{frame})$ is(are) selected (49), combined to set the source transmit power setting for each $n_{frame}$, $P_S(n_{frame})$ (30) (which in FIG. 7 is shown sent to the PA).

Figure 9:
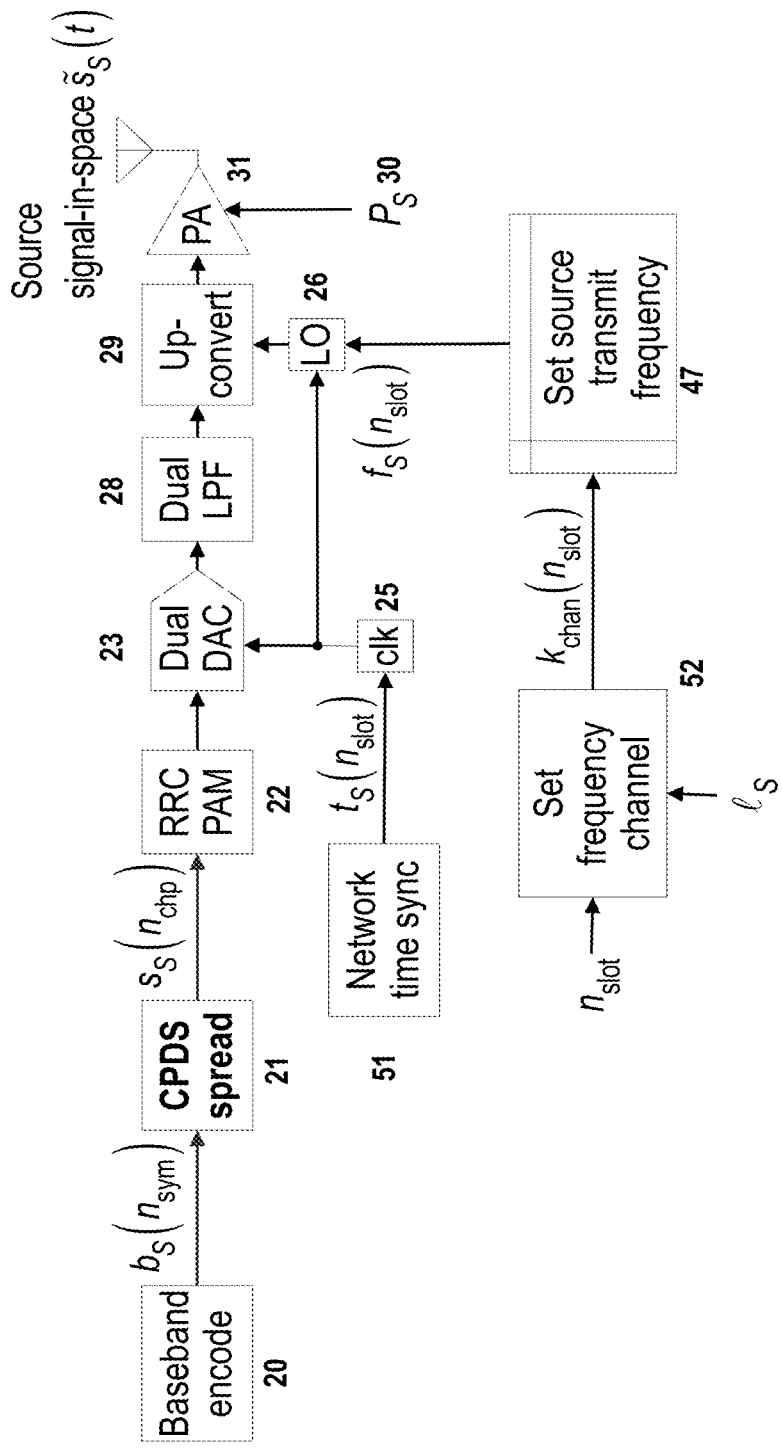
FIG. 9 is a drawing of the hardware implementation at each cyclic-prefix Direct-Sequence (CPDS) downlink transmitter used in the long-range M2M network embodiment. This FIG. includes the logical and computational processes performed in each time slot to self-provision network resources used by the CPDS downlink transmitter.

In one embodiment FIG. 9, the drawing of the hardware implementation at each cyclic-prefix Direct-Sequence (CPDS) downlink transmitter used in the preferred long-range M2M network embodiment, includes the logical and computational processes performed in each time slot to self-provision network resources used by the CPDS downlink transmitter. In this downlink transmitter, differentiating it from the uplink transmitter described and shown in FIG. 7, instead of a timing signal for each frame, a network time synchronization (51) for the slot start time at each slot index $n_{slot}$, $t_S(n_{slot})$, is given to the clock (25), and for each slot index $n_{slot}$ and uplink transmitter source index $l_s$ the frequency channel index $k_{chan}(n_{slot})$ is first determined (52) and then used to select the source transmit center frequency (47) which is fed to the LO (26).

Figure 10:
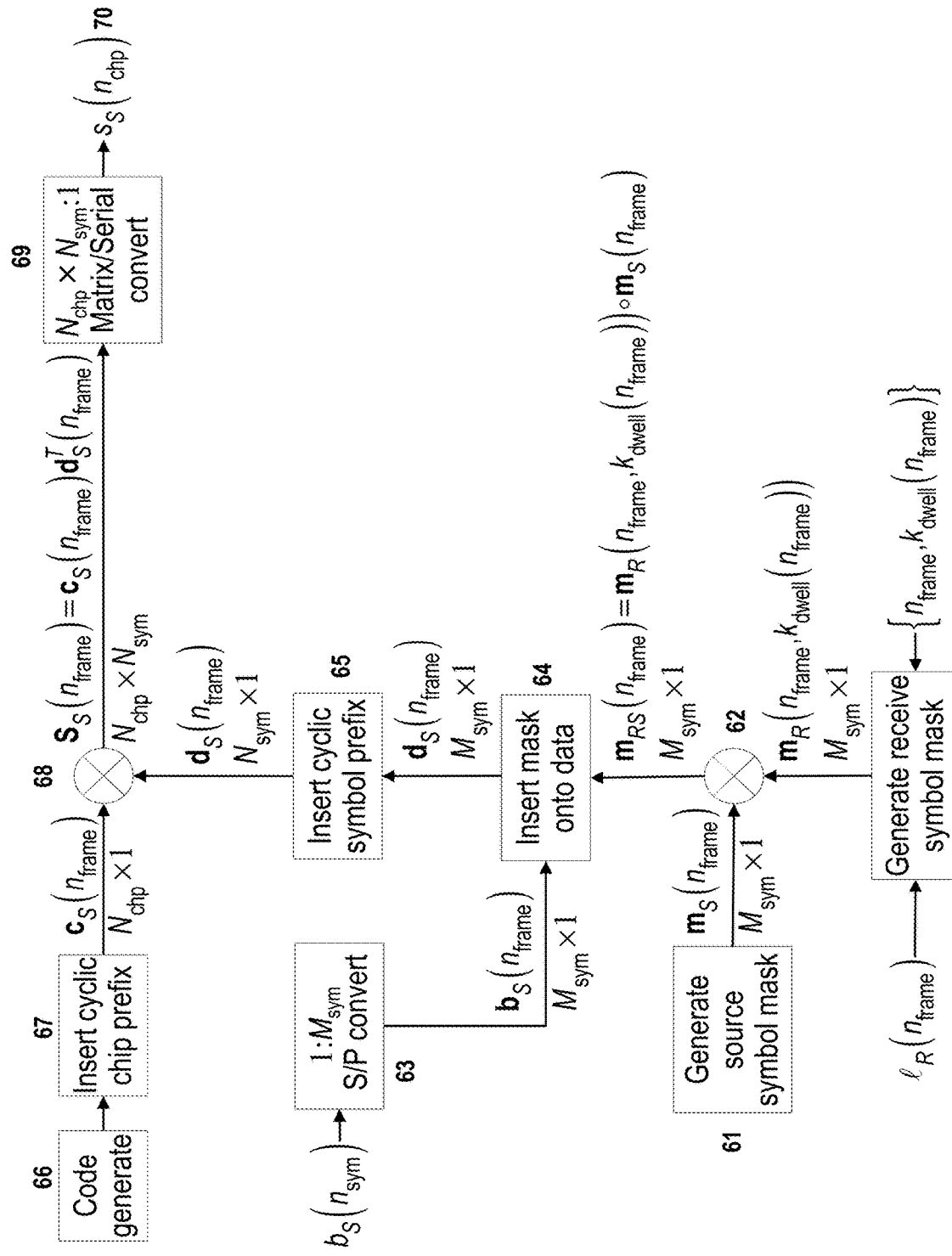
FIG. 10 is a drawing of the logical and computational processes that implement the Cyclic-Prefix Direct-Sequence (CPDS) Spreader (in one embodiment comprising digital signal processing hardware) for each uplink transmitter used in the long-range M2M network embodiment shown in FIG. 5, and for time-frequency framing structure shown in FIG. 6.

In one embodiment, FIG. 10, the drawing of the logical and computational processes that implement the Cyclic-Prefix Direct-Sequence (CPDS) Spreader (21) (in one embodiment, comprising digital signal processing hardware) for each uplink transmitter used in the long-range M2M network embodiment shown in FIG. 5, and for the 902-928 MHz time-frequency framing structure shown in FIG. 6, shows that the CPDS spreader uses a modulation-on-symbol spreading format, in which a spreading code is repeated over each baseband symbol transmitted over a slot. In addition, the spreading structure includes incorporation of cyclic prefixes in both the spreading code and the baseband symbol stream to mitigate multipath and delay uncertainty between the transmitter and receiver in the network; and multiplication of the baseband symbols by a symbol mask that provides PHY security to the signal.

For each frame, from both the intended receiver index $l_R(n_{frame})$ and physical dwell index $k_{dwell}(n_{frame})$ are used to generate its receive symbol mask (60) which in one embodiment takes the form of $M_{sym} \times 1$ vector $m_R(n_{frame}, k_{dwell}(n_{frame}))$ to which a generated source symbol mask (61) of the form of $M_{sym} \times 1$ vector $m_S(n_{frame})$ is combined (62), producing the symbol mask of the form of $M_{sym} \times 1$ $m_{RS}(n_{frame})$ formed by the element-wise (Schur) product $$m_{RS}(n_{frame}) = m_R(n_{frame}, k_{dwell}(n_{frame})) \circ m_S(n_{frame});$$

to which the converted baseband source symbol stream $b_S(n_{sym})$, after serial-to-parallel (S/P) conversion (63) to $M_{sym} \times 1$ source baseband vector $b_S(n_{frame}) = [b_S(n_{frame} M_{sym} + n_{sym})]_{n_{sym}=0}^{M_{sym}-1}$ for frame $n_{frame}$, has applied on a frame-wise basis for each $n_{frame}$ (64), producing $M_{sym} \times 1$ source data vector $d_S(n_{frame})$, to which the cyclic symbol prefix is added (65) thus producing $N_{sym} \times 1$ extended source data vector $d_S(n_{frame})$; and a code is generated for each $n_{frame}$ (66), to which the cyclic chip prefix is applied (67), producing $N_{chp} \times 1$ spreading code vector $c_S(n_{frame})$ for each $n_{frame}$; after which the twin streams with applied cyclic prefixes are combined (68) producing the $N_{chp} \times N_{sym}$ source signal matrix $S_S(n_{frame})$ of the form $$S_S(n_{frame}) = c_S(n_{frame}) d_S^T(n_{frame});$$

which is then fed to $N_{chp} \times N_{sym}$:1 Matrix/Serial converter (69) to produce the source signal stream $s_S(n_{chp})$ (70).

Figure 11:
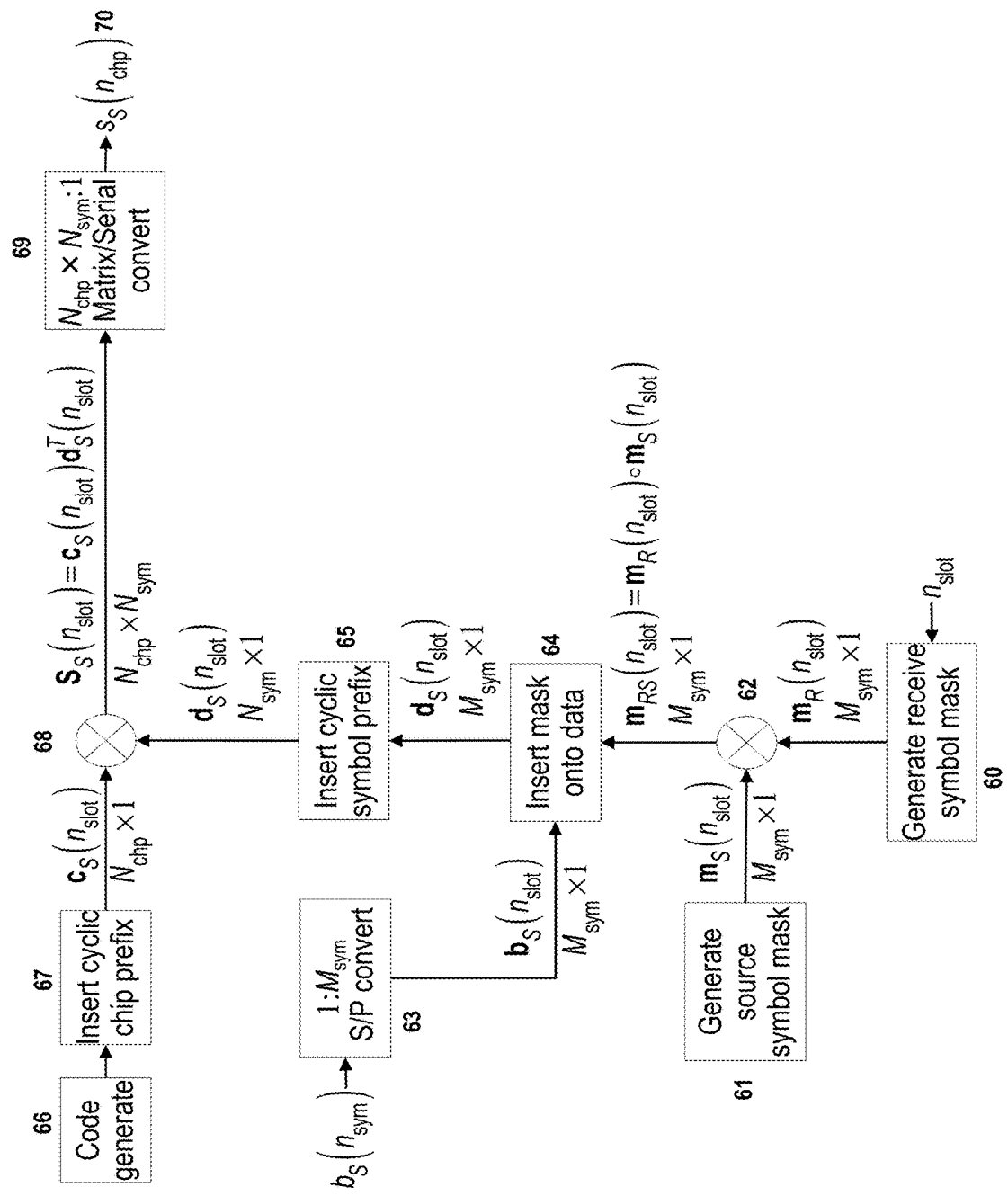
FIG. 11 is a drawing of the logical and computational processes that implement the CPDS Spreader (again, in one embodiment comprising digital signal processing hardware) for each downlink transmitter used in the long-range M2M network embodiment shown in FIG. 5, and for the time-frequency framing structure shown in FIG. 6.

FIG. 11, in one embodiment, is the drawing of the logical and computational processes that implement the CPDS Spreader (again, in one preferred embodiment, comprising digital signal processing hardware) for each downlink transmitter used in the preferred long-range M2M network embodiment shown in FIG. 5, and for the time-frequency framing structure shown in FIG. 6 (which in one embodiment is 902-928 MHz), differs chiefly from FIG. 10 in that the transformations are for each time slot $n_{slot}$ rather than each time frame $n_{frame}$.

Figure 12:
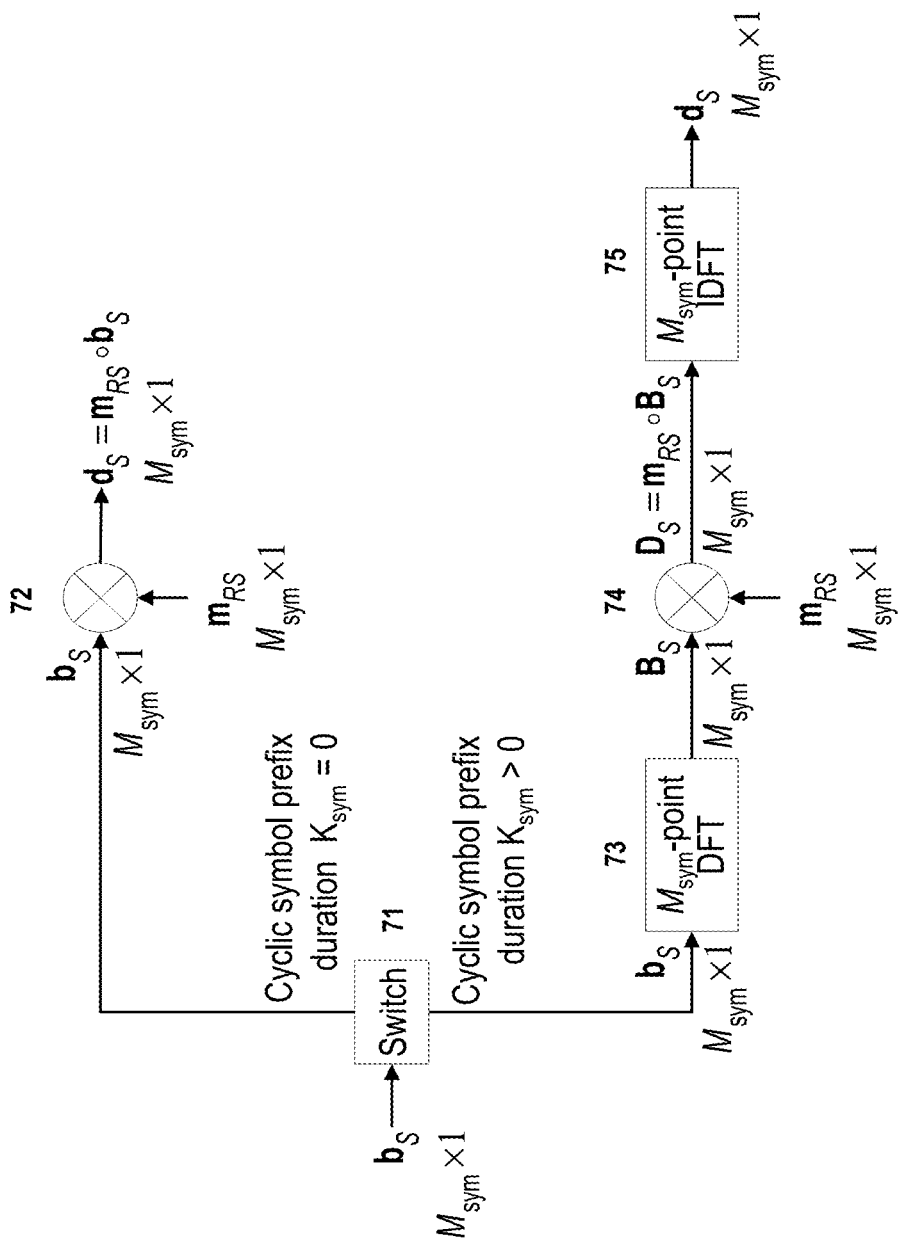
FIG. 12 is a drawing of the logical and computation processes that insert a symbol mask onto the baseband data stream input to the CPDS spreader. This Figure furthermore shows the criteria for adding that symbol mask directly to the baseband data in the 'time domain', or to the data in the 'frequency domain' via incorporation of discrete Fourier transform ('DFT') and inverse DFT ('DFT') operations.

FIG. 12, in one embodiment, is the drawing of the logical and computation processes that insert the symbol mask (64) onto the baseband data stream input to the CPDS spreader, and furthermore shows the criteria for adding that symbol mask directly to the baseband data in the 'time domain', or to the data in the 'frequency domain' via incorporation of discrete Fourier transform ('DFT') and inverse DFT ('IDFT') operations. In this Figure, the frame and dwell indices shown in FIG. 10 for the uplink spreader parameters are not shown, but are understood to be present; and the slot index shown in FIG. 11 for the downlink spreader parameters are not shown, but are understood to be present. The $M_{sym} \times 1$ source baseband vector $b_S$ is first passed through a switch (71), which determines the manner in which the symbol mask is to be inserted. On the upper path (connecting the switch (71) to multiplier element (72)), the $M_{sym} \times 1$ symbol mask $m_{RS}$ is applied directly to $M_{sym} \times 1$ source baseband vector $b_S$ in the 'time domain' using an element-wise multiplication operation (72), resulting in $M_{sym} \times 1$ source data vector $d_S$ given by $d_S = m_{RS} \circ b_S$, where '$\circ$' denotes the element-wise or Schur matrix product operation. On the lower path (connecting the switch (71) to the 'DFT' element (73)), the $M_{sym} \times 1$ symbol mask $m_{RS}$ is applied to the $M_{sym} \times 1$ source baseband vector $b_S$ in the 'frequency domain', by applying an $M_{sym}$-point discrete Fourier transform (DFT) operation to $b_S$ (73), resulting in $M_{sym} \times 1$ source baseband subcarrier vector $B_S$; applying $m_{RS}$ to $B_S$ using an element-wise multiplication operation (74), resulting in $M_{sym} \times 1$ source data subcarrier vector $D_S = m_{RS} \circ B_S$; and applying an $M_{sym}$-point inverse DFT (IDFT) to $D_S$ (75), resulting in $M_{sym} \times 1$ source data vector $d_S$.

Preferentially, the symbol mask is applied to the source baseband vector in the 'time domain' if a cyclic symbol prefix is not inserted in to the source data vector (step (65) shown in FIG. 10 or FIG. 11), i.e., if the cyclic symbol prefix duration $K_{sym} = N_{sym} - M_{sym} = 0$, and the symbol mask is applied to the source baseband vector in the 'frequency domain' if the cyclic symbol prefix is inserted in to the source data vector, i.e., if the cyclic prefix duration $K_{sym} > 0$. However, it should be understood that either insertion method, or any other insertion method that allows the symbol mask to be easily removed at the despreader, can be employed in one embodiment by the embodiments in the present description and that the switch (71) can be interpreted as an actual operation that is explicitly instantiated in the transmitter, or as a choice of insertion methods that can be implemented at the transmitter in one instantiation or another. It should also be understood that the DFT operation (73) can also be dispensed with if the source baseband vector $b_S$ is itself defined in the 'frequency domain,' e.g., as the subcarriers of an OFDM or OFDM-like modulation format.

Figure 13:
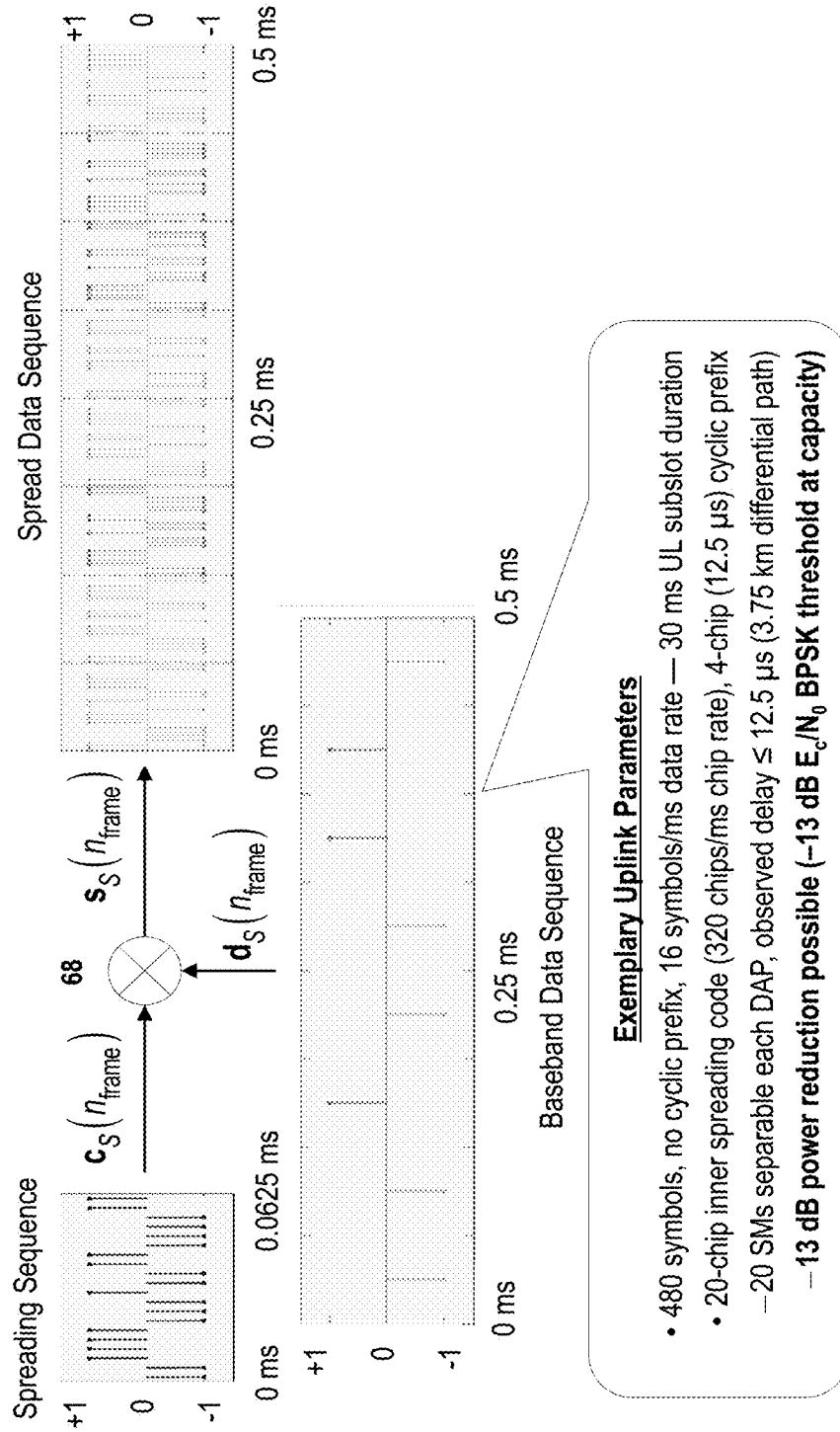
FIG. 13 shows finer detail of the spreading of the signal within the structure on the exemplary CPDS uplink.

FIG. 13, the drawing of the finer detail of the spreading of the signal (68) within the structure on the exemplary CPDS uplink, shows how in one embodiment as exemplary Uplink Parameters, it uses 480 symbols, has no cyclic prefix, has 16 symbols/ms for a 30 ms UL hop dwell/slot; incorporates a 20-chip inner spreading code (effecting thereby a 320 chips/ms chip-rate) and for that has a 4-chip (12.5 ms) cyclic prefix. This would enable, for the network, some 20 separable SM's for each DAP, with an observed delay less than 12.5 μs, tolerating a 3.75 km path spread with timing advancement to the nearest DAP of 10 km cells.

Figure 14:
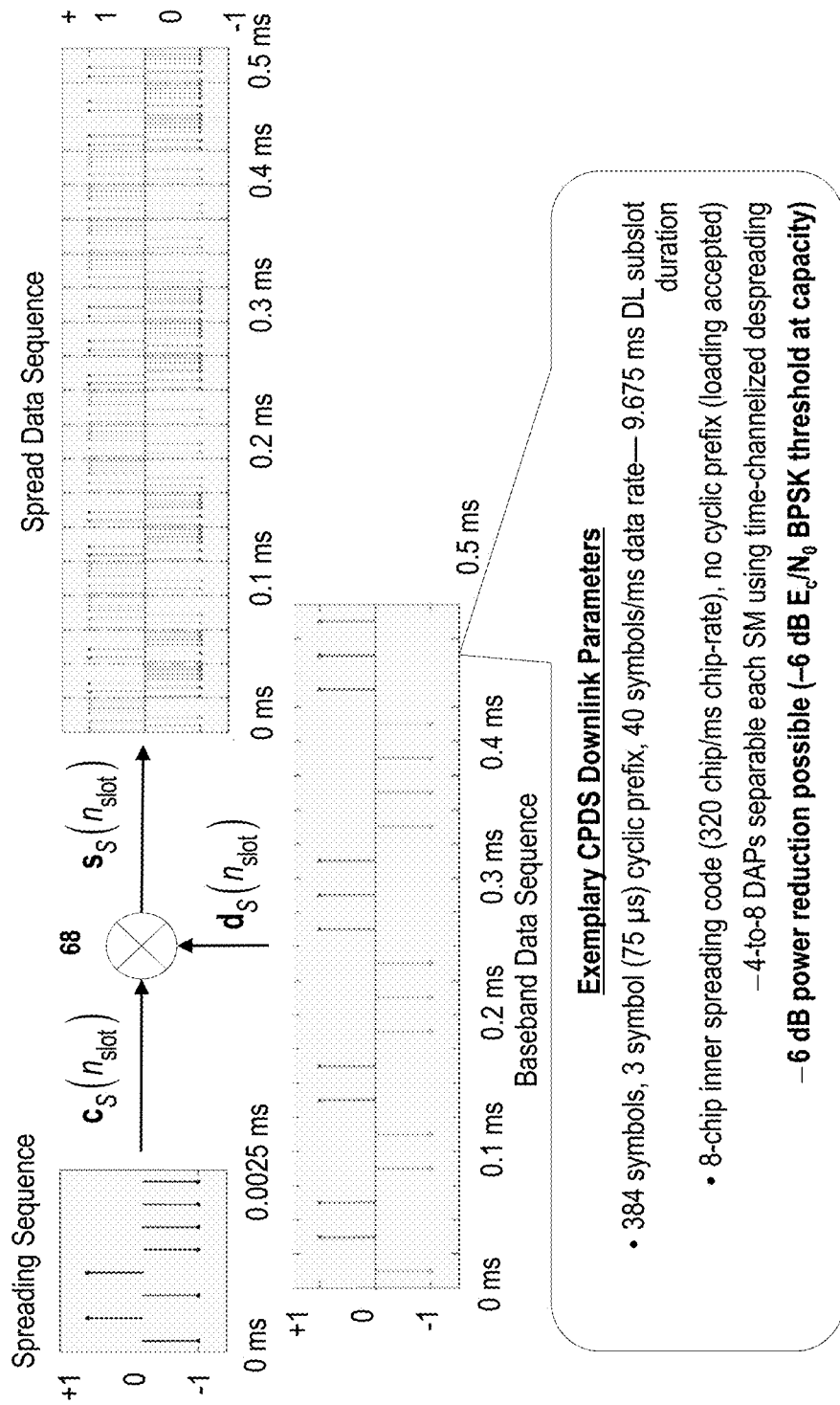
FIG. 14 shows the finer detail of the spreading of the signal within the structure during a downlink.

In one embodiment, FIG. 14, the drawing of the finer detail of the spreading of the signal (68) within the structure during a downlink, shows how in one embodiment, as exemplary downlink Parameters, it uses 384 symbols, incorporates a 3 symbol (75 μs) cyclic prefix, 40 symbols/ms for a 9.675 ms DL hop dwell/slot, incorporates an 8-chip inner spreading code (320 chips/ms chip-rate), and for that has no cyclic prefix (loading accepted). This may enable, for the network, between 4-to-8 DAP's separable for each SM using time-channelized despreading with an observed 6 dB power reduction possible (−6 dB $E_c/N_0$ BPSK threshold at capacity).

Figure 15:
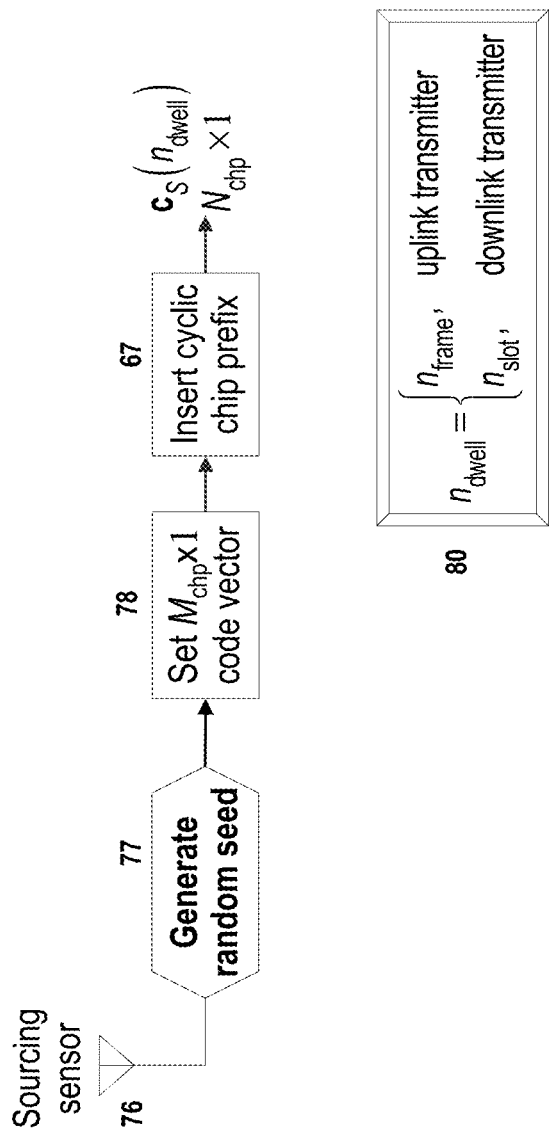
FIG. 15 shows a CPDS-enabled network element with a real-world, random-number, sourcing-sensor element for modifying the coding.

In one embodiment, FIG. 15, the drawing showing a CPDS-enabled network element with a real-world, random-number, sourcing-sensor element for modifying the coding, shows how the real-world, random-number, sourcing sensor (76) provides a truly random kernel input using real-world chance events which is used to generate a random seed (777) from which the spreading code is generated randomly over every transmit opportunity (every time frame $n_{frame}$ on the uplink, and every time slot $n_{slot}$ on the downlink); applying this to a code vector (78) and then adding a cyclic chip prefix (67) then provided to the CPDS spreader (21), thereby providing physical, or 'reality-based' security rather than algorithmic or model-based security.

Figure 16:
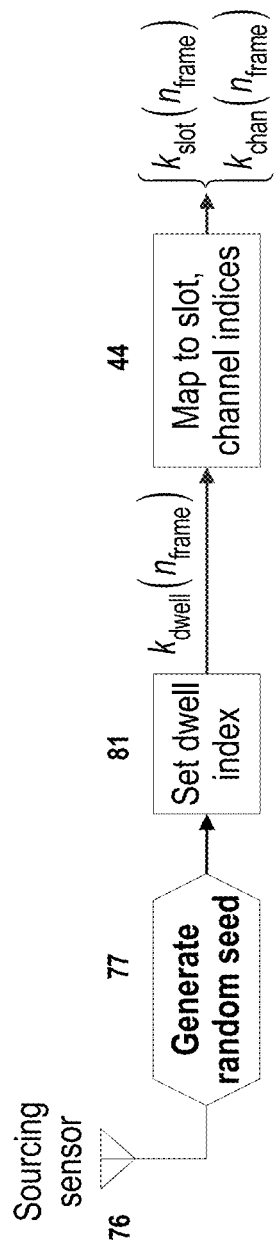
FIG. 16 shows a CPDS-enabled network element with a real-world, random-number, sourcing-sensor element for setting the dwell index.

In one embodiment, FIG. 16, the drawing showing a CPDS-enabled network element with a real-world, random-number, sourcing-sensor element for setting the dwell index, shows how the real-world, random-number, sourcing sensor (76) provides a truly random kernel input using real-world chance events which is used to generate a random seed (77) which is used to set the dwell index (81) for each frame which is then mapped over slot and channel indices (44) which are then provided to the CPDS uplink transmitter, again providing physical, or 'reality-based' security rather than algorithmic or model-based security.

Figure 17:
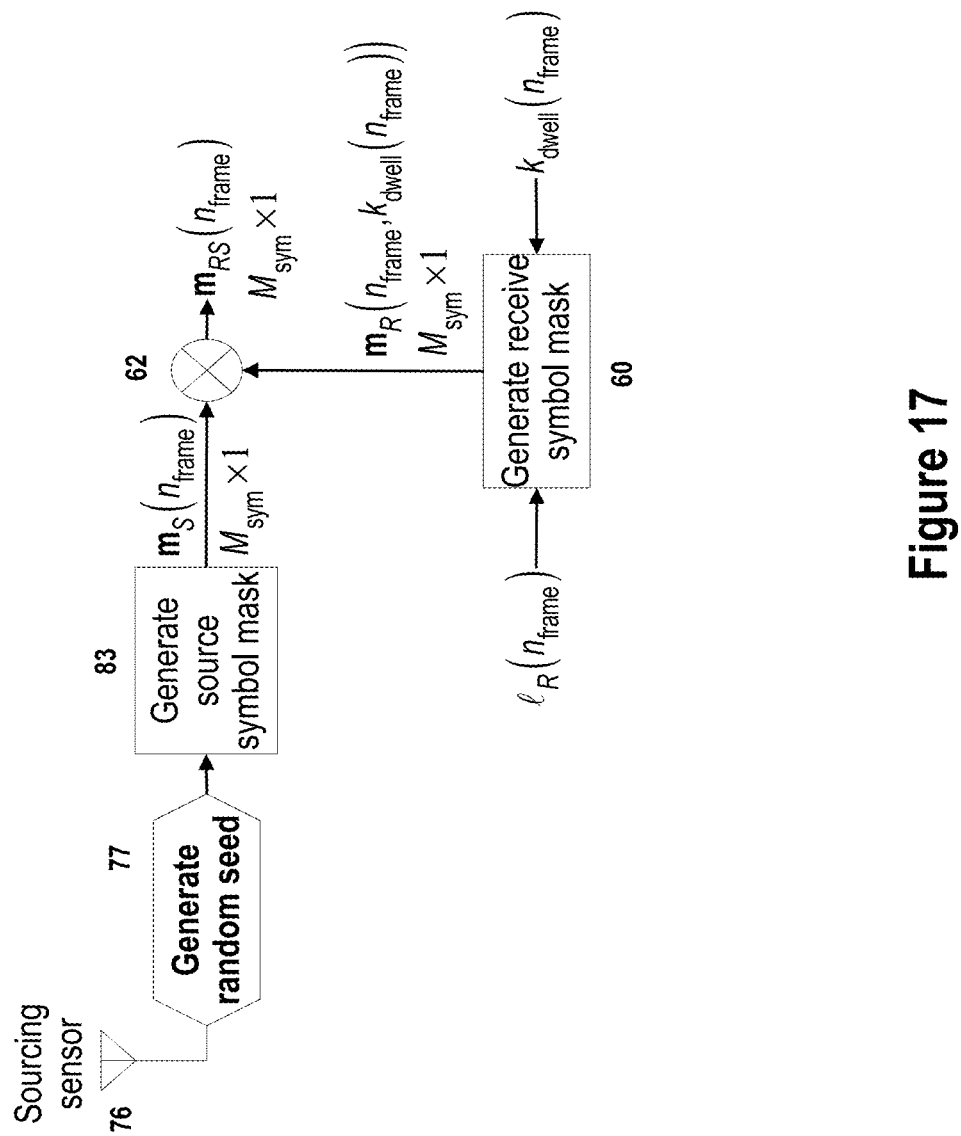
FIG. 17 shows a CPDS-enabled network element with a real-world, random-number, sourcing-sensor element by which elements of the source symbol mask, e.g., a cyclic frequency offset are generated randomly.

In one embodiment, FIG. 17, the drawing showing a CPDS-enabled network element with a real-world, random-number, sourcing-sensor element that provides a truly random kernel input from a sourcing sensor using real-world chance events (76) from which elements of the source symbol mask, e.g., a cyclic frequency offset, are generated randomly, shows how the generated random seed (77) is used to generate the source symbol mask (83), along with the intended uplink receiver index at frame $n_{frame}$ ($l_R(n_{frame})$) and physical time-frequency dwell index at frame $n_{frame}$ ($k_{dwell}(n_{frame})$) which are combined to generate the receive symbol mask (60), and then the two symbol masks (source and receive) are combined (62) with the result then provided to the CPDS uplink spreader, again providing physical, or 'reality-based' security rather than algorithmic or model-based security.

Figure 18:
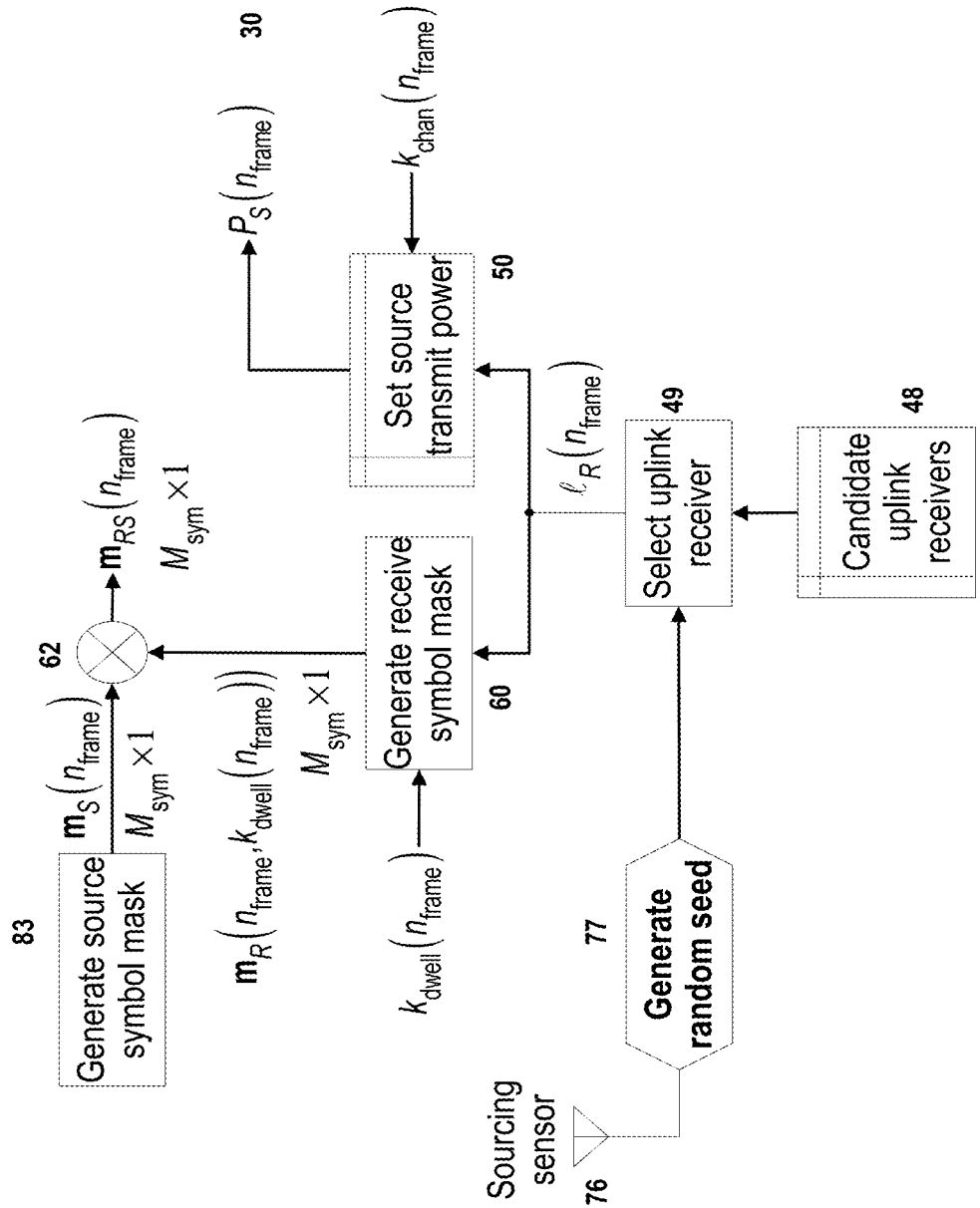
FIG. 18 shows a CPDS-enabled network element with a real-world, random-number, sourcing-sensor element by which the intended uplink receiver is selected randomly from a set of candidate uplink receivers over every time frame in a randomizer element and then provided to the CPDS uplink spreader.

In one embodiment, FIG. 18, the drawing showing a CPDS-enabled network element with a real-world, random-number, sourcing-sensor element that provides a truly random kernel input from a sourcing sensor using real-world chance events (76) from which the intended uplink receiver is selected randomly from a set of candidate uplink receivers, shows how the generated random seed (77) is used to select the uplink receiver at frame $n_{frame}$ ($l_R(n_{frame})$) (49), which is used along with the physical time-frequency dwell index at frame $n_{frame}$ ($k_{dwell}(n_{frame})$) to generate the receive symbol mask (60), which is combined (62) with the source symbol mask (83), and which is further used along with the channel frequency index at frame $n_{frame}$ ($k_{chan}(n_{frame})$) to set the source transmit power at frame $n_{frame}$ ($P_S(n_{frame})$) (30) from a database of transmit powers required to close the link to the intended uplink receiver (50), again providing physical, or 'reality-based' security rather than algorithmic or model-based security.

Figure 19:
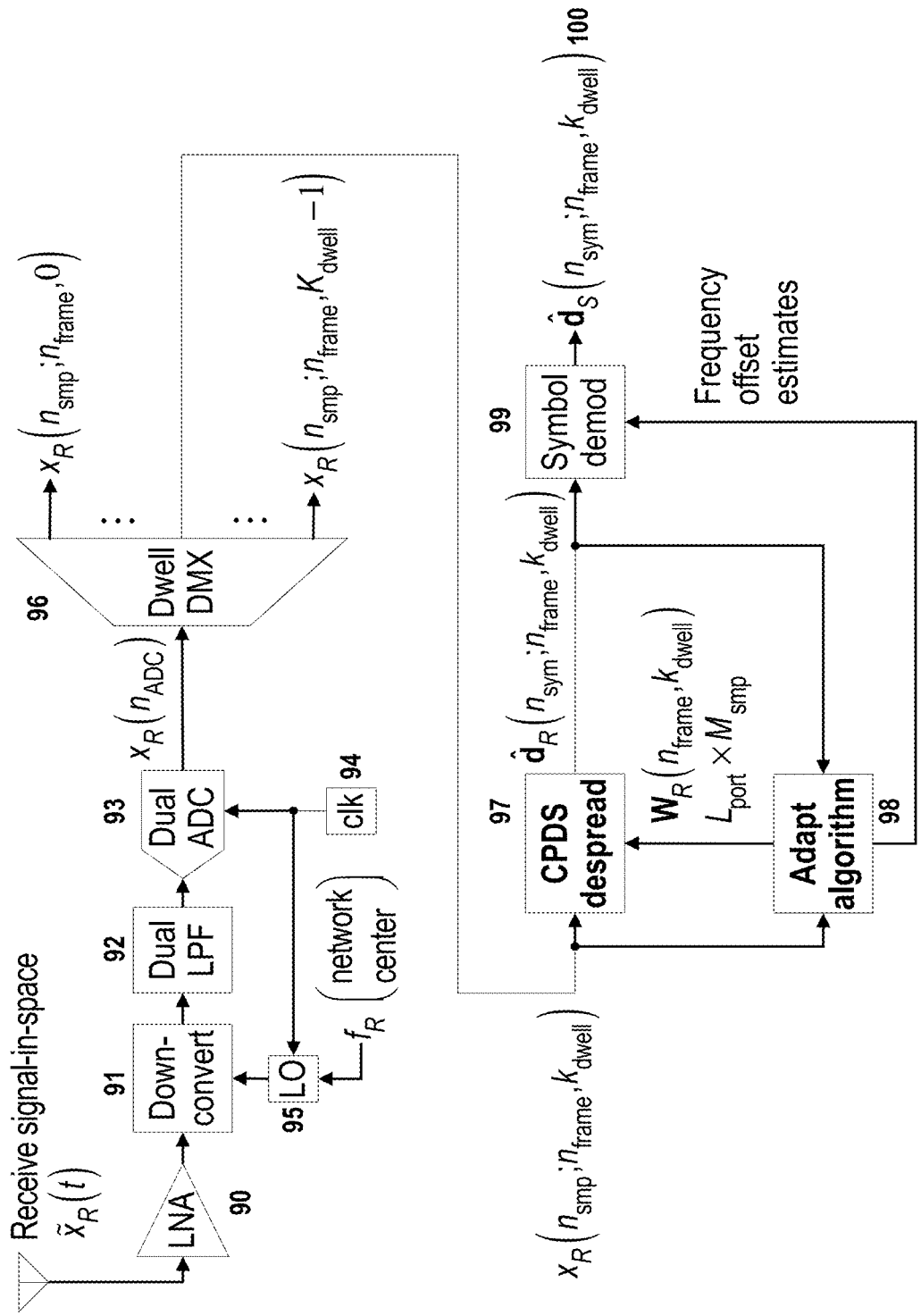
FIG. 19 is a drawing of the hardware implementation at each cyclic-prefix Direct-Sequence (CPDS) uplink receiver used in the long-range M2M network embodiment.

In one embodiment, FIG. 19, the drawing of the hardware implementation at each cyclic-prefix Direct-Sequence (CPDS) uplink receiver used in the preferred long-range M2M network embodiment, shows whereby the incoming received signal-in-space is received by at least one antenna and low-noise amplifier ('LNA') (90), down-converted to complex baseband representation (91) ((in-phase and quadrature analog waveforms) using a local oscillator ('LO') (95) tuned to a single frequency (preferentially, the center of the network), whereby the in-phase and quadrature analog waveforms are filtered using a dual lowpass filter ('LPF') (92), sampled at a rate (driven by clock (94)) preferentially sufficiently high enough digitize the entire network bandwidth without aliasing using a dual analog-to-digital convertor ('ADC') (93), and digitally demultiplexed into physical time-frequency dwells (separated into time slots and frequency channels) accessible to the receiver (96); and whereby each physical dwell is passed through an uplink CPDS despreader (97), modified with a feedback loop through an adaptation algorithm (98), and each resulting symbol stream is fed through to a symbol demodulator (99) that incorporates the frequency offset estimates also provided by the adaptation algorithm for environmental delay/degradation effects actually observed by the receiving machine.

Figure 20:
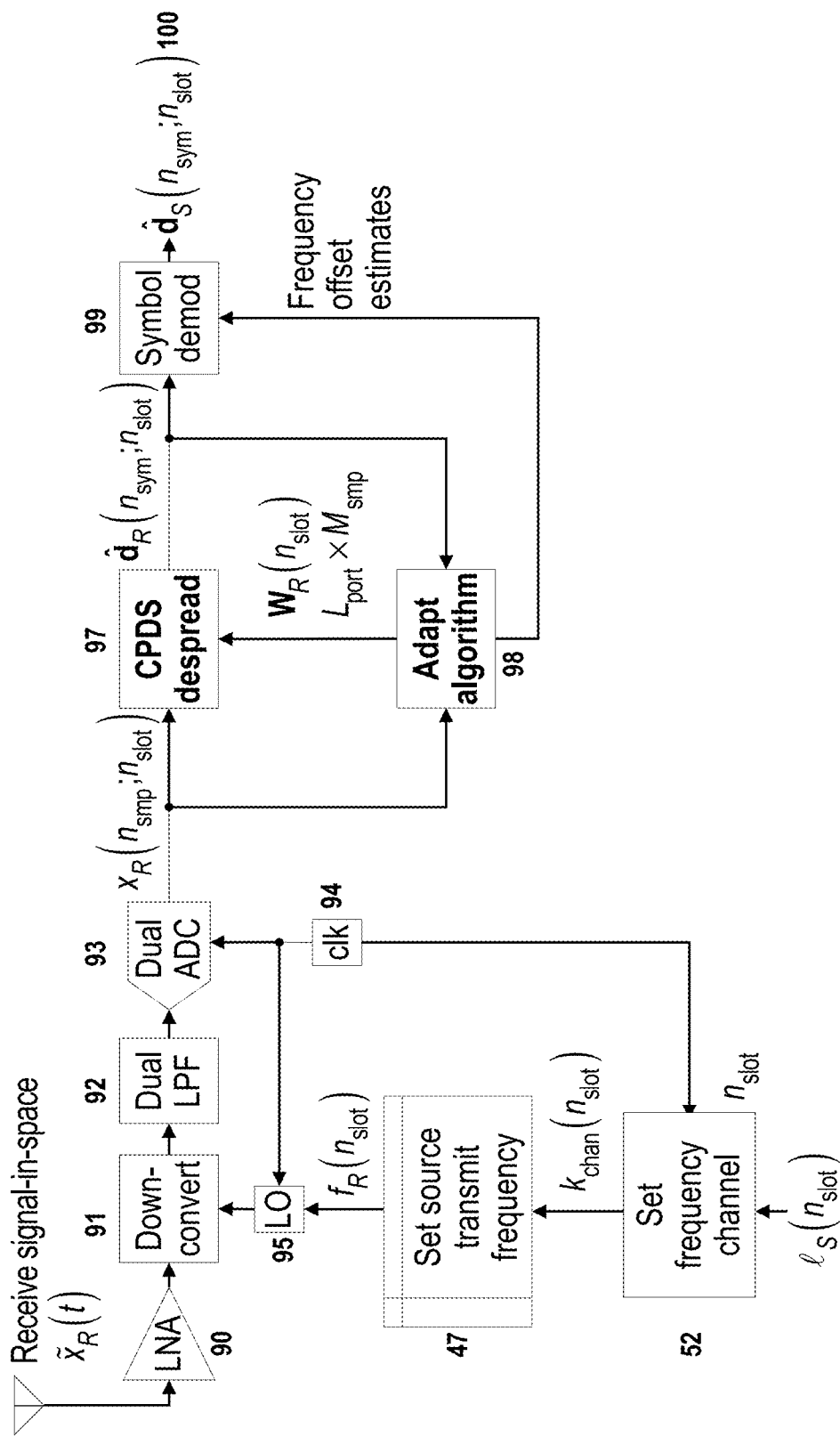
FIG. 20 is a drawing of the hardware implementation at each CPDS downlink receiver used in the long-range M2M network embodiment.

In one embodiment, FIG. 20, the drawing of the hardware implementation at each CPDS downlink receiver used in the long-range M2M network embodiment, shows whereby the incoming received signal-in-space is received by at least one antenna and LNA (90), down-converted to complex baseband representation (91) using an LO (95) tuned on each time slot $n_{slot}$ to the center of the known frequency channel used by the downlink transmitter on that slot, $f_R(n_{slot})$, and digitized using dual LPF (92) and dual ADC (93) operations over that time slot; and whereby that time slot of data is passed through the downlink CPDS despreader (97) (modified with a feedback loop through an adaptation algorithm (98)), and the resulting symbol stream is fed through to a symbol demodulator (99) that incorporates the frequency offset estimates also provided by the adaptation algorithm for environmental delay/degradation effects actually observed by the receiving machine.

Figure 21:
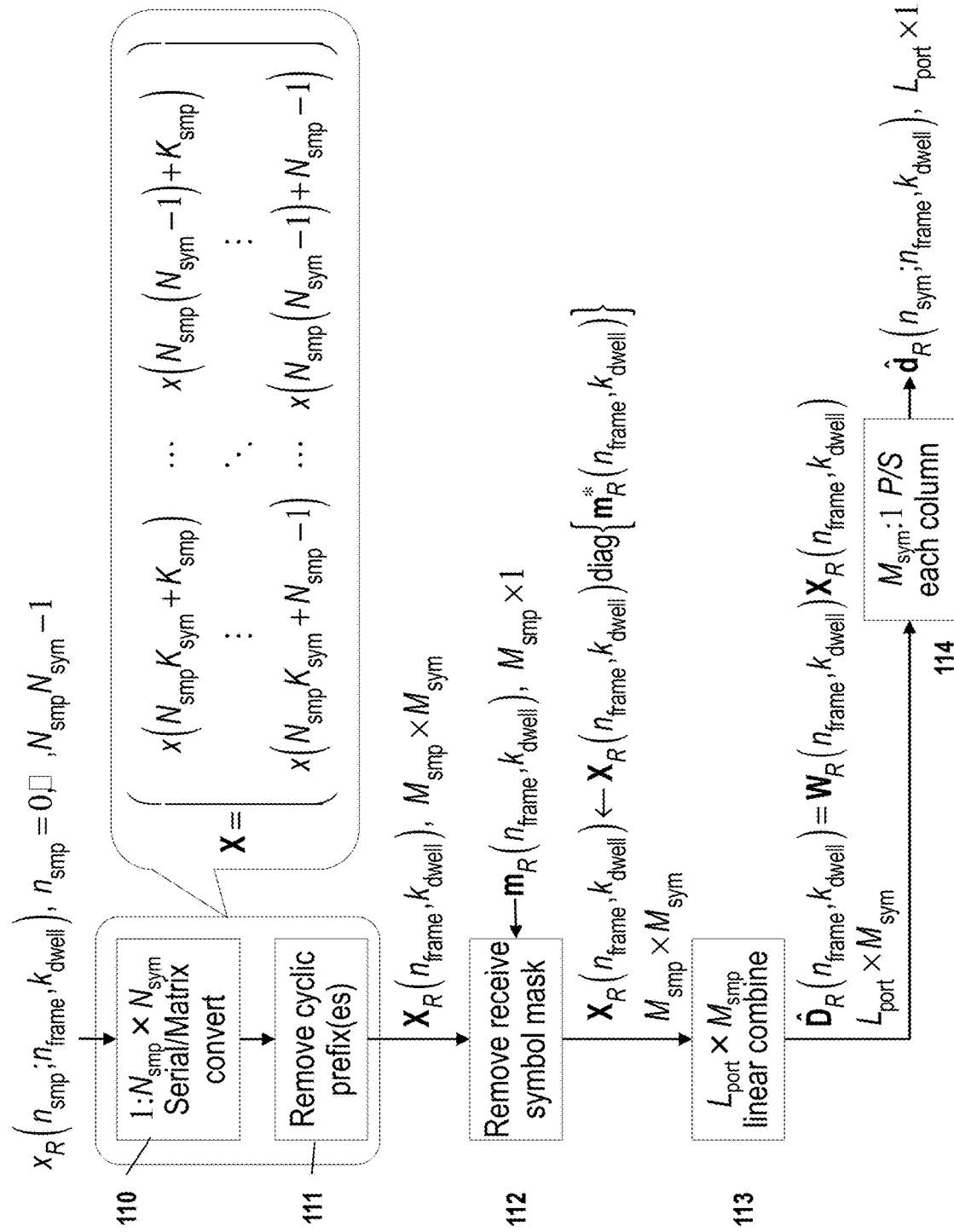
FIG. 21 is a drawing of the CPDS despreading procedure implemented (in any combination of hardware and software elements) on each time-frequency channel accessed by an uplink receiving device in the network.

FIG. 21, in one embodiment, is the drawing of the CPDS despreading procedure (97) of FIG. 19 implemented (in any combination of hardware and software elements) on each time-frequency channel accessed by an uplink receiving machine in the network, if the symbol mask is applied to the baseband source data in the time domain as shown in the upper symbol mask insertion path in FIG. 12, preferentially performed if the cyclic symbol prefix duration is equal to 0 ($K_{sym}=0$). The $N_{smp}N_{sym}$-sample received signal sequence $\{x_R(n_{smp};n_{frame},k_{dwell})\}_{n_{smp}=0}^{N_{smp}N_{sym}-1}$ output from the dwell demultiplexer (shown in FIG. 19, element (96)) over dwell $k_{dwell}$ and time frame $n_{frame}$ (where $N_{sym}$ is the number of source data symbols transmitted in the dwell and $N_{smp}$ is the number of demultiplexer output samples per source data symbol) is despread by the steps of:

Performing a 1:$N_{smp} \times N_{sym}$ serial/matrix conversion (110) on the demultiplexer output signal sequence $\{x_R(n_{smp}; n_{frame},k_{dwell})\}_{n_{smp}=0}^{N_{smp}N_{sym}-1}$, and removing the $K_{smp}$-sample cyclic chip prefix and (if applied at the transmitter) the $K_{sym}$-symbol cyclic symbol prefix from the $N_{smp} \times N_{sym}$ matrix resulting from that serial/matrix conversion operation (111), resulting in $M_{smp} \times M_{sym}$ received signal matrix $X_R(n_{frame},k_{dwell})$, given mathematically by $$X = \begin{pmatrix} x(N_{smp}K_{sym}+K_{smp}) & \cdots & x(N_{smp}(N_{sym}-1)+K_{smp}) \\ \vdots & \ddots & \vdots \\ x(N_{smp}K_{sym}+N_{smp}-1) & \cdots & x(N_{smp}(N_{sym}-1)+N_{smp}-1) \end{pmatrix}$$

for general received data sequence $\{x(n_{smp})\}_{n_{smp}=0}^{N_{smp}N_{sym}-1}$, and where $K_{smp}=N_{smp}-M_{smp}$ is the number of demultiplexer output samples covering the cyclic chip prefix.

Removing the $M_{sym} \times 1$ receive symbol mask vector $m_R(n_{frame},k_{dwell})$ mask vector over dwell $k_{dwell}$ and time frame $n_{frame}$ from the received signal matrix $X_R(n_{frame},k_{dwell})$ (112), given mathematically by $$X_R(n_{frame},k_{dwell}) \leftarrow X_R(n_{frame},k_{dwell})\text{diag}\{(m_R^*(n_{frame},k_{dwell})\}$$

where diag{•} is the vector-to-diagonal matrix conversion operation and (•)* is the complex conjugation operation, resulting in $M_{smp} \times M_{sym}$ demasked signal matrix $X_R(n_{frame},k_{dwell})$.

Figure 23:
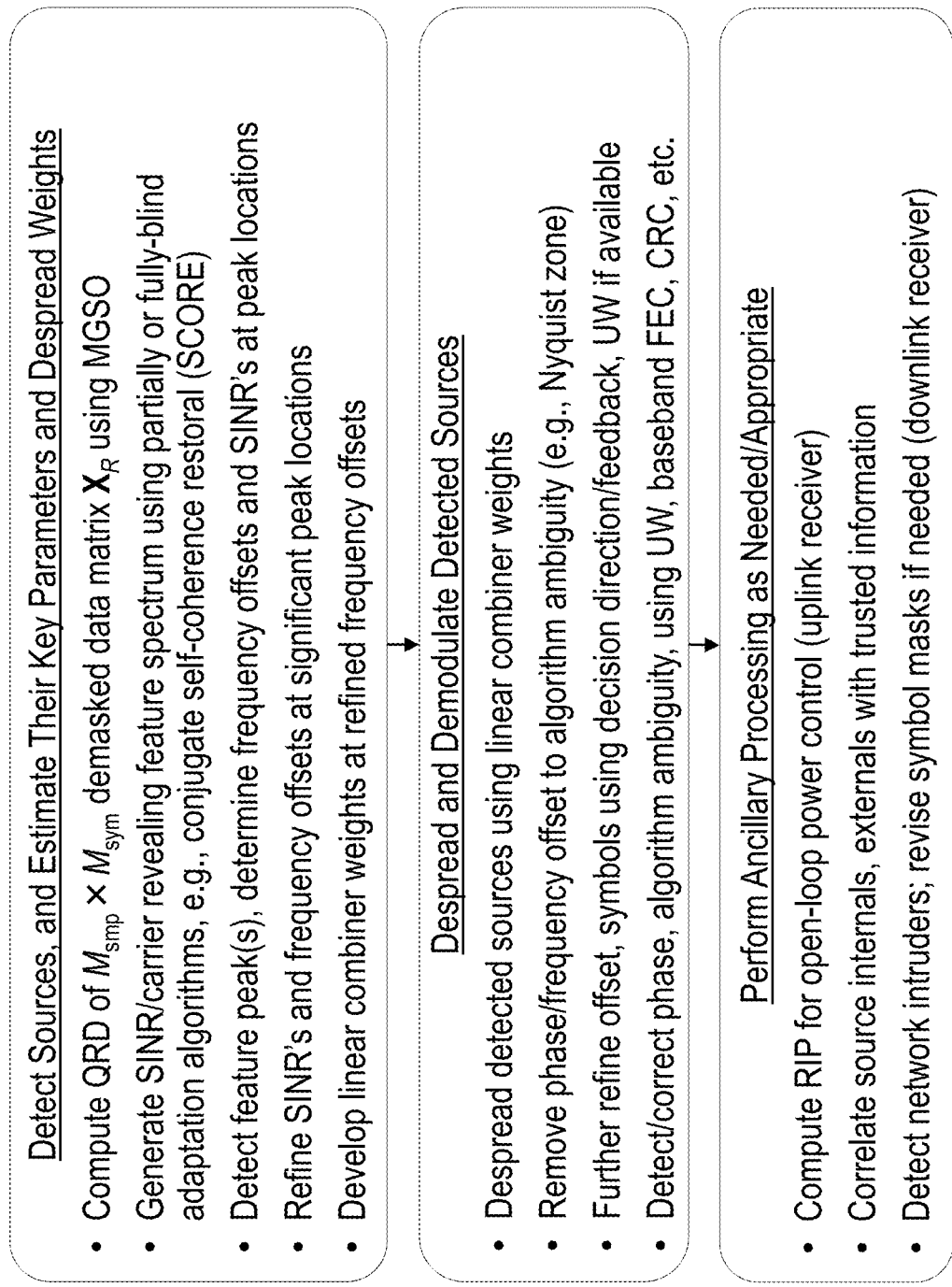
FIG. 23 describes the procedure used to adapt the CPDS despreader in one embodiment.

Perform a linear combining operation on demasked signal matrix (113), given mathematically by $$\hat{D}_R(n_{frame},k_{dwell})=W_R(n_{frame},k_{dwell})X_R(n_{frame},k_{frame}),$$

where $W_R(n_{frame},k_{dwell})$ is an $L_{port} \times M_{smp}$ linear combining matrix, computed as part of the adaptation procedure shown in FIG. 23, that substantively despreads the source symbols transmitted to the receiver over dwell $k_{dwell}$ and time frame $n_{frame}$, and to which the symbol mask $m_R(n_{frame},k_{dwell})$ has been inserted, resulting in $L_{port} \times M_{sym}$ despread symbol matrix $\hat{D}_R(n_{frame},k_{dwell})$.

Apply $M_{sym}$:1 parallel-to-serial (P/S) conversion operation (114) to each column of $\hat{D}_R(n_{frame},k_{dwell})$, resulting in $1 \times L_{port}$ despread symbol sequence vectors $\{\hat{d}_R(n_{sym}; n_{frame},k_{dwell})\}_{n_{sym}=0}^{M_{sym}-1}$.

Figure 22:
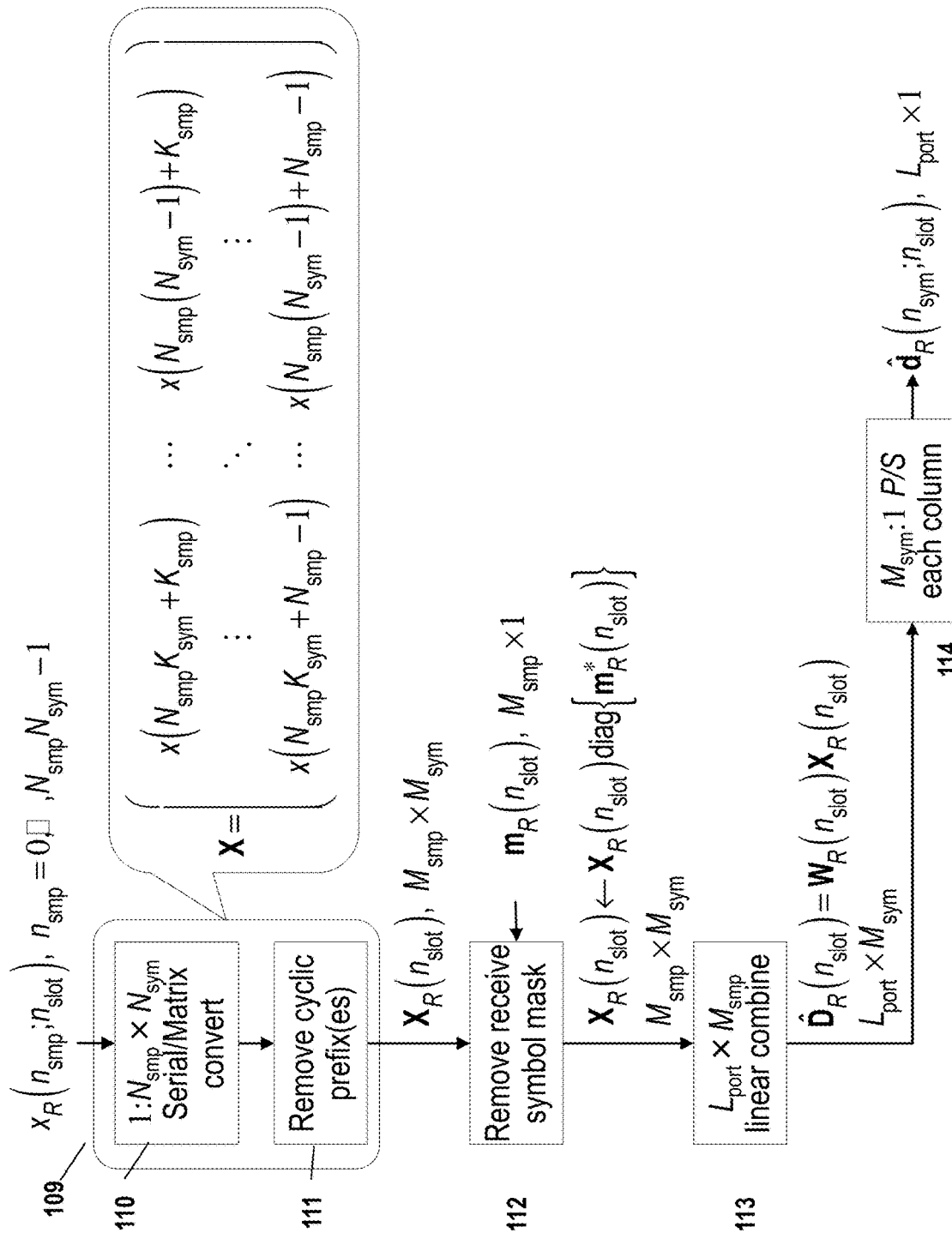
FIG. 22 is a drawing of the CPDS despreading procedure implemented (in any combination of hardware and software elements) on each time-slot accessed by a downlink receiving device in the network.

FIG. 22, in one embodiment, is the drawing of the CPDS despreading procedure (97) of FIG. 20 implemented (in any combination of hardware and software elements) on each time-slot accessed by a downlink receiving machine in the network; and differs chiefly from FIG. 21 in that the transformations are for each time slot $n_{slot}$ rather than each time frame $n_{frame}$.

FIG. 23, in one embodiment, shows the procedure used to adapt the uplink despreader (97) shown in FIG. 21, and at the downlink despreader (97) structure shown in FIG. 22, by:

1$^{st}$: Detecting all sources intended for the receiver, estimating key parameters of those signals, and developing linear combining weights that can substantively despread the source symbols, said operations comprising:
  1.A computing the QR decomposition (QRD) of the $M_{smp} \times M_{sym}$ received signal $X_R$, resulting after removal of cyclic prefix(es) (111) and the receive symbol mask (112);
  1.B generating an SINR/carrier revealing feature spectrum that can (i) estimate the maximum attainable despread signal-to-interference-and-noise ratio ('maximum despreader SINR') of each signal impinging on the receiver that is employing the receive symbol mask ('authorized signals'), given the received spreading code (source spreading code, modulated by the transmission channel) of each signal and interference impinging on the receiver at the dwell and time-frame being monitored by the receiver, (ii) as a function of observed frequency offset of that signal, and (iii) provide statistics that can be used to develop linear combining weights that can substantively achieve that max-SINR, without knowledge of the received spreading code for any of those signals, and without knowledge of the background noise and interference environment;
  1.C detecting $L_{port}$ significant peak(s), in the SINR/carrier revealing feature spectrum, and determining the maximum despreader SINR and frequency offset of each peak;
  1.D refining strengths (estimated maximum despreader SINR) and locations (estimated frequency offsets) of each significant peak, e.g., using Newton search methods; and
  1.E developing $L_{port} \times M_{smp}$ linear combiner weight matrices $W_R$ that can substantively achieve the maximum despreader SINR for each authorized signal, without knowledge of the received spreading code for any of those signals, and without knowledge of the background noise and interference environment.

Then:

2$^{nd}$: Despreading and demodulating the detected sources, said operations comprising:
  2.A Substantively despreading the sources detected in Step 1.C, by multiplying the demasked signal matrix provided at the output of (112) in FIG. 21 and FIG. 22 by the substantively despreading linearly combining linear combiner weights computed in Step 1.E, said matrix multiplication operation shown in element (113) in FIG. 21 and FIG. 22.
  2.B Substantively remove frequency offset from the despread symbols, using the frequency offset estimates computed in Step 1.D.
  2.C Estimate and correct phase offsets, and further refine frequency offsets to algorithm ambiguity using known features of the source symbols, e.g., adherence to known symbol constellations, unique words (UW's) and training sequences embedded in the source symbols, known properties of the source symbol mask, etc.;
  2.D Remove algorithm ambiguity using additional features of the source symbols, e.g., UW's, forward error correction (FEC), cyclic redundancy check's (CRC's), etc.; and
  2.E Decrypt traffic and protected medium access control (MAC) data.

Then:

3rd: Perform ancillary processing as needed/appropriate:
  3.A Compute received incident power (RIP) for open-loop power control, using SINR and channel estimates provided by the CPDS despreading algorithm (uplink receiver);
  3.B Correlate source internals, externals with trusted information, using dwell, intended receiver and source symbol mask elements provided by the CPDS receiver and despreading algorithm; and
  3.C Detect network intrusions—revise symbol masks if needed (downlink receiver).

Figure 24:
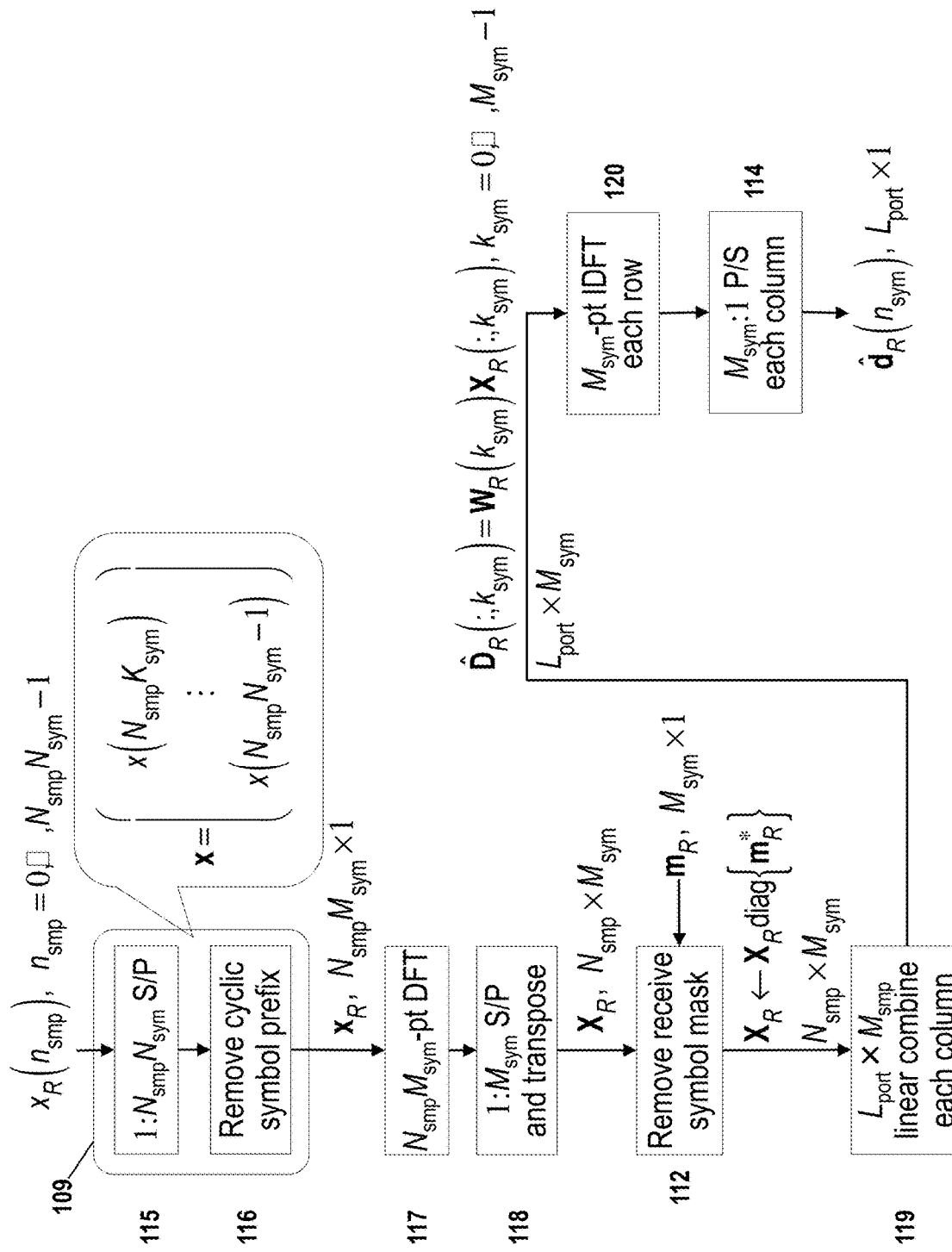
FIG. 24 is a drawing of the computational and logical processes used to perform CPDS despreading if a cyclic symbol prefix is added to the CPDS transmit signal and the observed path delay at the CPDS receiver is greater than the duration of the cyclic chip prefix.

FIG. 24, in one embodiment, is the drawing of the CPDS despreading procedure implemented (in any combination of hardware and software elements) on each time-frequency channel accessed by an uplink receiving machine in the network, if the symbol mask is applied to the baseband source data in the frequency domain as shown in the lower symbol mask insertion path in FIG. 12, preferentially performed if the cyclic symbol prefix is greater than 0 ($K_{sym}>0$). The $N_{smp}N_{sym}$-sample received signal sequence $\{x_R(n_{smp})\}_{n_{smp}=0}^{N_{smp}N_{sym}-1}$ input to the despreader is despread by the steps of:

Passing $\{X_R(n_{smp})\}_{n_{smp}=0}^{N_{smp}N_{sym}-1}$ through a 1:$N_{smp}N_{sym}$ serial-to-parallel (S/P) converter (115), and removing the first $K_{sym}$ symbols ($N_{smp}K_{sym}$ samples) encompassing the cyclic symbol prefix from the resultant $N_{smp}N_{sym} \times 1$ S/P output vector (116), resulting in $N_{smp}M_{sym} \times 1$ received data vector $x_R$.

Performing a $N_{smp}M_{sym}$-point discrete Fourier transform (DFT) operation (117) on $x_R$ (thereby converting it to the 'frequency domain'); reshaping the $N_{smp}M_{sym} \times 1$ DFT output vector into an $N_{smp} \times M_{sym}$ matrix using a 1:$M_{sym}$ S/P converter and matrix transpose operation (118), resulting in $N_{smp} \times M_{sym}$ received data matrix $X_R$.

Removing the $M_{sym} \times 1$ receive symbol mask vector $m_R$ mask vector from $X_R$(112), given mathematically by $$X_R \leftarrow X_R \, \text{diag}\{m_R^*\}$$

where diag{•} is the vector-to-diagonal matrix conversion operation and (•)* is the complex conjugation operation, resulting in $N_{smp} \times M_{sym}$ demasked signal matrix $X_R$.

Perform a separate linear combining operation to each column of demasked signal matrix $X_R$(119), given mathematically by $$\hat{D}_R(:,k_{sym}) = W_R(k_{sym})X_R(:,k_{sym}), k_{sym}=0,\ldots,M_{sym}-1,$$

where $W_R(k_{sym})$ is an $L_{port} \times M_{smp}$ linear combining matrix, computed as part of the adaptation procedure shown in FIG. 23, that substantively despreads the DFT bin ('subcarrier') $k_{sym}$ of each of the source symbols detected by the receiver, and to which the symbol mask $m_R$ has been inserted, resulting in $L_{port} \times M_{sym}$ despread symbol subcarrier matrix $\hat{D}_R$.

Apply $M_{sym}$:1-point inverse DFT (IDFT) to each row of $\hat{D}_R$(120), and $M_{sym}$:1 parallel-to-serial (P/S) conversion operation (114) to each column of the resultant IDFT output matrix, resulting in $L_{port} \times 1$ despread symbol sequence vectors $\{\hat{d}_R(n_{sym})\}_{n_{sym}=0}^{M_{sym}-1}$.

Figure 25:
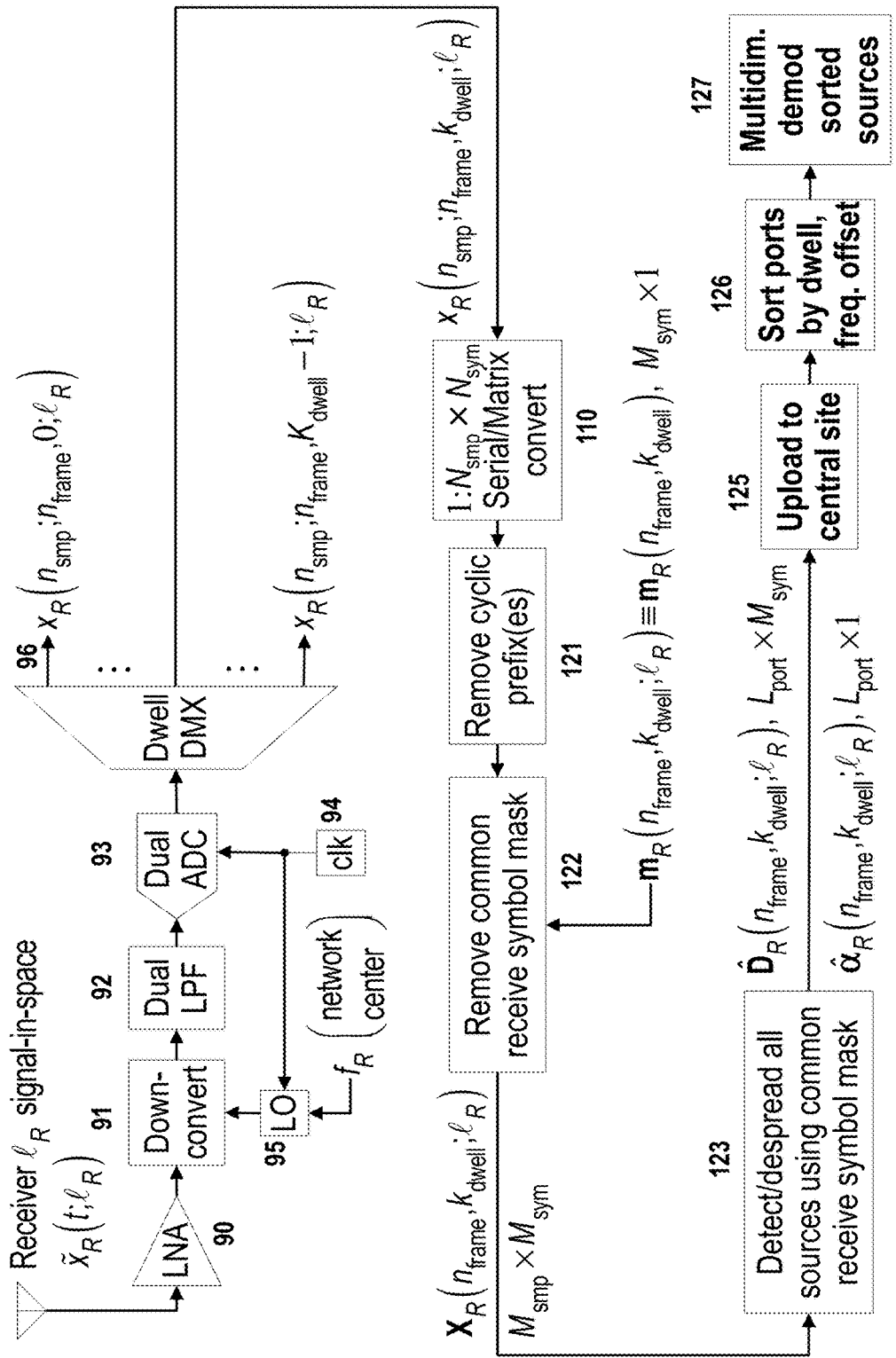
FIG. 25 is a drawing of the hardware and processing steps used in one embodiment to perform weakly-macrodiverse CPDS despreading.

FIG. 25, in one embodiment, is the drawing of the hardware and processing steps used in one embodiment to perform weakly-macrodiverse uplink CPDS despreading. The uplink receiver performs the same uplink reception, dwell demultiplexing, and adaptive despreading operations shown in FIG. 19; the same uplink despreading operations shown in FIG. 21 or FIG. 24 (depending on how the symbol mask is inserted as shown in FIG. 12); and the same despreader adaptation procedure shown in FIG. 23. However, the CPDS network employs a common receive symbol mask (122) at a set of $L_R>1$ uplink receivers in the network, such that the $M_{sym} \times 1$ receive symbol mask $m_R(n_{frame},k_{dwell};l_R)$ used over physical dwell $k_{dwell}$ in time frame $n_{frame}$ at each uplink receiver $\{l_R\}_{l_R=1}^{L_R}$ in that set is identical, i.e., $m_R(n_{frame},k_{dwell};l_R) \equiv m_R(n_{frame},k_{dwell})$ for every receiver in that set.

At uplink receiver $l_R$ used for weakly-macrodiverse uplink despreading, and if the symbol mask is inserted into the baseband source symbols using the time-domain method shown on the upper path of FIG. 12, each signal sequence $\{x_R(n_{smp};n_{frame},k_{dwell};l_R)\}_{n_{smp}=0}^{N_{smp}N_{sym}-1}$ output from the dwell demultiplexer (96) is passed through a serial/matrix converter (110) and a matrix thinning operation to remove the cyclic prefixes from the serial/matrix converted symbol matrix (122), and the common receive symbol mask is removed from the resultant data matrix using the multiplicative operation (112) shown in FIG. 21, resulting in $M_{smp} \times M_{sym}$ demasked data matrix $X_R(n_{frame},k_{dwell};l_R)$. The demasked data matrix is then adaptively despread using the linear combining operation shown in FIG. 21 (113), and using the despreader adaptation procedure shown in FIG. 23 (123), which detects $L_{port}$ sources using the common receive mask; computes an $L_{port} \times 1$ frequency offset vector $\hat{\alpha}_R(n_{frame},k_{dwell};l_R) = [\hat{\alpha}_R(n_{frame},k_{dwell};l_{port},l_R)]_{l_{port}=1}^{L_{port}}$, where $\hat{\alpha}_R(n_{frame},k_{dwell};l_{port},l_R)$ is an estimate of the frequency offset of the signal detected on port $l_{port}$; estimates and substantively despreads the signal detected on each output port, resulting in $L_{port} \times M_{sym}$ despread data matrix $\hat{D}_R(n_{frame},k_{dwell};l_R)$.

The despread data matrix and frequency offset vector from every uplink receiver engaged in weakly-macrodiverse despreading is then uploaded to a central site (125), where the signal ports from each such receiver are sorted by dwell, frequency offset estimate, and other source observables, e.g., cross-correlation properties and known symbol fields, e.g., Unique Words, to associate signals detected at each port with the same source (126), and each sorted source is demodulated into source symbol estimates using a multidimensional demodulation algorithm (127).

If the symbol mask is inserted in the frequency domain, as shown on the lower path of FIG. 12, then the serial/matrix conversion operation (110) and the cyclic prefix(es) removal operation (121) shown in FIG. 25 are replaced by the serial/parallel conversion (115), cyclic symbol prefix removal (116), DFT (117) and serial-to-parallel conversion, and transposition (117) operations shown in FIG. 24, and the frequency offset estimates and despread data matrix output from the column-by-column linear combining (119) and IDFT (120) operations is uploaded to the central site (125).

Figure 26:
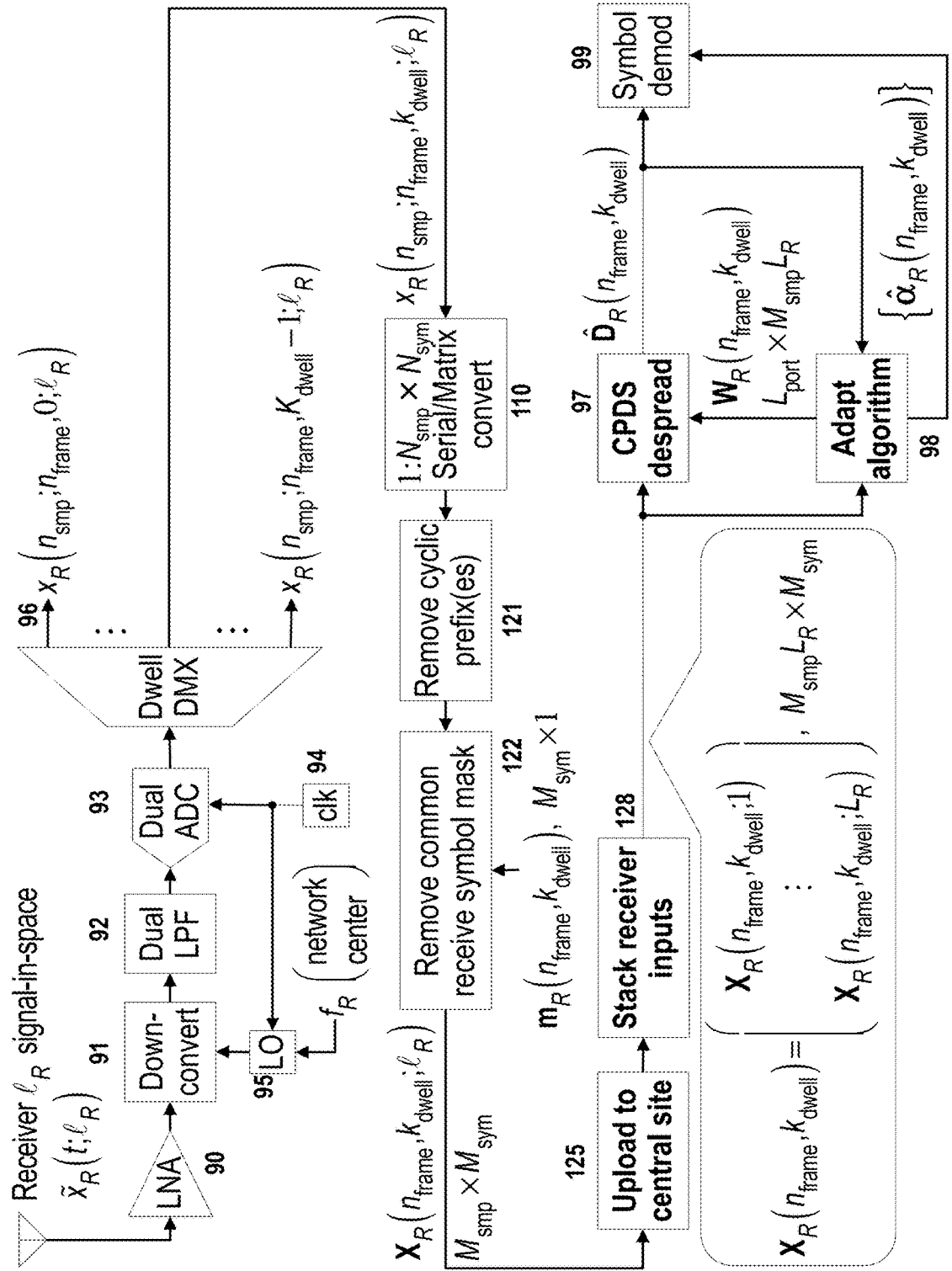
FIG. 26 is a drawing of the hardware and processing steps used in one embodiment to perform strongly-macrodiverse CPDS despreading.

FIG. 26, in one embodiment, is the drawing of the hardware and processing steps used in one embodiment to perform strongly-macrodiverse CPDS despreading. The CPDS network employs the same common receive symbol shown in FIG. 25 mask for a set of $L_R>1$ uplink receivers in the network, and performs the same operations shown in FIG. 25 to generate $M_{smp} \times M_{sym}$ demasked data matrix $X_R(n_{frame},k_{dwell};l_R)$ after removal of that common receive symbol mask (122). The entire demasked data matrix is then uploaded to a central site (125), where it is stacked with the demasked data matrices uploaded from every other receiver using that common receive symbol mask (128), to form $L_R M_{smp} \times M_{sym}$ network data matrix $X_R(n_{frame},k_{dwell})$ given by $$X_R(n_{frame}, k_{dwell}) = \begin{pmatrix} X_R(n_{frame}, k_{dwell}; 1) \\ \vdots \\ X_R(n_{frame}, k_{dwell}; L_R) \end{pmatrix}, \quad \text{(Eq 1)}$$

The network data matrix is then passed to a network-level despreader (97), which employs the adaptation procedure (98) shown in FIG. 23 to detect $L_{port}$ sources using the common receive mask; computes an $L_{port} \times 1$ frequency offset vector $\hat{\alpha}_R(n_{frame},k_{dwell}) = [\hat{\alpha}_R(n_{frame},k_{dwell};l_{port})]_{l_{port}=1}^{L_{port}}$, where $\hat{\alpha}_R(n_{frame},k_{dwell};l_{port})$ is an estimate of the frequency offset of the signal detected on port $l_{port}$; and compute $L_{port} \times M_{smp} L_R$ linear combiner weights $W_R(n_{frame},k_{dwell})$. Those weights are then used to despread the stacked receive data vector (97), resulting in $L_{port} \times M_{sym}$ despread data matrix $\hat{D}_R(n_{frame},k_{dwell})$. It should be noted that the number of output ports $L_{port}$ achievable at the central site can be much higher than the number of output ports achievable at any single site, due to the higher number of linear combiner 'degrees of freedom' $M_{smp} L_R$ available in the stacked receive signal matrix.

Figure 27:
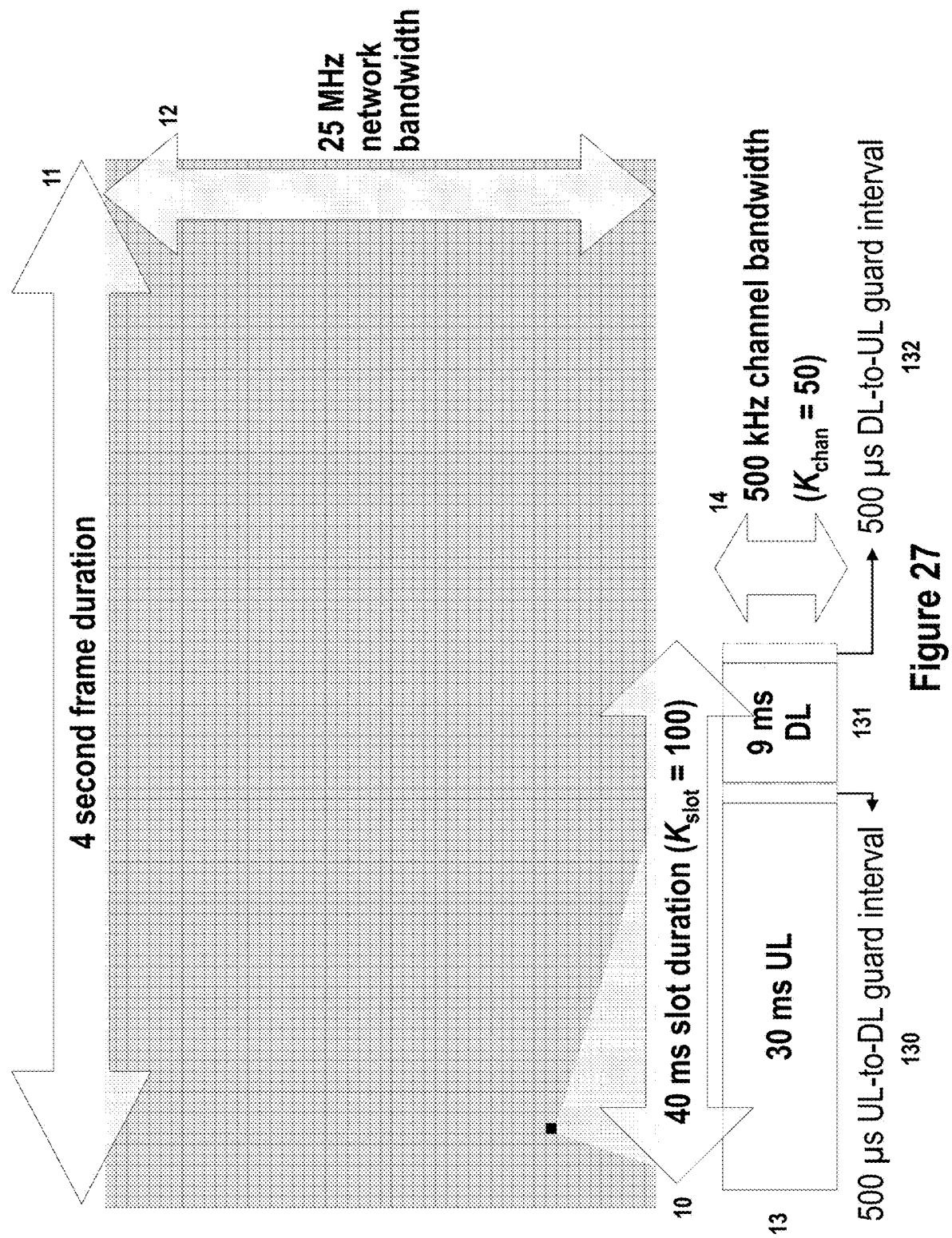
FIG. 27 is a drawing of the time-frequency structure and parameters of each 'frame' used in the alternate Frame Synchronous (FS) system embodiment for the long-range M2M cell shown in FIG. 5.

In one embodiment, FIG. 27, the drawing of the time-frequency structure and parameters of each 'frame' used in the alternate Frame Synchronous (FS) system embodiment for the long-range M2M cell shown in FIG. 5, shows the framing structure similar to the CPDS framing structure shown in FIG. 6, except in this embodiment the durations of the DL subslots (131) are 9 ms, and the preceding and following guard intervals (130, 132) are each 500 μs. This framing structure again allows the SM's and DAP's to be fully compliant with FCC § 15.247 regulation for frequency-hop spread spectrum intentional radiators in the 902-928 MHz band. However, these much higher guard intervals allows the alternate FS network to be used in applications where the SM's and/or DAP's are communicating over much longer ranges or at much higher altitudes, e.g., in airborne or satellite communication networks. In addition, this frame structure provides sufficient guard interval to eliminate the need for SM timing advancement in many applications.

Figure 28:
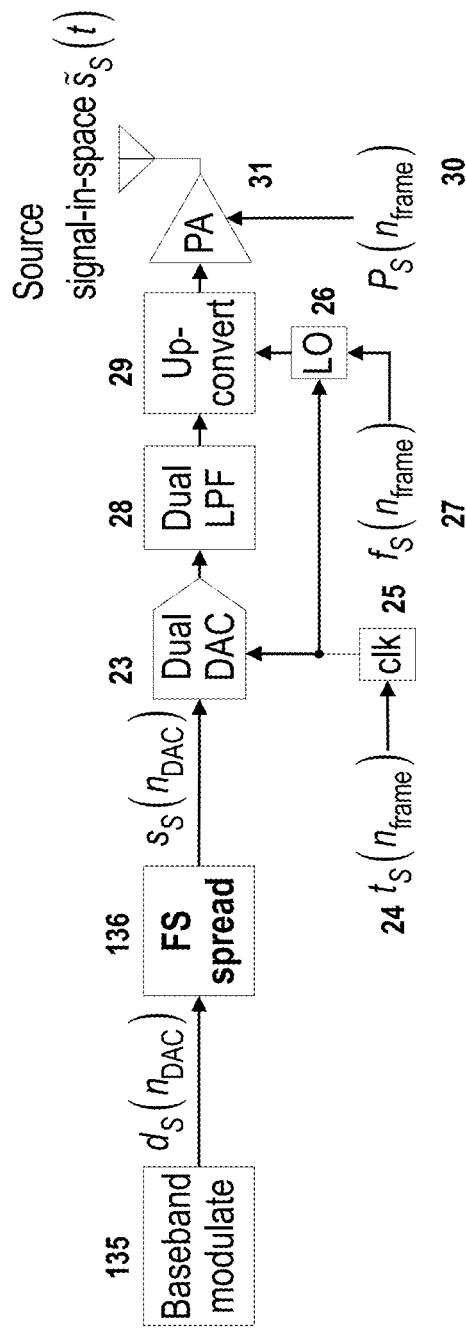
FIG. 28 is a drawing of the hardware implementation of the uplink transmitter employed in an alternate embodiment whereby an uplink signal stream is sent through a Frame-Synchronous (FS) Spreader.

In one embodiment, FIG. 28, the drawing of the hardware implementation of the uplink transmitter employed in an alternate embodiment whereby an uplink signal stream is sent through a Frame-Synchronous (FS) Spreader (136), is structurally the same as the CPDS uplink transmitter shown in FIG. 7, except that the FS embodiment does not integrate the baseband modulation and spreading operations, but instead directly spreads baseband signals using any baseband modulation format (135).

Figure 29:
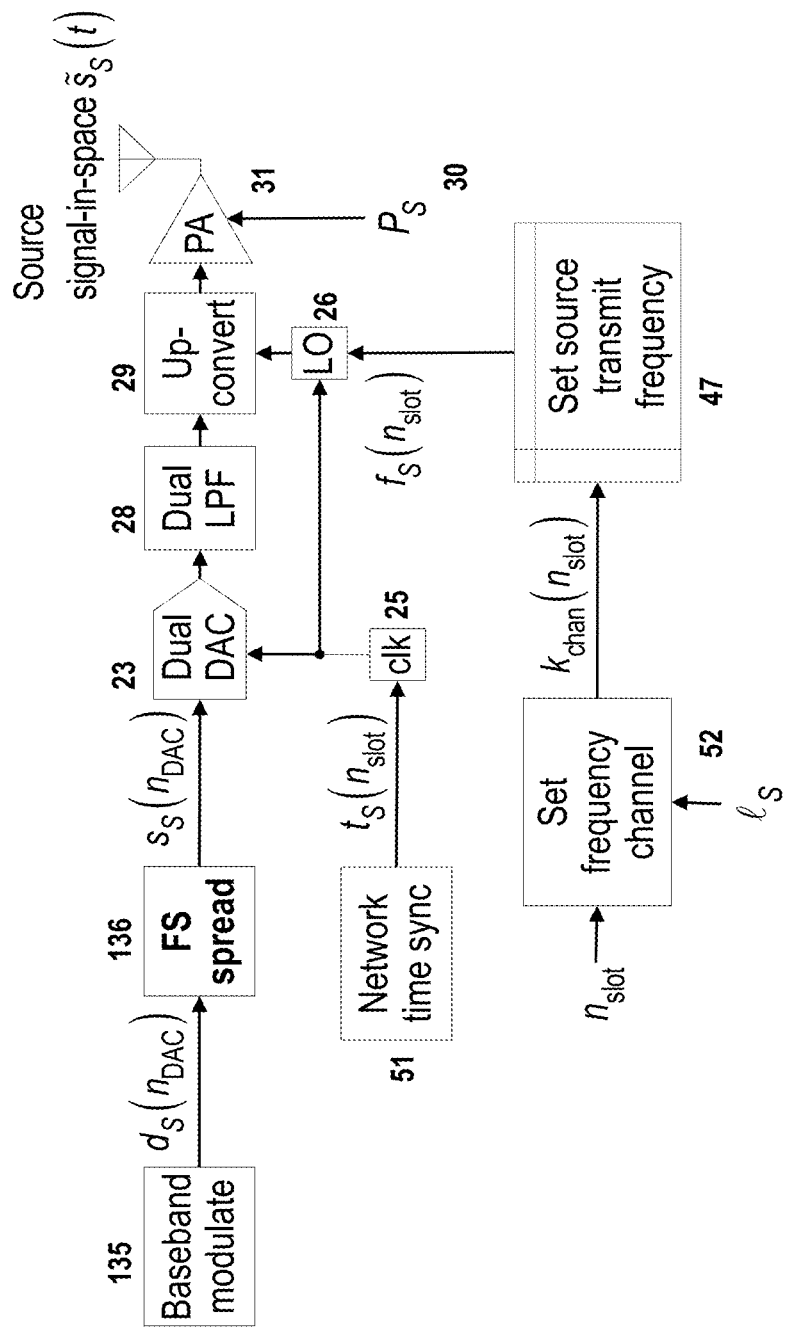
FIG. 29 is a drawing of the hardware implementation of the downlink transmitter employed in an alternate embodiment whereby a downlink signal stream is sent through a Frame-Synchronous (FS) Spreader.

In one embodiment, FIG. 29, the drawing of the hardware implementation of the downlink transmitter employed in an alternate embodiment whereby a downlink signal stream is sent through a Frame-Synchronous (FS) Spreader 136), is structurally the same as the CPDS downlink transmitter shown in FIG. 9, except that the FS embodiment does not integrate the baseband modulation and spreading operations, but instead directly spreads baseband signals using any baseband modulation format (135).

Figure 30:
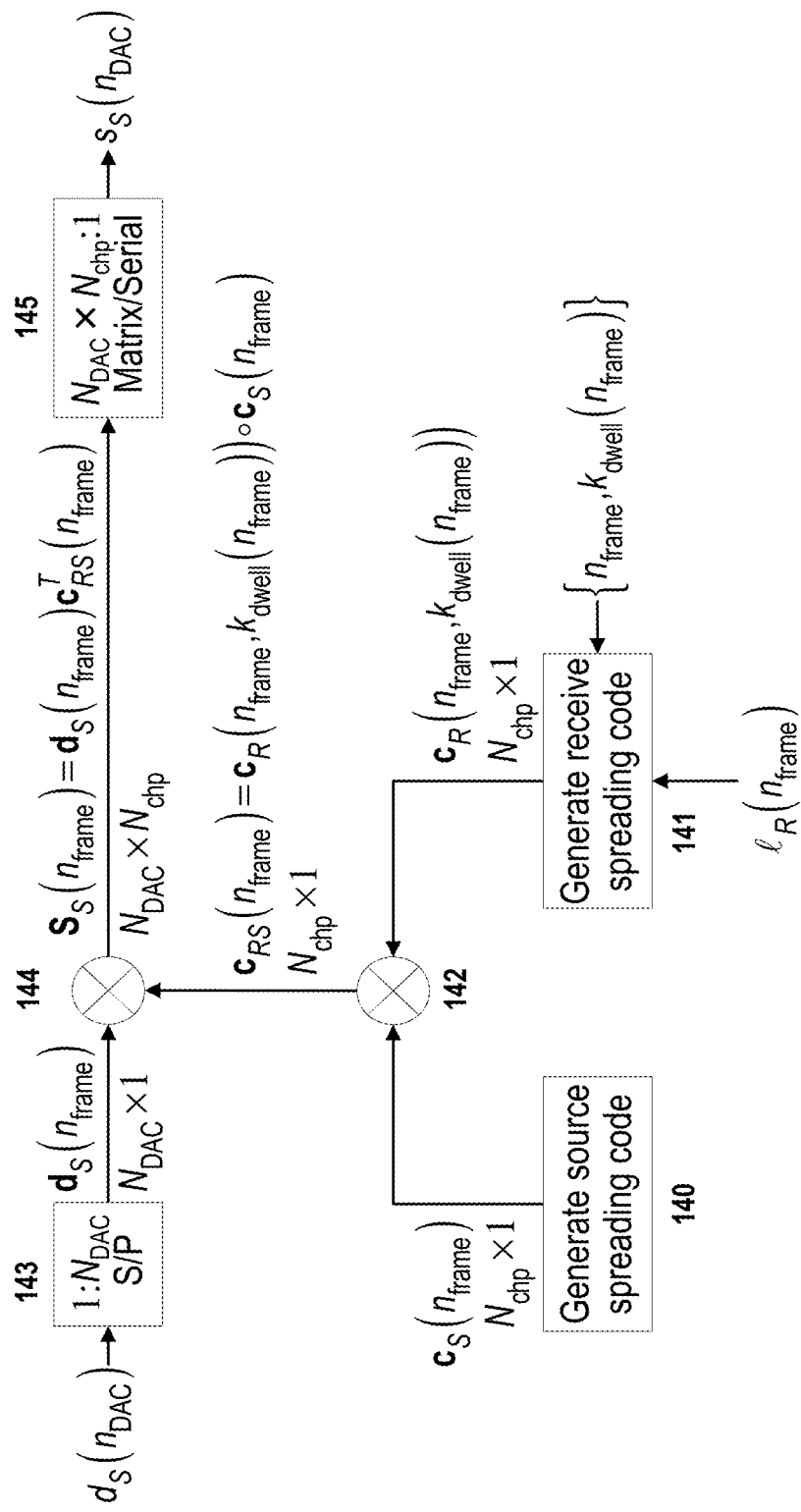
FIG. 30 is a drawing of the logical and computational processes that implement the alternate Frame Synchronous (FS) Transmitter Structure (in an alternate instantiation of the alternate embodiment comprising digital signal processing hardware) for each uplink transmitter used in the long-range M2M network embodiment shown in FIG. 5, and for the time-frequency framing structure shown in FIG. 27.

FIG. 30, in one embodiment, is the drawing of the logical and computational processes that implement the alternate Frame Synchronous (FS) Transmitter Structure (in the instantiation of the alternate embodiment of the FS spreader (136) of FIG. 28, comprising digital signal processing hardware) for each uplink transmitter used in the long-range M2M network embodiment shown in FIG. 5, and for the 902-928 MHz time-frequency framing structure shown in FIG. 27. $N_{DAC}$-sample baseband source sequence $d_S(n_{DAC})$ intended for transmission over time-frame $n_{frame}$ is first passed to a $1:N_{DAC}$ serial-to-parallel (S/P) convertor (143) resulting in $N_{DAC} \times 1$ source symbol vector $d_S(n_{frame}) = [d_S(n_{frame}N_{DAC}+n_{DAC})]_{n_{DAC}=0}^{N_{DAC}-1}$. The source symbol vector is then spread over time (144) using an $N_{chp} \times 1$ spreading code vector $c_{RS}(n_{frame})$, mathematically given by $$S_S(n_{frame}) = d_S(n_{frame}) c_{RS}^T(n_{frame}),$$

resulting in $N_{DAC} \times N_{chp}$ data matrix $S_S(n_{frame})$, followed by an $N_{DAC} \times N_{chp}:1$ matrix-to-serial conversion operation (145) to convert $S_S(n_{frame})$ to a $(N_{DAC}N_{chp})$-chip scalar data stream $s_S(n_{DAC})$, in which each column of $S_S(n_{frame})$ is serially converted to a scalar data stream, moving from left to right across the matrix.

This Figure also shows $C_{RS}(n_{frame})$ being constructed from the element-wise multiplication (142) of an $N_{chp} \times 1$ source spreading code $c_S(n_{frame})$ (140) that is unique to the uplink transmitter and randomly varied between time frames, and an $N_{chp} \times 1$ receive spreading code $c_R(n_{frame}, k_{dwell}(n_{frame}))$ (141) that is pseudorandomly varied based on the time frame $n_{frame}$, the physical dwell $k_{dwell}(n_{frame})$ employed by the receiver over time frame $n_{frame}$, and the intended uplink receiver $1_R(n_{frame})$. However, if the baseband source vector has known or exploitable structure, the entire code vector can be constructed locally using random spreading code.

Figure 31:
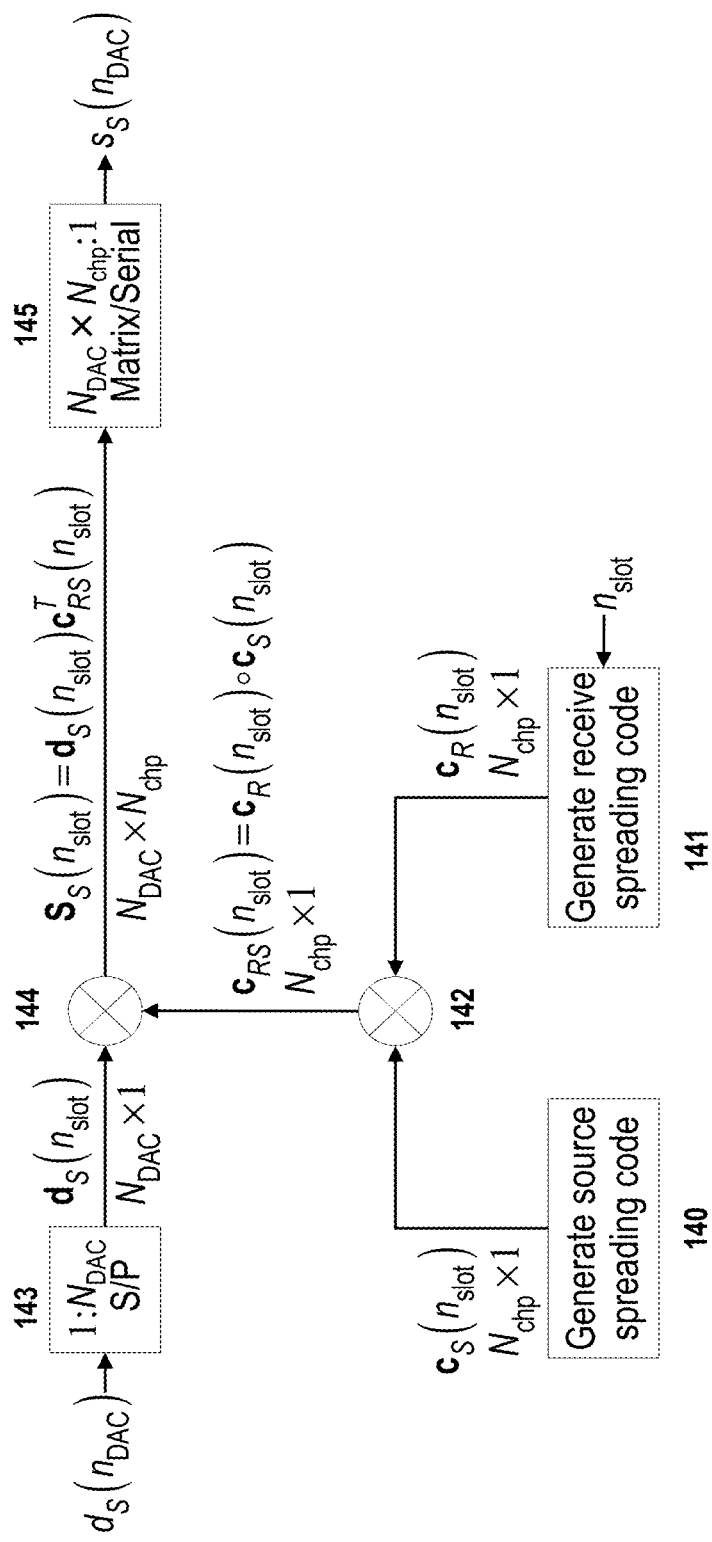
FIG. 31 is a drawing of the logical and computational processes that implement the alternate Frame Synchronous (FS) Spreading Structure (in an alternate instantiation of the alternate embodiment comprising digital signal processing hardware) for each downlink transmitter used in the long-range M2M network embodiment shown in FIG. 5, and for the 902-928 MHz time-frequency framing structure shown in FIG. 27.

FIG. 31, in one embodiment, is the drawing of the logical and computational processes that implement the alternate Frame Synchronous (FS) Spreading Structure (in one instantiation of the alternate embodiment of the FS spreader (136) of FIG. 29, comprising digital signal processing hardware) for each downlink transmitter used in the long-range M2M network embodiment shown in FIG. 5, and for the 902-928 MHz time-frequency framing structure shown in FIG. 27, differs chiefly from FIG. 30 in that the transformations are for each time slot $n_{slot}$ rather than each time frame $n_{frame}$.

Figure 32:
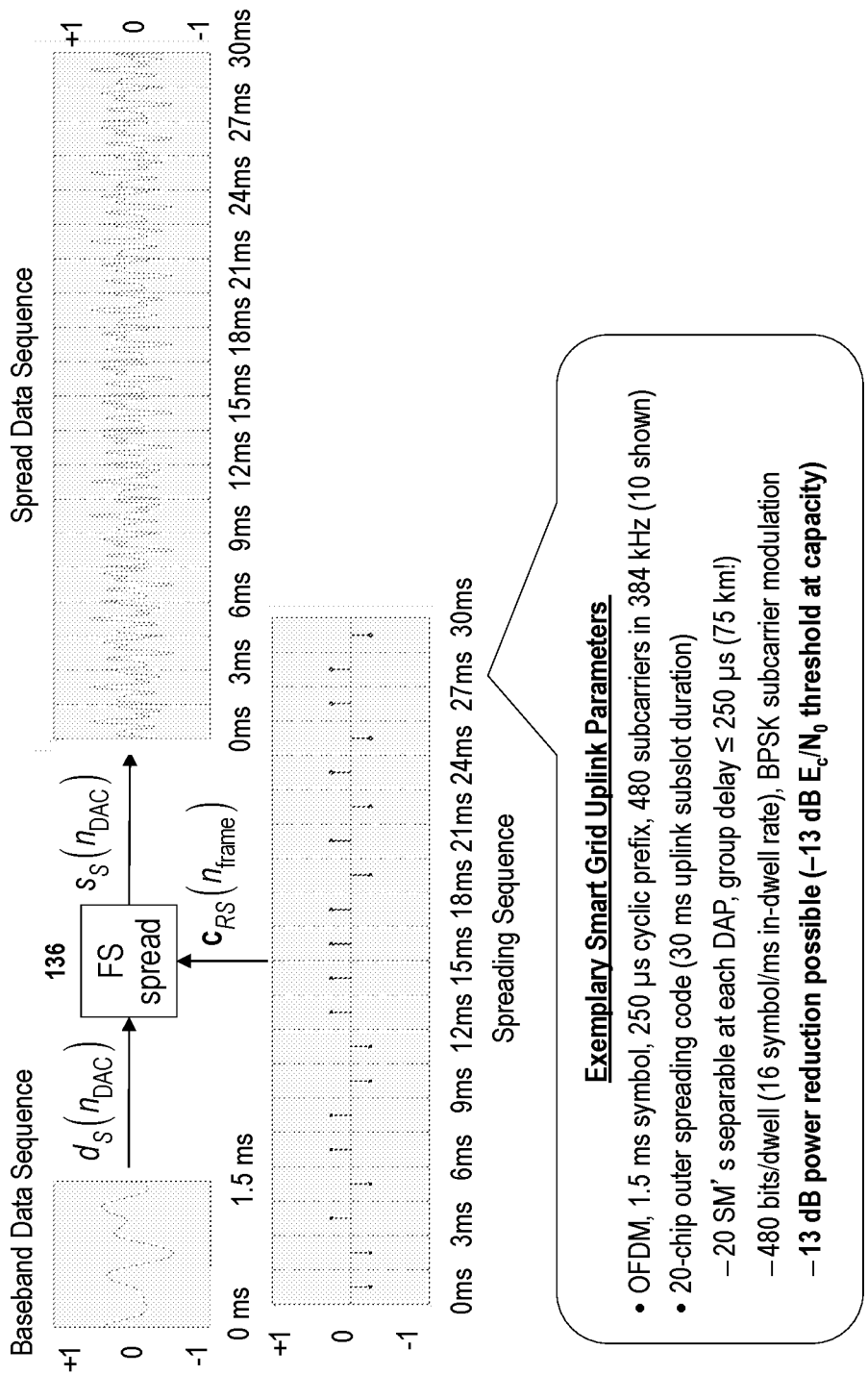
FIG. 32 shows finer detail of the spreading of the signal within the structure on an exemplary alternate FS uplink.

In one embodiment, FIG. 32, the drawing showing finer detail of the spreading of the signal within the structure on an exemplary alternate FS uplink, shows how in this embodiment as exemplary Uplink Parameters, it employs a baseband OFDM signal modulation with a 1.5 ms symbol period including a 250 µs cyclic prefix (1.25 ms FFT duration, or 0.8 kHz subcarrier separation), allowing transport of 480 subcarriers in 384 MHz of active bandwidth, effecting thereby a 16 symbol/ms in-dwell information symbol rate; and incorporates a 20-chip outer spreading code, enabling each DAP in the network to detect, despread, and separate up to 20 SM emissions intended for that DAP, or to excise as many as 19 SM emissions intended for other DAP's in the network. In addition, the cyclic prefix employed by the baseband modulation format provides up to 250 µs of group delay tolerance, equivalent to a 75 km path spread. This path spread is sufficient to eliminate the need for timing advancement of the uplink transmitters in the long-range communication application described in FIG. 5.

Figure 33:
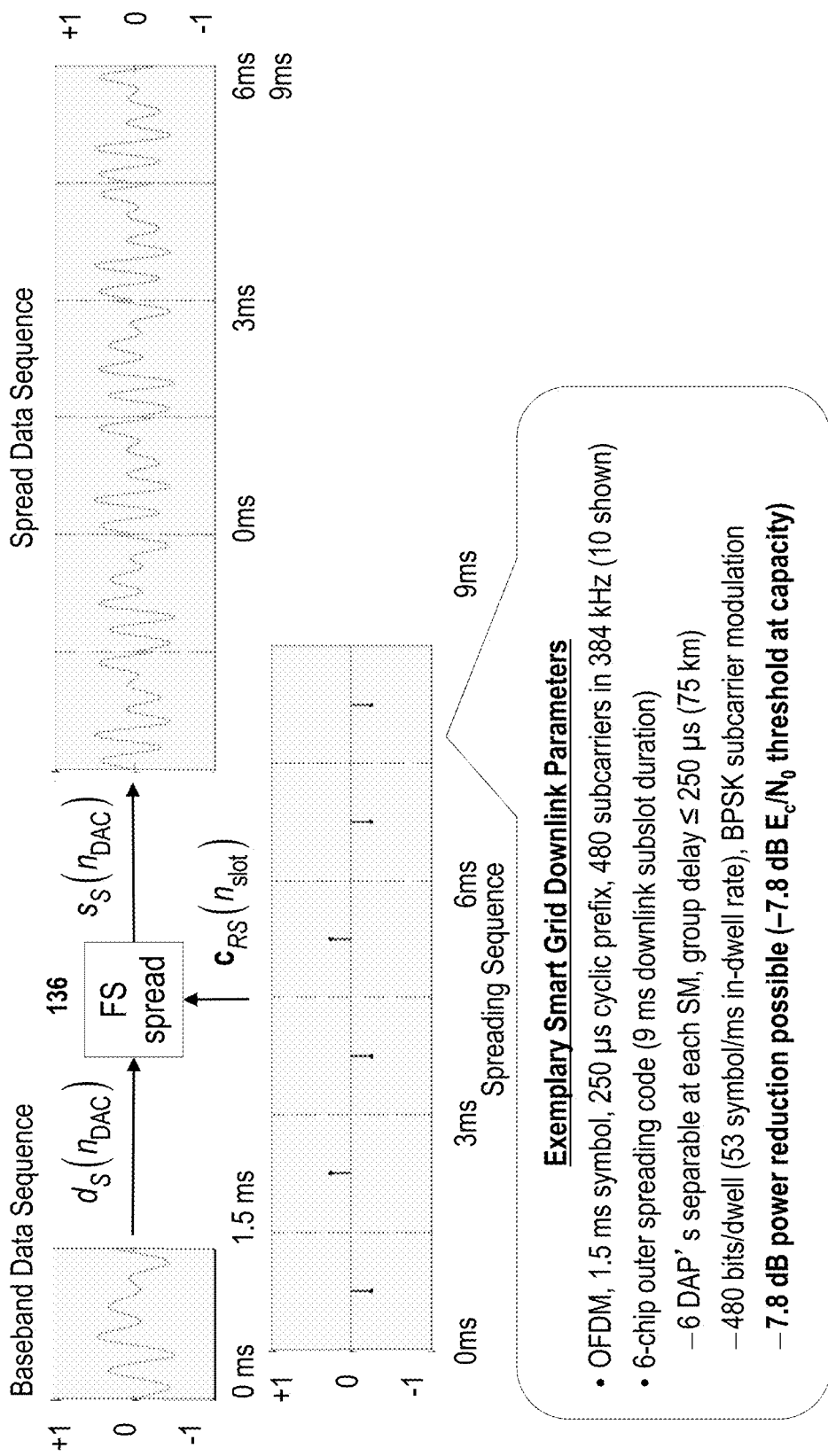
FIG. 33 shows finer detail of the spreading of the signal within the structure on an exemplary alternate FS downlink.

In one embodiment, FIG. 33, the drawing showing finer detail of the spreading of the signal within the structure on an exemplary alternate FS downlink, shows how in this embodiment as exemplary Downlink Parameters, it employs the same baseband modulation format as the uplink spreader, allowing transport of 480 subcarriers in 384 MHz of active bandwidth, effecting thereby a 16 symbol/ms in-dwell information symbol rate; and incorporates a 6-chip outer spreading code, enabling each SM in the network to detect, despread, and separate up to 6 DAP emissions, or to excise as many as 5 DAP emissions intended for other SM's in the network. The cyclic prefix employed by the baseband modulation format again provides up to 250 µs of group delay tolerance, equivalent to a 75 km path spread.

Figure 34:
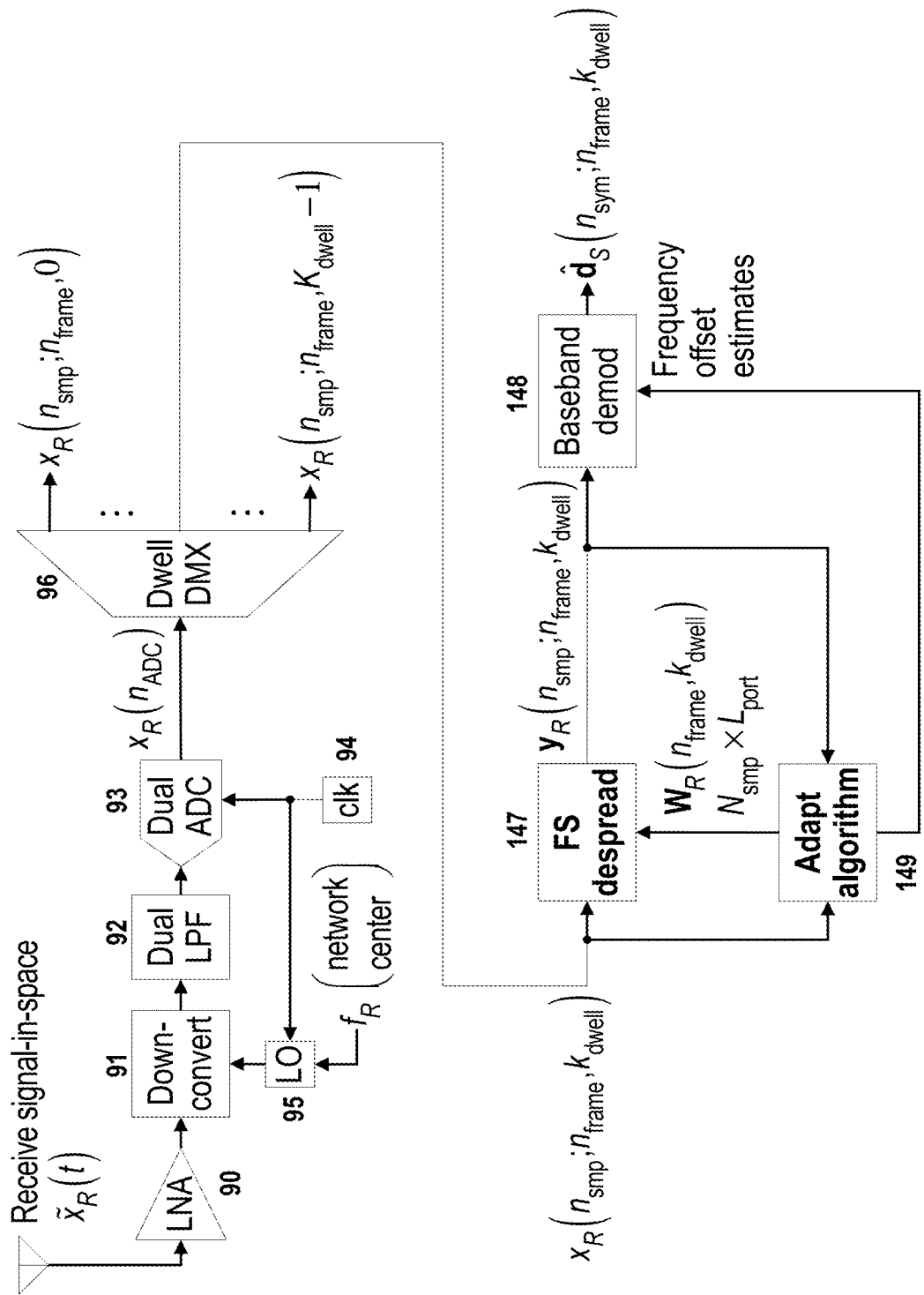
FIG. 34 is a drawing of a possible hardware implementation at each frame synchronous (FS) uplink receiver used in the alternate long-range M2M network embodiment.

In one embodiment, FIG. 34, the drawing of a possible hardware implementation at each frame synchronous (FS) uplink receiver used in the alternate long-range M2M network embodiment, shows whereby the incoming received signal-in-space is received at antenna(e), down-converted from the analog incoming waveforms, and demultiplexed into physical dwells (96) accessible to the receiver; and whereby each physical dwell is passed through an uplink FS despreader (147) (modified with a feedback loop through an adaptation algorithm (149) to detect and substantively despread the FS signals received on each dwell), and each resulting substantively despread signal stream is fed through to a baseband demodulator (148), is structurally the same as the CPDS uplink receiver shown in FIG. 19, except that the FS embodiment does not integrate the baseband symbol demodulation operations, but instead despreads baseband signals using any baseband modulation format.

Figure 35:
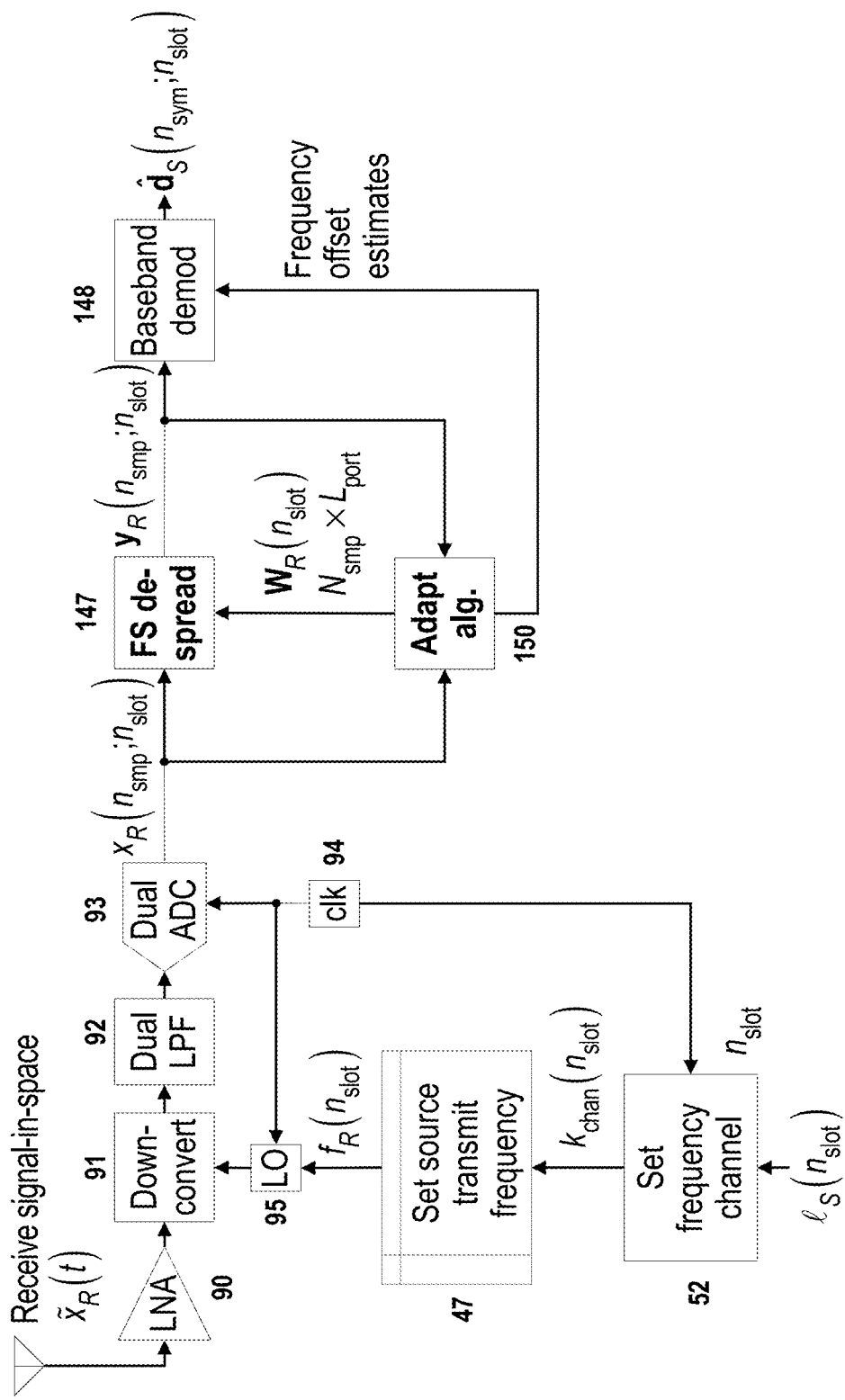
FIG. 35 is a drawing of a possible hardware implementation at each frame synchronous (FS) downlink receiver used in the alternate long-range M2M network embodiment.

In one embodiment, FIG. 35, the drawing of a possible hardware implementation at each frame synchronous (FS) downlink receiver used in the alternate long-range M2M network embodiment, differs chiefly from FIG. 34 in that the transformations are for each time slot $n_{slot}$ rather than each time frame $n_{frame}$.

Figure 36:
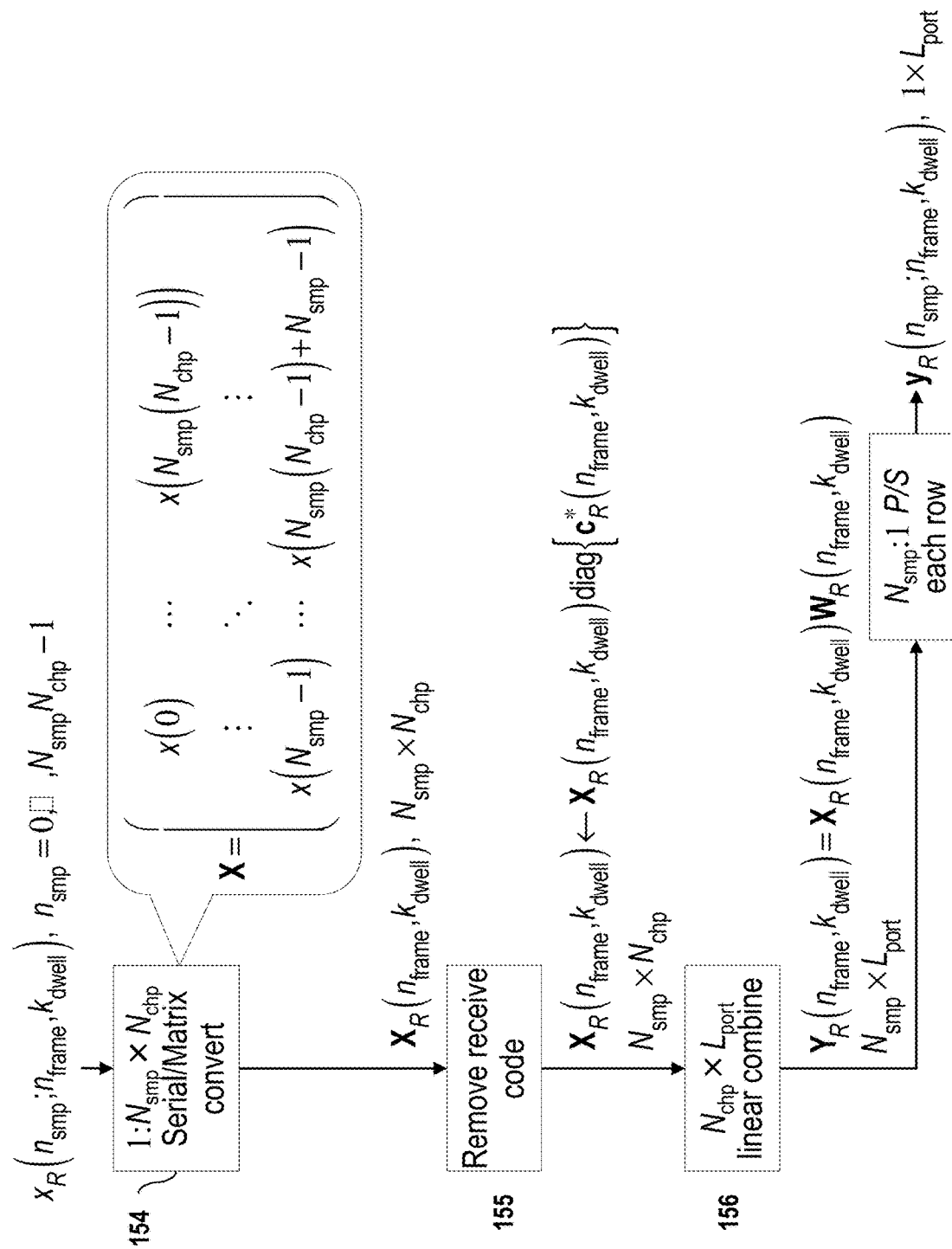
FIG. 36 is a drawing of the FS despreading procedure implemented (in any combination of hardware and software elements) on each time-frequency channel accessed by an uplink receiving machine in the network in an alternative embodiment.

In one embodiment FIG. 36, the drawing of the logical and computational processes that implement the alternate Frame Synchronous (FS) Despreader Structure (147) of FIG. 34 (in one instantiation of the alternate embodiment, comprising digital signal processing hardware) for each uplink receiver used in the long-range M2M network embodiment shown in FIG. 5, show despreading of the demultiplexed uplink data sequence $\{x_R(n_{smp}; n_{frame}, k_{dwell})\}_{n_{smp}=0}^{N_{smp}N_{chp}-1}$ received in $k_{dwell}$ over time frame $n_{frame}$ by performing the sequential steps of:

Performing a $1:N_{smp} \times N_{chp}$ serial-to-matrix conversion operation (154) on the demultiplexer output signal sequence $\{x_R(n_{smp}; n_{frame}, k_{dwell})\}_{n_{smp}=0}^{N_{smp}N_{chp}-1}$, resulting in $N_{smp} \times N_{chp}$ matrix $X_R(n_{frame}, k_{dwell})$, given mathematically by $$X = \begin{pmatrix} x(0) & \cdots & x(N_{smp}(N_{chp}-1)) \\ \vdots & \ddots & \vdots \\ x(N_{smp}-1) & \cdots & x(N_{smp}(N_{chp}-1)+N_{smp}-1) \end{pmatrix}$$

for general received data sequence $\{x(n_{smp})\}_{n_{smp}=0}^{N_{smp}N_{chp}-1}$;

Removing the $N_{chp} \times 1$ receive spreading code $c_R(n_{frame}, k_{dwell})$ from $X_R(n_{frame}, k_{dwell})$ (155), given mathematically by $$X_R(n_{frame}, k_{frame}) \leftarrow X_R(n_{frame}, k_{frame}) \mathrm{diag}\{c_R^*(n_{frame}, k_{frame})\}$$

where $\mathrm{diag}\{\bullet\}$ is the vector-to-diagonal matrix conversion operation and $(\bullet)^*$ is the complex conjugation operation.

Computing $N_{smp} \times L_{port}$ despread baseband signal matrix $Y_R(n_{frame}, k_{dwell})$ (156), given mathematically by $$Y_R(n_{frame}, k_{dwell}) = X_R(n_{frame}, k_{frame}) W_R(n_{frame}, k_{dwell}),$$

where $W_R(n_{frame}, k_{dwell})$ is an $N_{chp} \times L_{port}$ linear combining matrix computed using the procedure shown in FIG. 23.

Converting the despread baseband signal matrix $Y_R(n_{frame}, k_{dwell})$ back to a sequence of $1 \times L_{port}$ despread baseband signal vectors $\{y_R(n_{smp}; n_{frame}, k_{dwell})\}_{n_{smp}=0}^{N_{smp}-1}$ by applying an $N_{smp}:1$ parallel-to-series (P/S) conversion operation (157) to each row of $Y_R(n_{frame}, k_{dwell})$.

Figure 37:
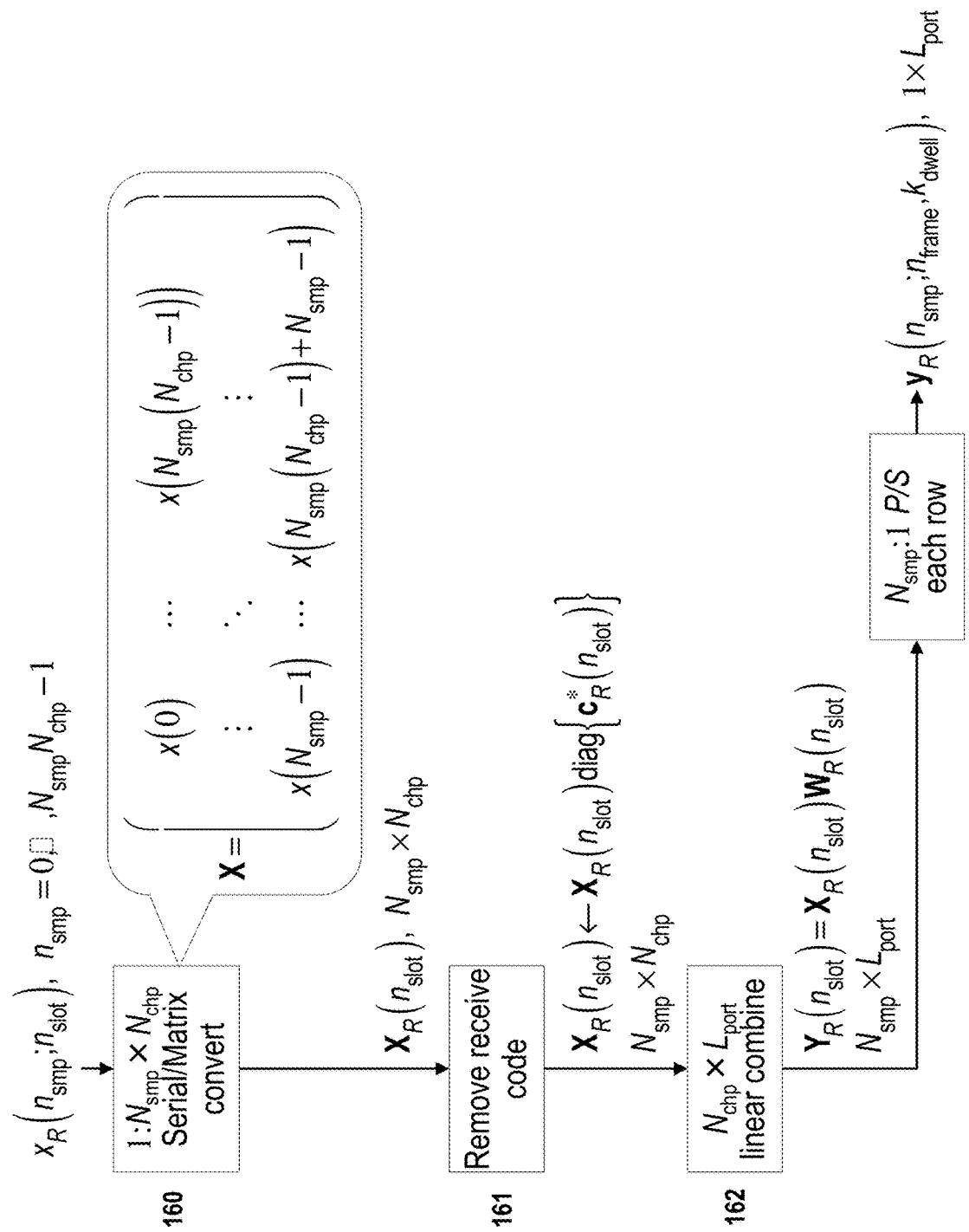
FIG. 37 is a drawing of the FS despreading procedure implemented (in any combination of hardware and software elements) on each time-slot accessed by a downlink receiving machine in the network in an alternative embodiment.

In one embodiment, FIG. 37, the drawing of the logical and computational processes that implement the alternate Frame Synchronous (FS) Despreading Structure (147) of FIG. 35 (in one instantiation of the alternate embodiment, comprising digital signal processing hardware) for each downlink receiver used in the long-range M2M network embodiment shown in FIG. 5, and for the 902-928 MHz time-frequency framing structure shown in FIG. 27, differs chiefly from FIG. 36 in that the transformations are for each time slot $n_{slot}$ rather than each time frame $n_{frame}$.

DETAILED DESCRIPTION OF EXEMPLARY EMBODIMENTS

While this invention is susceptible of embodiment in many different forms, there is shown in the drawings and will herein be described in detail several specific embodiments with the understanding that these specific embodiments of the present disclosure are to be considered as individual exemplifications of the principles of the invention and not intended to limit the invention to the embodiments illustrated.

The embodiments described herein presume a hardware implementation that uses a single antenna per transceiving element, to which any of a set of spatial excision/separation methods of digital signal processing may be applied, including: Linear demodulators (which provide the benefits, among others, of low complexity, simpler network coordination); blind and/or uncalibrated adaptation algorithms; and Subspace-constrained partial update (SCPU) (in order to minimize adaptation complexity). In a further embodiment, more than one antenna may be used and additional dimensions of diversity (spatial, polarization, or any combinations thereof) thus enabled, applied to the excision/separation/security DSP.

The embodiments further provide physical security as an intended but ancillary benefit to overall network efficiency, as the method enables any or all of the following in individual elements, sub-sets of elements, or the entire set comprising the network, while sending messages: Pseudo-random or truly random spreading to prevent exploitation of compromised codes; Fast code replacement ("code hopping") to prevent exploitation of detected codes; and Low-power transmission modes to minimize detect footprint, defeat remote exploitation methods.

There are further network enhancements as an intended ancillary benefit, which include: Coordinated/simultaneous SM uplink transmission, DAP reception; the Elimination/enhancement of slotted ALOHA, TDMA protocols; Reduced interference presented to co-channel users; and Provable improvement using information theoretic arguments. Plus, the overall effect enables the network to function with both Blind/uncalibrated SM downlink reception and, consequently, the elimination/minimization of network coordination (and the required signal overhead to effect the same) at each SM.

In one embodiment, a method is provided for wireless intercommunication between at least one Signaling Machine ('SM') and one Data Aggregation Point ('DAP') each belonging to a set of like devices (all capable of both transmitting and receiving) and with all said devices belonging to the same network of which each said device is a node. Because this method is extremely flexible and adaptable, as described herein all embodiments disclosed in the present description must be understood to be used by collections of devices where members of a specific collection may be both like (e.g. multiple SM's in Collection A) and disparate (a single DAP also in Collection A). Intercommunication may be between a first node and a second node, or a single node and multiple nodes, or multiple nodes to single node, or multiple nodes to multiple nodes. So at least one SM and at least one DAP may intercommunicate; likewise, more than one SM with a single DAP, more than one DAP with a single SM, multiples of SM's with multiples of DAP's; and SM's may intercommunicate with other SM's and DAP's may intercommunicate with other DAP's, in any combination. Each SM and DAP may be referred to as a 'node', a 'device', and (depending on their current activity and role) may be the transmitter, receiver, or transmitter and receiver of a message (or intercommunication, or intended transmission); but calling the device a transmitter (or receiver) for its functional activity at the time, is not usage to be confused with and taken as, requiring or stating that the device as a whole be solely that specific electronic component.

The FHDS spread-spectrum modulation is effected through spreading codes, and its format comprises time slots and frequency channels which combine to form a 'time frame'; so the time slots and frequency channels are subdivisions of the time frame. Any transmission may comprise at least one time frame (and probably more), an uplink and a downlink, and comprise both at least one data burst (a time period of active transmission) and at least one guard interval (a time period of no transmission) (as seen in FIGS. 6 and 27). Transmission information—which is not the content of the transmission, but its structure, nature, recipient(s), spreading code(s), and other such 'metadata'—may be not provisioned by the network nor known to the receivers in the network, but locally determined, by any device for its intended sub-set of other devices to which the transmission is to be intercommunicated. This transmission information may be any of provisioned, pseudorandomly selected, and randomly selected, by the transmitting device and varied, likewise.

As one embodiment of the method uses blind fully-despreading algorithms at each receiver, the network can implement arbitrary spreading codes (to distinguish inter-communications between each SM and DAP, or sub-sets or sets thereof); and these arbitrarily spreading codes can be chosen randomly, pseudorandomly, or locally (that is, without coordination or activation/change effort on the part of the network as a whole, i.e. without centralized network provisioning).

Furthermore, and equally importantly to the continued security, even when, while, or after any attempted infiltration or interception, the selection of arbitrarily spreading codes actually used within the network as a whole can be altered (again randomly, pseudorandomly, and locally) with any timing and by any ad-hoc redivision of the network, thereby preventing any third party from learning, or predicting, and thus gaining access to, the intercommunications between any sub-set of SM's and their DAP's. By using the spreading codes to differentiate intended signaling between the SM's and DAP, this method prevents mutual interference amongst its elements.

To obtain the kernel for implementing a truly randomized spreading code, in at least one further embodiment the network incorporates at least one real-world sensor which takes input from events in the real world as the source for random-number generation (a real-world, random-number, sourcing sensor, or 'RW-RN-SS'). For example, the network may have an amplitude sensor which picks the most powerful signal within a time frame; or a photovoltaic sensor which detects the intensity of a light shining through a set of heat-variant-density liquid containers ('lava lamps'), or a frequency sensor which selects the mean, average, peak or low, or other calculated value, of all frequencies detected within a certain time period. The method can then be using, during said transformations, input from a real-world, random-number, sourcing-sensor element that provides a truly random kernel using real-world chance events for randomly effecting the transmission transformation, including any combination of the following set: by randomly generating the spreading code over every transmit opportunity (every frame on the uplink, and every time slot on the downlink) in a randomizer element and then providing the generated spreading code to the CPDS spreader; by randomly generating the physical dwell index (time slot and frequency channel) over every time frame in a randomizer element and then providing said randomly generated physical dwell index to the CPDS uplink transmitter; by randomly generating elements of the source symbol mask, e.g., a cyclic frequency offset, over every time frame in a randomizer element and then providing said randomly generated physical dwell index; and, by randomly selecting an intended uplink receiver from a set of candidate uplink receivers over every time frame and then providing that selection of uplink receiver to the CPDS uplink spreader.

Thus the environment as a whole—including the 'noise' of all other transmissions—can become a self-sourcing aspect of the network's security, using genuinely random and constantly-changing real-world events instead of a mere 'pseudorandom noise' ('PN') element.

In another and further embodiment each DAP incorporates in itself a RW-RN-SS to generate for that DAP and its associated SM's, the truly randomized spreading code(s) used by that subset of the network.

In yet another and further embodiment each SM incorporates in itself a RW-RN-SS to generate for that SM, the truly randomized spreading code(s) used by it.

Furthermore, the successful interception and detection of one spreading code does nothing to ensure further, continued, or future interception of any messages (within the affected sub-set of the network, or any part or whole of the network. As soon as the intercepted spreading code is changed the new messages may be once again not merely encrypted, but become part of the overall 'noise' of the total environment.

As a consequence, the method completely eliminates the ability for an adversary to predict or control when, where in frequency, or even whom an SM may transmit to at any time. In the worst case scenario where the anti-spoofing protocols are compromised, an adversary can at best generate a duplicate node that is easily detected and identified by the network using PHY observables (e.g. carrier offsets, locational angles, intensity variations, timing inconsistencies, multipath imbalances, etc. as known to the state of the art, which in a transmission may be the Physical Layer ('PHY')

data bits), internals, or other trusted information possessed by the true SM and DAP. Whenever a node is duplicated the original source and intended recipient can, each independently or together, compare any of the PHY observables in the received transmissions and use any discrepancy from previously observed values to identify the adversarial node; and then ignore that now-identified hostile node, alert the other nodes in the network to the presence, and PHY observable characteristics, of that now-identified hostile node, and otherwise respond.

One embodiment enables randomized and/or decentralized time-frequency hopping and code spreading to defeat interception/deception attacks that focus on scheduled transmissions (including, among others, the 'man-in-the-middle' interception type of attack). Indeed, one embodiment eliminates the very existence of feedback paths needed to schedule uplink transmissions, thereby negating a critical point of attack for intruders attempting to intercept, jam, spoof, or otherwise disrupt the network, as well as reducing downlink network loading imposed by those paths.

Further still, another embodiment also differs from the prior art in implementing physical security which neither depends on every element having an antennae array, nor which inherently exploits channel differences resulting from differing geographical placement of those arrays, yet which allows both signaling between a SM and a DAP (or a 'user' and a 'base station') and a pair of SM's or a pair of DAP's with the same physical security and processing implementation, and without network-assigned differentiation of processing methods.

One embodiment focuses on Max-SINR rather than matched-filter despreading, uses fully-blind rather than parametric despreading, and employs conventional LMMSE (Linear Minimum Mean-Squared Spreading Error), because this method greatly reduces the overhead to the network (signal-controlling and signal-defining sub-content) of its transmissions, which correspondingly increases the efficiency and capacity of the network. It also enables a back-compatible approach (to existing communication signal, e.g. 802.11 DSSS) whenever and wherever desired, enabling cost-effective implementation as signal/noise densities become problematic, rather than an 'entirely new generation' implementation effort where the entire network must be simultaneously upgraded as a prerequisite to the attainable improvement(s).

A further embodiment combines cyclic time prefixes and specific guard intervals that allow operation of any SM's-DAP network (or sub-portion), in an environment with very coarse time synchronization, without any significant loss of signal density or range of effectiveness.

In one embodiment the method fits each transmission into a series of frames of Upload ('UL') and Download ('DL') transmissions (FIG. 6). Each frame comprises a frame structure with a 4-second frame period and 25 MHz frequency bandwidth within the 902-928 MHz ISM band, divided into 5,000 physical time-frequency dwells, comprising 100 contiguous 40 ms physical time slots covering the 4 second frame, and frequency-channelized into 50 contiguous 500 kHz physical frequency channels. Each physical time-frequency dwell is further subdivided into a 30 ms UL subslot in which an SM can transmit to a DAP; a 9.675 ms DL subslot in which a DAP can transmit to an SM; a 75 µs UL-to-DL guard interval between the UL and DL subslots to allow timing advancement of the SM UL transmissions to its primary (but not necessarily preferential) DAP, and a 250 µs DL-to-UL guard interval between the end of the DL subslot and the next time slot to prevent "DAP-to-DAP interference" caused by DAP DL transmission into the next time slot. Each 500 kHz frequency channel has an additional set-aside of ±50 kHz guard band to account for carrier LO uncertainty and PA intermodulation distortion (IMD) in the transmitted SM and DAP signals.

This frame structure enables a Point-to-Multipoint ('P2MP') transmission that is compliant with 'intentional radiator' exceptions under the FCC § 15.247 requirements for the 902-928 MHz band. Moreover, the DL is broadcast from the DAP, thereby avoiding the Point-Multi-Point ('P-MP') restriction and making it compliant with FCC § 15.247 requirements for the 902-928 MHz band.

In one embodiment, the network used a method incorporating into each transmission at each transceiver a Cyclic-Prefix Direct-Sequence (CPDS) modulation-on-symbol spreader and fully-blind despreader within each physical time-frequency channel, thus providing a differentiator for that transmission, with time-channelized despreading at the receiver, to further support the robustness and quality of the differentiation of signal from noise within the accepted transmission band. Furthermore, this spreading format incorporates randomization features that also eliminates the need for pre-deployment network planning and enables and allows more robust (mesh, macrodiverse) network topologies, improving and increasing the stability and robustness of the actually deployed network. A reasonable estimate is that this multiplies the potential capacity for the network by a factor of 3, compared to conventional FHDS networks; or allows link connection at 10-20 dB lower power level with the same fidelity. Using a single-carrier prefix also minimizes signal loading due to multipath or in-cell group delay. In one embodiment the method may also be fitting each transmission into a series of frames of Upload Transmissions ('UpLink') and Download Transmissions ('DownLink'), and transmitting from the SM on any UpLink and from the DAP on any DownLink.

In one embodiment, in the CPDS uplink transmitter shown in FIG. 7, information intended for transmission in a single physical time-frequency dwell of each frame (in accordance with FIG. 6) is first passed through baseband encoding algorithms, e.g., to add medium access control (MAC) and Physical layer (PHY) data bits, perform data encryption and source/channel coding, and interleaving/scrambling operations, convert bits to symbols, and add other PHY signatures (e.g., training preambles and/or Unique Words) as needed/desired to simplify receive processing and/or eliminate processing ambiguities. This process creates baseband source symbol stream $b_S(n_{sym})$ output from the encoder (20) at each symbol index $n_{sym}$ utilized by the transmitter.

The baseband source symbol stream is then passed to the cyclic-prefix direct-sequence (CPDS) spreading processor (21) shown in FIG. 10 (described in detail below), thereby segmenting it into $M_{sym}$-symbol source data segments and modulating each source data segment to generate spread source data stream; and outputting $s_S(n_{chp})$ output from the CPDS spreader (21) at each chip index $n_{chp}$. Taking each $s_S(n_{chp})$ output the method is subsequently pulse-amplitude modulating (PAM) it by a raised-root-cosine (RRC) interpolation pulse (22); and converting this result to an analog signal-in-space (SiS). This transforms the digital stream to an analog transmission signal by, e.g., using a dual digital-to-analog convertor (DAC) (23) applied to the in-phase and quadrature rail (real and imaginary part) of the spread data stream; upconverting (29) this resulting analog SiS to a desired source frequency $f_S(n_{frame})$ (27) selected by the uplink transmitter within time-frame $n_{frame}$; and transmitting it at source time $t_S(n_{frame})$ (24) selected by the uplink transmitter within time-frame $n_{frame}$, at a power level $P_S(n_{frame})$ (30) that is strong enough to allow the intended uplink receiver $1_R(n_{frame})$ to detect, despread, and demodulate the uplink transmission.

As shown in FIG. 8, the source transmit time $t_S(n_{frame})$ and transmit frequency $f_S(n_{frame})$ are preferentially selected randomly within each frame, by randomly selecting dwell index (43) $k_{dwell}(n_{frame})$ for that frame; mapping (44) $k_{dwell}(n_{frame})$ to time slot $k_{slot}(n_{frame})$ and frequency channel $k_{chan}(n_{frame})$, and selecting $t_S(n_{frame})$ from $k_{slot}(n_{frame})$ and $f_S(n_{frame})$ from $k_{chan}(n_{frame})$ via a look-up table. In particular, $k_{dwell}(n_{frame})$ is chosen without any prior scheduling or coordination between the uplink transmitter and the uplink receivers in the network. So the method is selecting randomly the source transmit time and transmit frequency $f_S(n_{frame})$ within each frame, by randomly selecting dwell index $k_{dwell}(n_{frame})$ for that frame, without any prior scheduling or coordination between the uplink transmitter and the uplink receivers in the network; mapping $k_{dwell}(n_{frame})$ to time slot $k_{slot}(n_{frame})$ and frequency channel $k_{chan}(n_{frame})$; and selecting $t_S(n_{frame})$ from $k_{slot}(n_{frame})$ and $f_S(n_{frame})$ from $k_{chan}(n_{frame})$ via a look-up table.

Preferentially, in one embodiment, the uplink transmitter also uses knowledge of the range between itself and its nearest physical receiver, e.g., based on known geolocation information of itself and the uplink receivers in its field of view, to provide timing advancement sufficient to allow its transmission to arrive at that receiver at the beginning of its observed uplink subslot. It should be noted that the nearest physical receiver does not need to be the receiver that the uplink transmitter is intending to communicate with. Additionally, this timing advancement does not need to be precise to a fraction of a chip period; however, it should be a small fraction of the cyclic prefix used on the uplink.

Preferentially, in one embodiment, the source transmit power $P_S(n_{frame})$ is calculated using an open-loop algorithm, e.g., by calculating pathloss between each DAP in the SM's field of view during downlink subslots, and using that pathloss estimate to calculate power required to determine the source power required to detect, despread, and demodulate subsequent uplink transmissions. The source transmit power does not need to precisely compensate for the pathloss between the transmitter and receiver, but should have sufficient margin to overcome any effects of fading between the uplink and downlink subslots, including processing gain achievable by the despreader in the presence of credible numbers of other uplink transmissions. Additionally, this power calculation is used to develop a database of candidate uplink receivers to which the transmitter can communicate without violating FCC § 15.247 requirements for the 902-928 MHz band.

In alternate embodiments, this algorithm can be improved using closed-loop algorithms that use feedback from the uplink receiver to adjust the power level of the transmitter. Preferentially, in one embodiment, the closed-loop algorithm should be as simple as possible, in order to reduce vulnerability to "cognitive jamming" measures that can disrupt this feedback loop. However, it should be noted that the blind despreading algorithms employed in one embodiment provide additional protection against cognitive jamming measures even if closed-loop power control is used in the network, due the random and unpredictable selection of frequency channels, time slots, and even intended receivers employed at the uplink transmitter, and due to the ability for the despreading algorithms to adaptively excise CPDS signals received at the uplink and downlink receivers, even if those signals are received at a much higher signal-to-noise ratio (SNR) than the signals intended for the receiver.

In the downlink transmitter shown in FIG. 9, information intended for transmission in each downlink slot of each frame (in accordance with FIG. 6) is passed through baseband encoding algorithms (20) to create baseband source symbol stream $b_S(n_{sym})$; spread using the cyclic-prefix direct-sequence (CPDS) spreading processor (21) shown in FIG. 11 (described in detail below) to generate spread source data stream $s_S(n_{chp})$; pulse-amplitude modulated using a raised-root-cosine (RRC) interpolation pulse (22); converted (23) to an analog signal-in-space (SiS); upconverted (29) to desired source frequency $f_S(n_{slot})$ selected by the downlink transmitter over time slot; and transmitted over time slot $n_{slot}$ at a source power level $P_S$ (30) that is held constant over every time slot.

Thus the method is: first passing said information through baseband encoding (20) to create a baseband source symbol stream $b_S(n_{sym})$; then passing the baseband source symbol stream $b_S(n_{sym})$ to a cyclic-prefix direct-sequence ('CPDS') spreader (21) which modulate each data segment to generate the spread source data stream $s_S(n_{chp})$ output from the CPDS spreader (21) at each chip index $n_{chp}$; then subsequently pulse-amplitude modulating the spread source data stream $s_S(n_{chp})$ output by a raised-root-cosine ('RRC') interpolation pulse (22); converting (23) this result to an analog signal-in-space ('SiS'); upconverting (29) this analog SiS to a desired source frequency $f_S(n_{slot})$ selected by the downlink transmitter over time slot $n_{slot}$; and transmitting this analog SiS over the desired source frequency $f_S(n_{slot})$ over time slot $n_{slot}$ at a source power level $P_S$ (30) that is held constant over every time slot.

Preferentially, in one embodiment, each downlink transmitter is synchronized to a common network time-standard, e.g., using synchronization information provided over separate infrastructure, or a GPS time-transfer device. This synchronization should be precise enough to minimize DAP-to-DAP interference, but does not need to be precise to a fraction of a chip period.

Preferentially, in one embodiment, the frequency channel $k_{chan}(n_{slot})$ used to set source frequency $f_S(n_{slot})$ is generated using a pseudorandom selection algorithm based on the slot index $n_{slot}$ and the source index $1_S$. In other words, the method is selecting a desired source frequency $f_S(n_{slot})$ to be used by the downlink transmitter over time slot $n_{slot}$ by selecting a frequency channel $k_{chan}(n_{slot})$ using a pseudorandom selection algorithm based on the slot index $n_{slot}$ and the source index $1_S$. In one embodiment, $f_S(n_{slot})$ is known to each downlink receiver allowed to communicate with that transmitter, over at least a subset of slots within each frame. However, in alternate embodiments the downlink receiver may detect the transmit frequency over each slot or a subset of monitored slots and frequency channels, without coordination with the downlink transmitter. Preferentially, in one embodiment, the source frequency employed by each downlink transmitter is not coordinated with other downlink transmitters in the network; however, in alternate embodiments (employed outside the 902-928 MHz ISM band, which requires uncoordinated hopping between network elements) the downlink transmitters may use the same source frequency in each slot, e.g., to minimize intrusion on out-of-network users of the same frequency band, or may use disjoint source frequencies, e.g., to minimize adjacent-network interference.

In the CPDS uplink spreading structure (21) shown in FIG. 10, the $M_{sym}$ baseband source symbols intended for transmission over time-frame $n_{frame}$ are first passed to a 1:$M_{sym}$ serial-to-parallel (S/P) convertor (63) to form $M_{sym} \times 1$ source symbol vector $b_S(n_{frame}) = [b_S(n_{frame} M_{sym} + n_{sym})]_{n_{sym}=0}^{M_{sym}-1}$. A unique $M_{sym} \times 1$ symbol mask vector $m_{RS}(n_{frame}) = [m_{RS}(n_{sym}; n_{frame})]_{n_{sym}=0}^{M_{sym}-1}$ that is randomly varied from frame to frame is then inserted onto the data (64) (procedure shown in FIG. 12), to provide physical security to the source symbol stream, randomize the source data stream, and allow the intended uplink receiver to differentiate the transmitted signal from other noise, co-channel interference, and in-network signals impinging on that receiver. The symbol mask vector is constructed from the element-wise multiplication (62) of an $M_{sym} \times 1$ source symbol mask vector $m_S(n_{frame})$ (that is unique to the uplink transmitter and randomly varied between time frames), with an $M_{sym} \times 1$ receive symbol mask vector $m_R(n_{frame}; k_{dwell}(n_{frame}))$ (that is randomly varied between time frames and physical dwells and uses a receive symbol mask that is known to the intended receiver and common to every signal attempting to link with that receiver). This operation is depicted in FIG. 10 by the Schur product $m_{RS}(n_{frame}) = m_R(n_{frame}; k_{dwell}(n_{frame})) \circ m_S(n_{frame})$.

In one embodiment, $m_S(n_{frame})$ is either:
known to the receiver, e.g., established during initial and/or periodic network provisioning operations; or
a member of a set of sequences that is known to the receiver, e.g., a Zadoff-Chu code with unknown index and/or offset; or
unknown to the receiver but estimable as part of the receive adaptation procedure.

An important member of the last category of source symbol masks is the complex sinusoid given by $$m_S(n_{sym}; n_{frame}) = \exp\{j2\pi\alpha_S(n_{frame})n_{sym}\}, \quad (Eq2)$$

where $\alpha_S(n_{frame})$ is a cyclic source frequency offset chosen randomly or pseudorandomly over frame $n_{frame}$. The cyclic source frequency may be communicated to the receiver, or predictable via side information provided at the time of installation of the SM or DAP, providing an additional means for validating the link.

In one embodiment, the source and receive symbol masks each possess a constant modulus, i.e., $|m_{(\cdot)}(n_{sym})| \equiv 1$, to facilitate removal of the symbol mask at the receiver. In addition, except for the complex sinusoidal source symbol mask given in (Eq2), the source and receive symbol masks are preferentially designed to be circularly symmetric, such that the masks have no identifiable conjugate self-coherence features ($\langle m_{(\cdot)}^2(n)e^{-j2\pi\alpha n}\rangle \equiv 0$), where the angled brackets indicate averaging over index n, and cross-scrambling, such that the cross-multiplication of any two symbol masks results in a composite symbol mask that appears to be a zero-mean random sequence to an outside observer.

In one embodiment, the receive symbol mask is a function of both the time frame index $n_{frame}$, and the physical dwell index $k_{dwell}$, is generated using a pseudorandom selection algorithm based on both parameters. In addition, the receive symbol mask can be made unique to each uplink receiver in the network, in which case the receivers can use that mask to identify only those uplink transmitters intending to communicate with that receiver; or it can be made common to every receiver in the network, allowing any receiver to despread any SM in its field of view. The latter property can be especially useful for network access purposes (e.g., using a special receive mask intended just for transmitter association and authentication purposes), and in macrodiverse networks where symbol streams received and/or despread at multiple uplink receivers are further aggregated and processed at higher tiers in the network.

After insertion of the symbol mask (64), and if observed multipath time dispersion encountered by the channel is a substantive fraction of a single symbol period, a cyclic symbol prefix is then inserted (65) into the $M_{sym} \times 1$ masked symbol vector $d_S(n_{frame})$, such that $d_S(n_{frame})$ is replaced by $N_{sym} \times 1$ data vector $$d_S(n_{frame}) \leftarrow [d_S((n_{sym}-K_{sym}) \bmod M_{sym}; n_{frame})]_{n_{sym}=0}^{N_{sym}-1}, \quad (Eq3)$$

where $M_{sym}$, $K_{sym}$ and $N_{sym} = M_{sym} + K_{sym}$ are the number of encoded symbols, cyclic prefix symbols, and full data symbols transmitted over the frame, respectively, and mod indicates modulo. The cyclic symbol prefix protects against multipath dispersion with group delay $T_{group} \leq K_{sym} T_{sym}$ observed at the uplink receiver, where $T_{sym} = 1/f_{sym}$ and $f_{sym}$ are the symbol period and symbol rate for the baseband symbol stream, respectively.

After insertion of the symbol mask (64) and (optional) symbol-level cyclic prefix (65), the full $N_{sym} \times 1$ data vector $d_S(n_{frame})$ is spread by $N_{chp} \times 1$ source spreading code vector $c_S(n_{frame})$, chosen randomly or pseudorandomly over every time frame and not known at the intended receiver. The source spreading code vector also has an optional $K_{chp}$-chip cyclic chip prefix inserted into it (67), such that $c_S(n_{frame})$ is given by $$c_S(n_{frame}) = [c_S((n_{chp}-K_{chp}) \bmod M_{chp}, n_{frame})]_{n_{chp}=0}^{N_{chp}-1}, \quad (Eq4)$$

where $\{c_S(n_{chp}, n_{frame})\}_{n_{chp}=0}^{M_{chp}-1}$ is an $M_{chp}$-chip base code used for frame $n_{frame}$ and $N_{chp} = M_{chp} + K_{chp}$. The cyclic chip prefix protects against multipath time dispersion with group delay $T_{group} \leq K_{chp} T_{chp}$ observed at the uplink receiver, where $T_{chp} = 1/f_{chp}$ and $f_{chp}$ are the chip period and chip rate for the baseband symbol stream, respectively.

Preferentially, if the observed multipath time dispersion is a small fraction of a source symbol period, a cyclic chip prefix is inserted into the spreading code and the cyclic symbol prefix is not implemented ($K_{sym}=0$); or, if the multipath time dispersion is larger than a small fraction of a source symbol period, a cyclic symbol prefix is inserted into the masked data vector and the cyclic chip prefix length is not implemented ($K_{chp}=0$). In one embodiment, and for the long-range M2M network depicted in FIG. 5 and the 902-928 MHz deployment band and time-frequency framing shown in FIG. 6, a nonzero cyclic chip prefix is inserted into the spreading code and the cyclic symbol prefix is disabled. However, addition of both cyclic prefixes is not precluded by the embodiments in the present description and, in one embodiment, may be advantageous in some applications, e.g., mesh networks where transmitters may be communicating to a nearby receiver over one subset of physical dwells in one frame, and to a remote receiver over a second subset of physical dwells in another frame.

In one embodiment, a modulation-on-symbol direct-sequence spread spectrum (MOS-DSSS) method, in which the spreading code is repeated over every baseband symbol within each hop, is used to spread the source symbol vector $d_S(n_{frame})$ using the spreading code $c_S(n_{frame})$. Mathematically, the spreading operation (68) can be expressed as a matrix outer-product operation given by $$S_S(n_{frame}) = c_S(n_{frame}) d_S^T(n_{frame}), \quad (Eq5)$$

in which $c_S(n_{frame})$ and $d_S(n_{frame})$ are the "inner" and "outer" components of the spreading process, respectively, followed by a matrix-to-serial or "matrix flattening" operation (69) to convert the $N_{chp} \times N_{sym}$ data matrix $S_S(n_{frame})$ resulting from this operation to a $(N_{chp} N_{sym})$-chip scalar data stream $s_S(n_{chp})$ (70), in which each column of $s_S(n_{frame})$ is serially converted to a scalar data stream, moving from left to right across the matrix. An alternative, but entirely equivalent, representation can be obtained using the Kronecker product operation $$s_S(n_{frame}) = d_S(n_{frame}) \otimes c_S(n_{frame}), \quad (Eq6)$$

to generate $(N_{chp} N_{sym}) \times 1$ data vector $s_S(n_{frame})$, followed by a conventional $(N_{chp} N_{sym}):1$ parallel-to-serial (P/S) conversion (69) to $s_S(n_{chp})$ (70). The symbol stream may be real or complex, depending on the baseband source stream, and on the specific spreading code and symbol mask employed by the CPDS spreader.

The CPDS downlink spreading operations (21) shown in FIG. 11 are identical to the CPDS uplink spreading operations shown in FIG. 10, except that data are transmitted every slot rather than every frame, and the symbol mask and source spreading code are also generated every slot rather than every frame. In addition, the specific modulation parameters used at the uplink and downlink spreaders are different, based on the group delay and interference density observed by the uplink and downlink receivers. In particular, the uplink receivers are expected to observe a large number of uplink emitters on each time slot and frequency channel, whereas the downlink receivers are expected to observe a small number of downlink emitters—typically one-to-two if source frequencies are not coordinated between those emitters. In addition, in one embodiment the uplink transmitters advance their transmit timing to minimize group delay at the uplink receivers in the network, whereas the downlink transmitters are synchronized to emit over coordinated transmission times to minimize overlap between downlink-to-uplink interference between widely-separated (but still visible) downlink transmitters in the network.

As shown in FIG. 12, the symbol mask is preferentially applied, in one embodiment, directly to the $M_{sym} \times 1$ source symbol vector $b_S$, i.e., in the 'time domain,' (72) if a cyclic symbol prefix is not applied at the transmitter ($K_{sym}=0$), or is applied to the $M_{sym} \times 1$ discrete Fourier transform (DFT) (73) of the source symbol vector $B_S$, i.e., in the 'frequency domain,' (74) if a cyclic symbol prefix is applied at the transmitter ($K_{sym}>0$). In both cases, the mask is applied to the appropriate symbol vector using an element-wise multiply or Schur product operation. If the mask is applied in the frequency domain (74), the resultant masked symbol vector is then converted back to the time domain using an inverse DFT (IDFT) operation (75). The DFT (73) and IDFT (75) operations can be implemented in a number of ways, including fast Fourier transform (FFT) and inverse-FFT (IFFT) methods that minimize complexity of the overall masking operation. In addition, in some applications, the baseband source vector may be generated directly in the frequency domain and the initial DFT operation (73) can be dispensed with, resulting in an effective OFDM modulation after the IDFT and cyclic symbol prefix operations are applied to the masked source vector.

Table 1 lists the exemplary uplink (UL) and downlink (DL) parameter values used for deployment of this structure in the 902-928 MHz ISM band using one embodiment, which are further illustrated in FIG. 13 for the CPDS uplink, and FIG. 14 for the CPDS downlink. These parameters reflect the different transmission characteristics between the uplink and downlink time slots, as well as constraints imposed by transmission within the 902-928 MHz ISM band.

TABLE 1

Exemplary Uplink and Downlink CPDS PHY, Transceiver Parameters

| Parameter | UL Value | DL Value | Comments |
|---|---|---|---|
| PHY symbols/slot ($M_{sym}$) | 480 symbols | 384 symbols | |
| Cyclic symbol prefix length ($K_{sym}$) | 0 symbols | 3 symbols | Symbol-level cyclic prefix |
| Full baseband symbols/slot ($N_{sym}$) | 480 symbols | 387 symbols | |
| PHY baseband symbol rate ($f_{sym}$) | 16 symbol/ms | 40 symbol/ms | Rate over Tx interval |
| Active link duration | 30 ms | 9.675 ms | |
| Guard time, end of link slot | 75 μs | 250 μs | 40 ms hop dwell time |
| Spreading code base length ($M_{chp}$) | 16 chips | 8 chips | |
| Cyclic chip prefix length ($K_{chp}$) | 4 chips | 0 chips | Chip-level cyclic prefix |
| Full spreading code length ($N_{chp}$) | 20 chips | 8 chips | |
| Spread chip rate | 320 chip/ms | 320 chip/ms | ~3.125 μs chip period |
| Composite cyclic prefix duration | 12.5 μs | 75 μs | Max multipath dispersion |
| Equivalent range (4/3 Earth) | 3.75 km | 22.5 km | UL timing advance needed |
| RRC rolloff factor | 25% | 25% | 320 kHz HPBW, 400 kHz full BW |
| Allowed FOA uncertainty | ±50 kHz | ±50 kHz | >50 ppm LO offset, 902-928 MHz band |
| Frequency channel bandwidth | 500 kHz | 500 kHz | Compliant, FCC §15.247, ¶ (a)(1)(ii) |
| Number hop channels | 50 channels | 50 channels | Compliant, FCC §15.247, ¶ (a)(1)(ii) |
| Full hop bandwidth | 25 MHz | 25 MHz | |
| Number transmit hops/node | 1 | 1 | Compliant, FCC §15.247, ¶ (a)(1)(i) |
| Number receive hops/node | 50 hop | ≥1 hop | DAP's receive all UL hops |
| TDD slots per frame | 100 slots | 100 slots | 4 second frame length |
| Slot Tx per node each frame | 1 | 100 | DL Tx every slot |
| Hop rate each slot direction | 0.25 hps | 25 hps | |
| Average time occupancy over 10 s | 6 ms/SM | 0.2 ms/DAP | Compliant, FCC §15.247, ¶ (a)(1)(i) |
| Max Tx conducted power into ANT | 30 dBm (1 W) | 30 dBm (1 W) | Compliant, FCC §15.247, ¶ (b)(2) |
| Number Tx ANT's | 1 ANT | 1 ANT | SISO links assumed |
| Tx ANT max directivity | 6 dBi (4 W EIRP) | 6 dBi (4 W EIRP) | Compliant, FCC §15.247, ¶ (b)(4) |

FIG. 15 shows a CPDS-enabled network element with a real-world, random-number, sourcing-sensor element that provides a truly random kernel input from a sourcing sensor (76) using real-world chance events from which the source spreading code is generated randomly over every transmit opportunity $n_{dwell}$ (every frame on the uplink, and every time slot on the downlink) in a randomizer element and then provided to the CPDS spreader (21). This is one means whereby the embodiments in the present description can provide physical, or 'reality-based' security rather than algorithmic or model-based security to the M2M network, which cannot be predicted by any intruder attempting to intercept and/or spoof transmission in that network. Moreover, because this source spreading code is generated without any provisioning from the network, this network element eliminates transference of network information (e.g., secure keys used to generate unique spreading codes) that can be intercepted, exploited, and subverted by intruder devices; eliminates network downloading required to transport such information; and eliminates need to manage dissemination of that information at higher tiers in the M2M network.

FIG. 16 shows a CPDS-enabled network element with a real-world, random-number, sourcing-sensor element that provides a truly random kernel input from a sourcing sensor (76) using real-world chance events from which the physical dwell index (time slot and frequency channel) is generated randomly over every time frame in a randomizer element and then provided to the CPDS uplink transmitter. This is a second means whereby the embodiments in the present description can provide physical, or 'reality-based' security rather than algorithmic, model-based, or security to the M2M network, which cannot be predicted by any intruder attempting to intercept and/or spoof uplink transmissions in that network. Because the uplink dwell index is generated without any provisioning from the network, this network element again eliminates transference of network information that can be intercepted, exploited, and subverted by intruder devices; eliminates network downloading required to transport such information; and eliminates the need to manage dissemination of that information at higher tiers in the M2M network. Moreover, because the uplink receiver can unambiguously determine the physical dwell employed in each uplink transmission, if the dwell-generating random seed element is combined with elements deterministically tied to the transmitter, e.g., trusted encryption keys known only to the M2M network, this network element can be used to further increase the likelihood of detecting network intruders that lack access to that trusted information.

FIG. 17 shows a CPDS-enabled network element with a real-world, random-number, sourcing-sensor element that provides a truly random kernel input from a sourcing sensor (76) using real-world chance events from which elements of the source symbol mask, e.g., a cyclic source frequency offset, are generated randomly over every time frame in a randomizer element and then provided to the CPDS uplink spreader (21). This is a third means whereby the embodiments in the present description can provide physical, or 'reality-based' security rather than algorithmic or model-based security to the M2M network, which cannot be predicted by any intruder attempting to intercept and/or spoof uplink transmissions in that network. Moreover, because those symbol mask elements are generated without any provisioning from the network, this network element again eliminates transference of network information that can be intercepted, exploited, and subverted by intruder devices; eliminates network downloading required to transport such information; and eliminates need to manage dissemination of that information at higher tiers in the M2M network.

FIG. 18 shows a CPDS-enabled network element with a real-world, random-number, sourcing-sensor element that provides a truly random kernel input from a sourcing sensor (76) using real-world chance events from which the intended uplink receiver is selected randomly from a set of candidate uplink receivers over every time frame in a randomizer element and then provided to the CPDS uplink spreader (21). This is a fourth means whereby the embodiments in the present description can provide physical, or 'reality-based' security rather than algorithmic or model-based security to the M2M network, which cannot be predicted by any intruder attempting to intercept and/or spoof uplink transmissions in that network. In addition, if a unique pseudo-random receive symbol mask is used at each uplink receiver in the network, this provides multiple additional means whereby the embodiments in the present description can provide physical security to the M2M network, by providing an additional unpredictable search dimension to any algorithm an intruder might use to "crack" the pseudorandom receive symbol mask; and, if the receive symbol masks have been compromised, by increasing the number of unpredictable symbol masks that the intruder must employ to intercept any uplink transmission. Lastly, because the network can unambiguously determine the intended receiver (49) in the network, if the receiver-generating random seed element (77) is combined with elements deterministically tied to the transmitter, e.g., trusted encryption keys known only to the M2M network, this network element can be used to further increase the likelihood of detecting network intruders that lack access to that trusted information.

As shown in FIG. 19, at the CPDS uplink receiver used in the long-range M2M network embodiment, the incoming received signal-in-space $\tilde{x}_R(t)$ is coupled into the receiver antenna(e), amplified (90) and down-converted (91) from the analog incoming waveforms, digitized using analog-to-digital conversion (ADC) devices (93), and demultiplexed (DMX'd) (96) into physical dwells, i.e., separated into individual time slots and frequency channels accessible to the receiver, using digital signal processing methods and hardware. These operations result in demultiplexer output signal sequence $\{x_R(n_{smp};n_{frame},k_{dwell})\}_{n_{smp}=0}^{N_{smp}N_{sym}-1}$, where receive spreading factor $N_{smp}$ is the number of time samples per source symbol period at the demultiplexer output sampling rate. Note that this sampling rate can be substantively different than the chip rate employed at the transmitter; for example, if the transmitter chip rate is 320 chips/ms and the demultiplexer output rate is 400 samples/ms, then the source spreading factor employed at the transmitter $N_{chp}=16$, but the receive spreading factor is $N_{smp}=20$. Similarly if the cyclic chip prefix employed at the transmitter is $K_{chp}=4$, encompassing a 12.5 µs time duration, then the cyclic chip prefix covering the same time duration at the receiver is $K_{smp}=5$.

Each demultiplexed physical dwell of interest to the receiver is then passed through an uplink CPDS despreader (97) (shown in FIG. 21), modified with a feedback loop through an adaptation algorithm (98), which detects and estimates the frequency offset observed by the receiving machine (including a cyclic source frequency offset if that is applied at the uplink transmitter(s)) all sources intended for the receiver; despreads and substantively separates those signals from each other, creating symbol streams with relatively high signal-to-interference-and-noise ratio (SINR) relative to the incoming signal streams, except for gain, phase and frequency offset still present on those symbol streams; and substantively excises signals not intended for the receiver. The resultant substantively separated symbol streams are then fed through to a symbol demodulator (99) that substantively removes the residual gain, phase and frequency offset (using frequency offset estimates also provided by the adaptation algorithm), and removes additional environmental delay/degradation effects actually observed by the receiving machine.

As shown in FIG. 20, the reception operations performed at the CPDS downlink receiver in one embodiment are substantively similar to the CPDS uplink reception operations shown in FIG. 19, except that the dwell DMX operation, used at the uplink receiver to detect and despread large numbers of incoming uplink transmissions, is replaced by a frequency-hopping receiver that demodulates the specific narrowband frequency channel containing the downlink transmission of interest to the receiver over at least a subset of time slots, and which is known to the downlink receiver over those time slots. Alternately, depending on time-criticality of information incoming from the downlink transmitter(s), the downlink receiver can randomly 'scan' over each frequency channel, or 'camp' on a particular frequency channel or subset of channels with known favorable path-loss, and simply detect, despread, and demodulate transmissions as they arrive on that channel. This alternate approach is particularly well suited for applications or services where an SM does not require acknowledgement of its transmissions, e.g., data transport under User Datagram Protocol (UDP), and is particularly well enabled by the low level of network provisioning required by the embodiments in the present description.

As shown in FIG. 21, if the symbol mask is applied to the baseband source data in the time domain as shown in the upper mask insertion path in FIG. 12, demultiplexed dwell $k_{dwell}$ is despread over time frame $n_{frame}$ by the sequential steps of:

Organizing the demultiplexer output signal sequence $\{x_R(n_{smp};n_{frame},k_{dwell})\}_{n_{smp}=0}^{N_{smp}N_{sym}-1}$ into $N_{smp} \times N_{sym}$ matrix $X_R(n_{frame},k_{dwell})$ (110), where $N_{sym}$ is the number of transmitted symbols in the dwell, and removing the cyclic chip prefix and (if applied at the transmitter) the cyclic symbol prefix from that matrix (111), given in aggregate by $$X = \begin{pmatrix} x(N_{smp}K_{sym} + K_{smp}) & \cdots & x(N_{smp}(N_{sym}-1) + K_{smp}) \\ \vdots & \ddots & \vdots \\ x(N_{xmp}K_{sym} + N_{smp} - 1) & \cdots & x(N_{smp}(N_{sym}-1) + N_{smp} - 1) \end{pmatrix} \quad (Eq\ 7)$$

for general received data sequence $\{x(n_{smp})\}_{n_{smp}=0}^{N_{smp}N_{sym}-1}$.

Removing the receive symbol mask from $X_R(n_{frame}, k_{dwell})$, using algorithm $$X_R(n_{frame},k_{dwell}) \leftarrow X_R(n_{frame},k_{dwell})\mathrm{diag}\{m_R^*(n_{frame},k_{dwell})\} \quad (Eq\ 8)$$

where $m_R(n_{frame},k_{dwell})$ is the $M_{sym} \times 1$ receive symbol mask vector over dwell $k_{dwell}$ and time frame $n_{frame}$, and where $\mathrm{diag}\{\bullet\}$ is the vector-to-diagonal matrix conversion operation and $(\bullet)^*$ is the complex conjugation operation.

Computing $L_{port} \times M_{sym}$ despread symbol matrix $\hat{D}_R(n_{frame}, k_{dwell})$ (113), using linear signal separation algorithm $$\hat{D}_R(n_{frame}, k_{dwell}) = W_R(n_{frame}, k_{dwell}) X_R(n_{frame}, k_{dwell}), \quad \text{(Eq9)}$$

where $W_R(n_{frame}, k_{dwell})$ is an $L_{port} \times M_{smp}$ linear combining matrix, computed as part of the adaptation procedure shown in FIG. 23.

Converting the despread symbol matrix $\hat{D}_R(n_{frame}, k_{dwell})$ back to a sequence of $L_{port} \times 1$ despread symbol vectors $\{\hat{d}_R(n_{sym}; n_{frame}, k_{dwell})\}_{n_{sym}=0}^{M_{sym}-1}$ by applying an $M_{sym}:1$ parallel-to-serial (P/S) conversion operation to each column of $\hat{D}_R(n_{frame}, k_{dwell})$ (114).

The despreading operations performed in the downlink CPDS despreader (97), shown in FIG. 22, are substantively equivalent to those shown in FIG. 21, except that they are only applied to time slots and frequency channels monitored by the downlink receiver.

As shown in FIG. 23, in one embodiment, each dwell of interest to a receiver is then despread in accordance with the uplink despreader structure shown in FIG. 21 at the uplink receiver, and in accordance with the downlink despreader structure shown in FIG. 22 at the downlink receiver. This comprises the following steps and substeps:

1$^{st}$: Detect all sources intended for the receiver, estimate key parameters of those signals, and develop linear combining weights that can substantively despread the source symbols, by:

1.A computing the QR decomposition (QRD) of the $M_{smp} \times M_{sym}$ received signal $X_R$, resulting after removal of cyclic prefix(es) (111) and the receive symbol mask (112);

1.B generating an SINR/carrier revealing feature spectrum that can (i) estimate the maximum attainable despread signal-to-interference-and-noise ratio ('maximum despreader SINR') of each signal impinging on the receiver that is employing the receive symbol mask ('authorized signals'), given the received spreading code (source spreading code, modulated by the transmission channel) of each signal and interference impinging on the receiver at the dwell and time-frame being monitored by the receiver, (ii) as a function of observed frequency offset of that signal, and (iii) provide statistics that can be used to develop linear combining weights that can substantively achieve that max-SINR, without knowledge of the received spreading code for any of those signals, and without knowledge of the background noise and interference environment;

1.C detecting $L_{port}$ significant peak(s), in the SINR/carrier revealing feature spectrum, and determining the maximum despreader SINR and frequency offset of each peak;

1.D refining strengths (estimated maximum despreader SINR) and locations (estimated frequency offsets) of each significant peak, e.g., using Newton search methods; and 1.E developing $L_{port} \times M_{smp}$ linear combiner weight matrices $W_R$ that can substantively achieve the maximum despreader SINR for each authorized signal, without knowledge of the received spreading code for any of those signals, and without knowledge of the background noise and interference environment.

Then:

2$^{nd}$: Despread and demodulate the detected sources:

2.A Despread detected source symbols—separate authorized signals employing the receive symbol mask, and automatically excise unauthorized signals not employing that mask;

2.B Substantively remove frequency offset from the despread symbols, using the frequency offset estimates;

2.C Estimate and correct phase offsets, and further refine frequency offsets to algorithm ambiguity using known features of the source symbols, e.g., adherence to known symbol constellations, unique words (UW's) and training sequences embedded in the source symbols, known properties of the source symbol mask, etc.;

2.D Remove algorithm ambiguity using additional features of the source symbols, e.g., UW's, forward error correction (FEC), cyclic redundancy check's (CRC's), etc.; and 2.E Decrypt traffic and protected medium access control (MAC) data.

Then:

3rd: Perform ancillary processing as needed/appropriate:

3.A Compute received incident power (RIP) for open-loop power control, using SINR and channel estimates provided by the CPDS despreading algorithm (uplink receiver);

3.B Correlate source internals, externals with trusted information, using dwell, intended receiver and source symbol mask elements provided by the CPDS receiver and despreading algorithm; and 3.C Detect network intrusions—revise symbol masks if needed (downlink receiver);

In one embodiment, specific partially or fully-blind adaptation algorithms can meet the criteria described above include:

The FFT-enabled least-squares (FFT-LS) detection, carrier estimation, and signal extraction algorithm, which can be derived as a maximum-likelihood estimate of carrier frequency for signals with known content but unknown carrier offset which exploits known training signals inserted in the baseband symbol sequence at every source (e.g., in "Unique Word" fields, or more sophisticated embedded pilots) to determine the linear combining weights. FFT-LS is most useful at high symbol rates (>3 bits/symbol), as the high dimensionality of the CPDS linear combiner requires a large set-aside of non-information-bearing symbols for training purposes (e.g., ≥40 UL symbols, e.g., 8% of each slot, for the baseline uplink signal).

The auto-self-coherence-restoral (A-SCORE) algorithm is described in, U.S. Pat. No. 7,079,480 entitled "Enhancing Security and Efficiency of Wireless Communications through Structural Embedding" by the present inventor. A-SCORE exploits nonzero (by design, perfect) temporal correlation induced as part of the embedded invariance algorithm. A-SCORE is most useful at moderate symbol rates (<3 bits/symbol), and over data bursts that are too short to allow set-aside for long training sequences (e.g., greater than 30% of the source symbols at 3 bits/symbol, or greater than 20% of the source symbols at 1 bit/symbol).

The conjugate self-coherence restoral (C-SCORE) algorithm, which exploits nonzero conjugate self-coherence of the baseband symbol sequence, if it exists prior to application of the masking signal, and which estimates the twice-carrier rate of that signal (including any cyclic source frequency offset applied to the source symbol mask). C-SCORE is most useful for symbol streams with perfect conjugate self-coherence, e.g., binary phase-shift keyed (BPSK) and amplitude-shift keyed (ASK) symbol sequences.

All of these algorithms are blind despreading methods that do not require knowledge of the spreading code to adapt the despreader. Moreover, except for incorporation of structure to resolve known ambiguities in the despreader output solutions, C-SCORE and A-SCORE are fully-blind despreading methods that require no knowledge of the source symbol sequence, and use the entire symbol stream to adapt the despreader. All of these methods also asymptotically converge to the max-SINR solution over data bursts with high usable time-bandwidth product ($M_{sym}/M_{smp}$ large, where $M_{sym}$ is the number of symbols used for training purposes). Moreover, all of the receiver adaptation algorithms are assumed to operate on a slot-by-slot basis, such that despreader weights for each slot are computed using only data received within that slot. Lastly, all of these methods yield an SINR-like feature spectrum which can be used to detect and estimate the carrier offset of the symbol sequences to within a Nyquist zone ambiguity, i.e., carrier modulo symbol rate for FFT-LS and A-SCORE, and twice-carrier modulo symbol rate for C-SCORE.

In one embodiment, the baseband source sequence is BPSK and therefore possesses a perfect conjugate self-coherence at its twice-frequency offset. Moreover, if the symbol masks applied at the spreader are circularly symmetric, the received symbol streams have no identifiable conjugate self-coherence prior to the symbol demasking operation. After the demasking operation, the symbols employing that mask, and only the symbols employing that mask, are converted to perfectly conjugate self-coherent signals that provide strong peaks at their twice-carrier frequencies. As a consequence, the despreader is ideally suited for adaptation using a C-SCORE algorithm.

The full C-SCORE method is described as follows:

Compute the Q component $Q_R$ of the QRD of $X_R^T$ (corresponding to the transpose of the matrix X given in Eq. 7) using a modified Gram-Schmidt orthogonalization (MGSO) algorithm;

Compute $\{S_R(\alpha_k)\}$ from $Q_R$ at uniform trial frequencies $\{\alpha_k\}=\{2\pi k/K_{DFT}\}_{k=0}^{K_{DFT}-1}$ using a fast Fourier transform (FFT) algorithm, $$\{(S_R(\alpha_k))_{m,m'}\} = DFT_{K_{FFT}}\{(q_R(n))_m(q_R(n))_{m'}\}, \quad \text{(Eq 10)}$$

$$\begin{cases} m = 1, \ldots, M_{smp} \\ m' = 1, \ldots, m \end{cases}.$$

To facilitate subsequent operations, compute and store the $\frac{1}{2}M_{smp}(M_{smp}+1)M_{sym}$ unique cross-multiplications used in (Eq10) prior to the FFT operation. These cross-multiplications can also be used to compute (Eq10) for other masks.

Initialize $u_1(\alpha_k)=e_{M_{smp}}(M_{smp})$, and estimate $\{\eta_1(\alpha_k), u_1(\alpha_k)\}$ using power method recursion $u_1(\alpha_k) \leftarrow S_R(\alpha_k)u_1(\alpha_k)$ $u_1(\alpha_k) \leftarrow S_R^H(\alpha_k)u_1(\alpha_k)$ $\eta_1(\alpha_k)=\|u_1(\alpha_k)\|_2$ $u_1(\alpha_k) \leftarrow u_1(\alpha_k)/\eta_1(\alpha_k).$ \quad (Eq11)

Select the $L_{port}$ strongest peaks in $\{\eta_1(\alpha_k)\}$, $L_{port}=M_{smp}$.

Estimate the dominant mode $\{\eta_1(\hat{\alpha}), u_1(\hat{\alpha})\}$ of $S(\hat{\alpha})$ at each peak frequency $\hat{\alpha}$, and optimize the frequency location to sub-bin accuracy, using an alternating projections method that alternately optimizes $\{\eta_1(\hat{\alpha}), u_1(\hat{\alpha})\}$ given fixed $\hat{\alpha}$ using (Eq11), and optimizes $\hat{\alpha}$ to maximize $\text{Re}\{u_1^T S_R(\alpha) u_1\}$ given fixed $u_1$ using a Newton recursion. This processing step reuses the cross-multiplication products computed in (Eq10).

Estimate the maximum attainable signal-to-interference-and-noise ratio (SINR) of the despreader at peak $\hat{\alpha}$ using $\hat{\gamma}_{max}(\hat{\alpha})=\eta_1(\hat{\alpha})/(1-\eta_1(\hat{\alpha}))$ and thin the C-SCORE peaks if needed.

Compute the spatially whitened minimum mean-square error (MMSE) weights using the formula $g(\hat{\alpha})=\sqrt{\hat{\gamma}_{max}(\hat{\alpha})(1+\hat{\gamma}_{max}(\hat{\alpha}))}e\hat{\alpha}^{-j1/2\angle u_1^T(\hat{\alpha})S(\hat{\alpha})u_1(\hat{\alpha})}$ $u_R(\hat{\alpha})=g(\hat{\alpha})u_1(\hat{\alpha})$ \quad (Eq12)

Despread the symbol stream using $\hat{d}_R(\hat{\alpha})=Q_R u_R(\hat{\alpha})$, and P/S convert to scalar stream $\hat{d}_R(n_{sym};\hat{\alpha})$.

Remove the carrier offset using $\hat{d}_S(\hat{\alpha})=\Delta(\hat{\alpha})\hat{d}_R(\hat{\alpha})$, where $$\Delta(\hat{\alpha}) = \text{diag}\{e^{-j2\pi\hat{\alpha} n_{sym}}\}_{n_{sym}=0}^{M_{sym}-1}.$$

Use additional source signal structure to resolve the $\pm(\pm 1)^{n_{sym}}$ amplitude ambiguity inherent to the algorithm, e.g., using a Unique Word inserted into the symbol stream, and convert $\hat{\alpha}$ to a true carrier offset (mod the symbol rate).

Optionally refine the carrier, despreading weights, and source symbol stream using decision-direction recursion $\hat{d}_R(\hat{\alpha}) = Q_R u_R(\hat{\alpha})$ \quad (Eq 13)

$\hat{d}_S(\hat{\alpha}) = \text{sgn}\{\text{Re}\{\Delta(\hat{\alpha})\hat{d}_R(\hat{\alpha})\}\},$ $\Delta(\hat{\alpha}) = \text{diag}\{e^{-j2\pi\hat{\alpha} n_{sym}}\}_{n_{sym}=0}^{M_{sym}-1}$ $\hat{\alpha} = \text{argmax}_\alpha \|u_R(\hat{\alpha})\|_2^2,$ $u_R(\hat{\alpha}) = Q_R^H \Delta^*(\hat{\alpha})\hat{d}_S(\hat{\alpha}),$ where the carrier estimate and despreading weights are jointly updated using a Newton recursion.

The C-SCORE algorithm generates a single feature spectrum with multiple peaks at twice the carrier (mod the symbol rate) of every source communicating with the receiver, and with peak strengths consistent with the maximum attainable SINR of the despreader. Random cyclic complex sinusoids are also completely transparent to the C-SCORE algorithm, as the complex sinusoid may simply shift the location of peaks in the feature spectrum. This may improve resistance to collisions, by randomizing the location of all of the peaks in the spectrum. This can also provide additional resistance to spoofing if the cyclic offset used by each source is partially or fully derived from information known only to the source and receiver.

If a cyclic symbol prefix is inserted into the baseband symbol vector at the transmitter, and the operations shown on the lower branch of FIG. 12 are used to insert the symbol mask at the transmitter, then the alternate 'frequency domain' despreading structure shown in FIG. 24 can be employed to despread the received signal dwells. In this despreader, the input signal sequence $\{x_R(n_{smp})\}_{n_{smp}=0}^{N_{smp}N_{sym}}$ is first converted to a $N_{smp}N_{sym} \times 1$ vector using a $1:N_{smp}N_{sym}$ serial-to-parallel converter (115), and the first $K_{sym}$ symbols ($N_{smp}K_{sym}$ samples) encompassing the cyclic symbol prefix are removed (116). The resulting $N_{smp}M_{sym} \times 1$ data vector is then passed through an $N_{smp}M_{sym}$-point DFT (117), reshaped into an $N_{smp} \times M_{sym}$ matrix, and transposed (118) to form $M_{sym} \times N_{smp}$ matrix $X_R = [X_R(:,k_{sym})]_{k_{sym}=0}^{M_{sym}-1}$, where $k_{sym}$ is the index for each column of $X_R$. The receive symbol mask (112) is then removed from $X_R$ using (Eq8), and each column of $X_R$ is despread using linear combining algorithm (119)

$$\hat{D}_R(:,k_{sym}) = W_R(k_{sym})X_R(:,k_{sym}), \quad (Eq14)$$

where $\{W_R(k_{sym})\}_{k_{sym}=0}^{M_{sym}-1}$ are a set of $M_{sym}L_{port} \times M_{smp}$ linear combining matrices, computed as part of an adaptation procedure, and individually applied to each column of $X_R$. Each row of the resultant $L_{port} \times M_{sym}$ despread data matrix $\hat{D}_R$ is then converted back to the time domain using an $M_{sym}$-point inverse DFT (IDFT) operation (120), and converted to a sequence of $L_{port} \times 1$ despread symbol vectors (114) $\{\hat{d}_R(n_{sym})\}_{n_{sym}=0}^{M_{sym}-1}$.

It should be noted that any uplink transmitter employing the same receive symbol mask can use that mask to detect and despread emissions from neighboring uplink transmitters. As a consequence, information sent from these transmitters should possess additional encryption to protect that information from eavesdropping by neighboring network members. This can be accomplished at the physical layer, for example by adding a BPSK source symbol mask to each uplink transmission that still allows uplink despreading using C-SCORE; or by adding stronger encryption at higher layers in the OSI protocol stack; or by a combination of both strategies.

It should also be noted that this capability does not compromise ability for the network to defeat man-in-the-middle attacks, as the transmission parameters of the uplink transmitters cannot be predicted. It does place increased importance on truly random choice of those parameters, as an intelligent adversary could eventually learn the keys underlying pseudorandom choices if weak enough.

In fact, this capability can greatly enhance ability for the network to detect intruders, by allowing SM's to measure and transmit observables of their neighbors to the network DAP's as a normal part of their operation. Any intruder attempting to spoof an SM would be instantly identified by virtue of observables of the correct SM reported to the DAP by its neighbors.

For example, an SM can simply pick an uplink dwell to listen on; intercept and demodulate any SM transmissions during that dwell; break out a MAC header containing information sent some a portion of the message known to contain the SM's Address (which might still be encrypted using keys possessed by only the DAP and SM itself), and send that information along with PHY observables of the intercepted SM, e.g., the dwell index, source frequency offset, intercepted frame index, and intended receive DAP (if non-macrodiverse usage) back to a the network in a later transmission. That information alone should be enough to eventually uncover any radio attempting to spoof transmission.

This capability can also greatly facilitate the implementation of mesh networks to further improve reliability of the network, and reduce energy emitted or dissipated by the uplink transmitters.

One embodiment seamlessly extends to additional transceiver and network improvements, including:

- Use of spatial and polarization diverse antenna arrays at any node in the network. In this case the spreading code can be repeated or randomly extended over each antenna employed at the transmitter, and the dimensionality of the despreading algorithms is simply multiplied by the number antennas employed at the receiver.
- Macrodiverse uplink despreading methods in which part or all of the despreading operations are performed at a higher tier of the network.

Both of the above extensions can be implemented without any substantive change to the transmission and spreading structures described herein, and do not require reciprocity of the uplink and downlink channels or calibration techniques to enforce such reciprocity.

FIG. 25 shows a weakly-macrodiverse uplink despreading method, in which the DAP-specific receive symbol mask is replaced by a common or network-wide receive symbol mask $m_R(n_{frame}, k_{dwell})$, which is used by every SM attempting to transmit over physical dwell $k_{dwell}$ in time frame $n_{frame}$, and which is assumed to evolve in a pseudorandom manner known to the SM over every frame. Thus the method is using any of the set of common receive symbol mask for that set of DAPs and the set of common receive symbol masks for all DAPs in the network; using as the form for each said common receive symbol mask $m_R(n_{frame}, k_{dwell})$; using this form by every SM attempting to transmit over physical dwell $k_{dwell}$ in time frame $n_{frame}$; evolving this form in a pseudorandom manner known to the SM over every frame; and that on receiving and downconverting a symbol stream for any device, uses this form to despread the symbol stream and then passing the symbol stream then on to the respective receiving device.

In more complex systems and other embodiments, this network mask may be broken into geographic-specific zonal masks, in order to differentiate between SM's based on their proximity to different clusters of DAP's. Because the symbol masks do not disrupt the MOS-DSSS structure of the signals, they still allow signals outside that geographical region to be excised by the despreader; however, only the signals within that region may be discovered and extracted by the despreader employed that symbol mask.

The CPDS method is particularly well suited to weakly-macrodiverse combining. The cyclic prefixes provide a high degree of tolerance to timing error between signals received at the DAP's in the network; in fact, it is likely that no timing error may occur at SM's that can most benefit from macrodiverse processing, e.g., SM's that are at nearly-equal range to multiple DAP's, and are therefore received at near-equal RIP at those DAP's. Moreover, because the SM uplink signals are despread at the DAP's, the bulk of operations needed to despread those signals are distributed over the network, with a relatively small number of operations needed at the network level. Lastly, the despreading performed at the DAP's also compress data needed to be transferred to the central site—by a factor of 20 at least in one embodiment, much more if the despread symbols are quantized to low precision before being uploading to the central site.

FIG. 26 shows an even more powerful strongly-macrodiverse extension, in one embodiment, in which the entire $M_{smp} \times M_{sym}$ demasked DAP data matrices $\{X_R(n_{frame}, k_{dwell}; l_R)\}_{l_R=1}^{L_R}$ are uploaded to a central processing site (125). In this system, the data matrices are "stacked" into an $L_R M_{smp} \times M_{sym}$ network data matrix $X_R(n_{frame}, k_{dwell})$ (128) given by $$X_R(n_{frame}, k_{dwell}) = \begin{pmatrix} X_R(n_{frame}, k_{dwell}; 1) \\ \vdots \\ X_R(n_{frame}, k_{dwell}; L_R) \end{pmatrix}, \quad \text{(Eq 15)}$$

The network data matrix is then passed to a network-level despreader (97) that on receiving and downconverting a symbol stream for any device removes the DAP carrier offsets $\{\alpha_R(1_R)\}_{l_R=1}^{L_R}$ (if needed); detects the sources $\{1_S\}_{k'_{dwell}(l_S)=k_{dwell}}$ using that channel; estimates their carrier offsets $\{\alpha_S(1_S)\}_{k'_{dwell}(l_S)=k_{dwell}}$, develops a set of linear combiner weights with $L_R M_{smp}$ degrees of freedom, and uses those combining weights to extract all of those SM's symbol streams from the network data matrix, to be used by the network.

The macrodiverse extensions can improve the security, efficiency, and complexity of M2M networks, by exploiting the additional route diversity of macrocellular and mesh networks. Large scale network analyses have established that weakly-macrodiverse networks can provide as much as 3 dB of link margin in the long-range M2M use scenario shown in FIG. 5, and the strongly-macrodiverse network can provide much as 12 dB of link margin in the same scenario. This link margin can be traded against transmit power, link data rate, or network density to further improve performance or security of the network. Moreover, both approaches provide inherent resistance to denial-of-service attacks, as an attacker would need to simultaneously attack every uplink receiver in the network to prevent reception of information by a macrodiverse network. In addition, migrating the most computationally complex operations to a central processing node can significantly reduce complexity of the uplink receivers in the network.

FIG. 27 shows an FCC § 15.247 compliant time-frequency framing structure for an alternate Frame Synchronous (FS) system embodiment, and for the long-range M2M cell shown in FIG. 5. The FS framing structure is similar to the CPDS framing structure shown in FIG. 6, except in this embodiment the durations of the DL subslots are 9 ms, and the preceding and following guard intervals are each 500 µs. These much higher guard intervals allows the alternate FS network to be used in applications where the SM's and/or DAP's are communicating over much longer ranges or at much higher altitudes, e.g., in airborne or satellite communication networks. In addition, this frame structure provides sufficient guard interval to eliminate the need for SM timing advancement in many applications; or can be used to provide additional security to the network, e.g., by adding pseudorandom jitter to the format.

FIG. 28 shows an uplink transmitter structure employing the alternate FS spreading strategy. The transmitter structure is substantively similar to the CPDS uplink transmitter structure shown in FIG. 7, except that the information intended for transmission is first passed through a baseband modulator (135) that generates a baseband data sequence $d_S(n_{DAC})$ with arbitrary modulation format, and with a sample rate equal to the interpolation rate of the transmitter digital-to-analog convertor(s) (DAC(s)) (23). The baseband data sequence is then separated into segments of data intended for transmission over a single time-frequency dwell within each frame, and passed to a frame synchronous (FS) spreader (136) that spreads it over time within an uplink dwell subslot, resulting in an FS spreader output signal sequence $s_S(n_{DAC})$ that also has a sample rate equal to the interpolation rate of the transmitter DAC (23). The FS spreader output signal is then converted to analog format in the transmitter DAC(s) (23), frequency-shifted (29) to RF transmit frequency $f_S(n_{frame})$ (27), amplified (31) to transmit power level $P_S(n_{frame})$ (30), and transmitted to its intended uplink receiver.

In one embodiment, a possible feature of the FS embodiment is its ability to be used with any baseband modulation format. The exemplary FS system described here uses a spectrally efficient OFDM modulation format with a cyclic prefix allowing much higher tolerance to observed group delay at the uplink receiver.

The algorithm used to compute the time-slot start time $t_S(n_{frame})$ (24), frequency channel center frequency $f_S(n_{frame})$ (27), and transmit power level $P_S(n_{frame})$ (30) in each time frame $n_{frame}$ is computed using the operations shown in FIG. 8, and allows fully randomized selection of transmit dwell, $k_{dwell}(n_{frame})$ and intended uplink receiver $l_R(n_{frame})$. However, the large cyclic prefix can obviate the need for the timing advancement operation shown in that Figure, or can be used to further improve physical security of the network by pseudorandomly adjusting $t_S(n_{frame})$ (24) in each time frame, or by pseudorandomly adjusting the duration of each OFDM cyclic prefix before or during the FS spreading operation.

FIG. 29 shows a downlink transmitter structure employing the alternate FS spreading strategy. The transmitter structure is substantively similar to the CPDS downlink transmitter structure shown in FIG. 9, except that the information intended for transmission is also first passed through a baseband modulator (135) that generates a time-slot of baseband data with arbitrary modulation format and sample rate at the presumed interpolation rate of the transmitter DAC(s) (23), whereby it is further spread in time by the FS spreader (136), resulting in a spreader output signal with the same sampling rate. The FS spreader output signal is then converted to analog format in the transmitter DAC(s) (23), frequency-shifted to RF transmit frequency $f_S(n_{slot})$, amplified (31) to (fixed) transmit power level $P_S(30)$, and transmitted to its intended downlink receiver. The frequency channel $k_{chan}(n_{slot})$ used to set center frequency $f_S(n_{slot})$ (47) in each time slot is pseudorandomly adjusted based on the time slot index $n_{slot}$ and source index $1_S$, and is assumed to be known or detectable to intended downlink receivers in the network.

In the FS uplink spreading structure shown in FIG. 30, the $N_{DAC}$ baseband source samples intended for transmission over time-frame $n_{frame}$ are first passed to a 1:$N_{DAC}$ serial-to-parallel (S/P) convertor (143) to form $N_{DAC} \times 1$ source symbol vector $d_S(n_{frame}) = [d_S(n_{frame} N_{DAC} + n_{DAC})]_{n_{DAC}=0}^{N_{DAC}-1}$. The source symbol vector is then spread over time using an $N_{chp} \times 1$ spreading code vector $c_{RS}(n_{frame})$ that is randomly or pseudorandomly generated in each time frame. Mathematically, the spreading operation (144) can be expressed as a matrix outer-product operation given by $$S_S(n_{frame}) = d_S(n_{frame}) c_{RS}^T(n_{frame}), \quad \text{(Eq16)}$$

in which $d_S(n_{frame})$ and $c_{RS}(n_{frame})$ are the "inner" and "outer" components of the spreading process, respectively, followed by a matrix-to-serial or "matrix flattening" operation (145) to convert the $N_{DAC} \times N_{chp}$ data matrix $S_S(n_{frame})$ resulting from this operation to a $(N_{DAC} N_{chp})$-chip scalar data stream $s_S(n_{DAC})$, in which each column of $S_S(n_{frame})$ is serially converted to a scalar data stream, moving from left to right across the matrix. An alternative, but entirely equivalent, representation can be obtained using the Kronecker product operation $$s_S(n_{frame}) = c_{RS}(n_{frame}) \otimes d_S(n_{frame}), \quad \text{(Eq17)}$$

to generate $(N_{DAC}N_{chp}) \times 1$ data vector $s_S(n_{frame})$, followed by a conventional $(N_{DAC}N_{Chp}):1$ parallel-to-serial (P/S) conversion to $s_S(n_{DAC})$. The symbol stream may be real or complex, depending on the baseband source stream and the specific spreading code used by the FS spreader (136).

Comparing (Eq16)-(Eq17) with (Eq5)-(Eq6), the FS spreading operation is seen to be the reverse or 'dual' of the spreading operation performed in the CPDS spreader. Alternately, the baseband data modulates the code sequence, that is, the baseband data in the FSS airlink takes on the same function as the spreading code in the CPDS airlink, and vice versa.

In the absence of known and exploitable structure of the baseband source vector, the spreading code $c_{RS}(n_{frame})$ is constructed from the element-wise multiplication (142) of an $N_{chp} \times 1$ source spreading code vector $c_S(n_{frame})$ that is unique to the uplink transmitter and randomly varied between time frames, with an $N_{chp} \times 1$ receive spreading vector $c_R(n_{frame}; k_{dwell}(n_{frame}))$ that is randomly varied between time frames and physical dwells. This operation is depicted in FIG. 30 by the Schur product $c_{RS}(n_{frame}) = C_R(n_{frame}, k_{dwell}(n_{frame})) \circ C_S(n_{frame})$.

In other embodiments, in the absence of known and exploitable structure of the baseband source vector, $c_S(n_{frame})$ is further either:
  known to the receiver, e.g., established during initial and/or periodic network provisioning operations; or
  a member of a set of sequences that is known to the receiver, e.g., a Zadoff-Chu code with unknown index and/or offset; or
  unknown to the receiver but estimable as part of the receive adaptation procedure, e.g., a complex sinusoid given by $$c_S(n_{frame}) = [\exp\{j2\pi\alpha_S(n_{frame})n_{chp}\}]_{n_{chp}=0}^{N_{chp}-1}, \quad \text{(Eq18)}$$

where $\alpha_S(n_{frame})$ is a cyclic source frequency offset chosen randomly or pseudorandomly over frame $n_{frame}$.

In the latter case, the cyclic source frequency offset may be communicated to the receiver, or predictable via side information provided at the time of installation of the SM or DAP, providing an additional means for validating the link. Except for the complex sinusoidal frequency offset, the source and receive code spreading vectors are preferentially designed to be circularly symmetric, such that the spreading vectors have no identifiable conjugate self-coherence features $(\langle c_{(\cdot)}^2(n)e^{-j2\pi\alpha n}\rangle \equiv 0)$, and cross-scrambling, such that the cross-multiplication of any two spreading vectors results in a composite spreading vector that appears to be a zero-mean random sequence to an outside observer.

Note that the FS spreader does not insert a 'symbol mask' into the spreader input signal—the source spreading code takes on the same function as the receive symbol mask in the FS format. This source frequency offset can also be generated using the symbol mask randomization network element shown in FIG. 17. As in the CPDS spreader, the random cyclic frequency offset provides additional differentiation between co-channel signals, as well as an additional spoof detection if that offset is known, estimable, communicated to the uplink receiver via other means.

If the baseband source signal contains additional known features, e.g., structural embedding taught in U.S. Pat. No. 7,079,480 or embedded pilot signals taught in U.S. Pat. No. 8,363,744, the entire spreading code vector $c_{RS}(n_{frame})$ can be randomly generated, e.g., using the spreading code randomization network element shown in FIG. 15. This can provide additional differentiation between co-channel signals, as well as an additional spoof detection if that offset is known, estimable, communicated to the uplink receiver via other means.

The FS downlink spreading operations shown in FIG. 31 are identical to the FS uplink spreading operations shown in FIG. 30, except that data are transmitted every slot rather than every frame, and the spreading code is also generated every slot rather than every frame. In addition, the specific spreading parameters used at the uplink and downlink spreaders are different, based on the traffic requirements of the uplink and downlink and the durations of the uplink and downlink slots. The baseband modulation formats can also be different in both link directions, or can be exactly the same in order to reduce complexity of the overall system.

Table 2 lists the exemplary uplink (UL) and downlink (DL) parameter values used for deployment of this structure in the 902-928 MHz ISM band using one embodiment, which are further illustrated in FIG. 32 for the FS uplink and FIG. 33 for the FS downlink. These parameters reflect the constraints imposed by transmission within the 902-928 MHz ISM band.

TABLE 2

Exemplary Uplink and Downlink FS PHY, Transceiver Parameters

| Parameter | UL Value | DL Value | Comments |
| --- | --- | --- | --- |
| Subcarriers/symbol ($N_{sym}$) | 480 symbols | 480 symbols | |
| Subcarrier separation | 800 kHz | 800 kHz | 1.25 ms FFT duration |
| Symbol cyclic prefix | 250 µs | 250 µs | 1.5 ms OFDM symbol |
| Equiv. range (4/3 Earth) | 75 km | 75 km | Timing advance unneeded |
| Spread code length ($N_{chp}$) | 20 chips | 6 chips | Cyclic chip prefix unneeded |
| Active link duration | 30 ms | 9 ms | |
| Baseband symbol rate ($f_{sym}$) | 16 symbol/ms | 53.33 symbol/ms | |
| Guard time, end of link slot | 500 µs | 500 µs | |
| OFDM bandwidth | 384 kHz | 384 kHz | |
| Allowed FOA uncertainty | ±50 kHz | ±50 kHz | >50 ppm LO offset, 902-928 MHz band |
| Hop dwell bandwidth | 500 kHz | 500 kHz | Compliant, FCC §15.247, ¶ (a)(1)(ii) |
| Number hop channels | 50 channels | 50 channels | Compliant, FCC §15.247, ¶ (a)(1)(ii) |
| Full hop bandwidth | 25 MHz | 25 MHz | |
| Number transmit hops/node | 1 hop Tx/SM | 1 hop Tx/DAP | Compliant, FCC §15.247, ¶ (a)(1)(i) |
| Number receive hops/node | 50 hop Rx/DAP | ≥1 hop Rx/SM | DAP's can receive all UL's |

TABLE 2-continued

Exemplary Uplink and Downlink FS PHY, Transceiver Parameters

| Parameter | UL Value | DL Value | Comments |
|---|---|---|---|
| TDD slots per frame | 100 slots | 100 slots | 4 second frame length |
| Slot Tx/node each frame | 1 | 100 | DAP Tx every slot, SM Tx once per frame |
| Hop rate each slot direction | 0.25 hps | 25 hps | |
| Average time occupancy over 10 s | 6 ms/SM | 0.2 ms/DAP | Compliant, FCC §15.247, ¶ (a)(1)(i) |
| Max Tx conducted power into ANT | 30 dBm (1 W) | 30 dBm (1 W) | Compliant, FCC §15.247, ¶ (b)(2) |
| Number Tx ANT's | 1 ANT | 1 ANT | SISO links assumed |
| Tx ANT max directivity | 6 dBi (4 W EIRP) | 6 dBi (4 W EIRP) | Compliant, FCC §15.247, ¶ (b)(4) |

The parameters shown in Table 2 are similar in many respects to those shown in Table 1 for the CPDS spreader, but also possess important differences. In particular, the exemplary FS spreader employs an OFDM baseband modulation format with the same number of subcarriers, cyclic prefix, subcarrier frequency spacing, and baseband information rate on each side of the link, and the exemplary FS spreader does not require timing advancement at the uplink transmitters. This can reduce the complexity of the FS transceivers, as the substantively similar processing hardware and software can be used to implement the FS transmitter and receiver at both ends of the link, and allows the FS transceivers to be used in networks with extreme long range, e.g., airborne and satellite communication networks.

The FS uplink receiver shown in FIG. 34 is substantively similar to the CPDS uplink receiver shown in FIG. 19, except that each received dwell is despread in an FS despreader (147) rather than a CPDS despreader (97), resulting in $L_{port} \times 1$ vector FS despreader output signal sequences $\{y_R(n_{smp};n_{frame},k_{dwell})\}_{n_{smp}=0}^{N_{smp}-1}$, comprising the $L_{port}$ signals that are intended for the uplink receiver over dwell $k_{dwell}$ and time frame $n_{frame}$, and that have been substantively extracted from received environment by the FS despreader (147); and except for the baseband demodulator (148) that demodulates the resultant substantively extracted baseband signals provided by the despreader (147). The baseband source signals transmitted from the uplink transmitters must contain sufficient information to remove any ambiguities remaining in the despreader output signals.

Similarly, in another embodiment, the FS downlink receiver shown in FIG. 35 is substantively similar to the CPDS downlink receiver shown in FIG. 20, except that each received dwell is despread in an FS despreader (147) rather than a CPDS despreader (97), resulting in $1 \times L_{port}$ vector FS despreader output signal sequences $\{y_R(n_{smp};n_{slot})\}_{n_{smp}=0}^{N_{smp}-1}$, comprising the $L_{port}$ signals that are intended for the downlink receiver over time slot $n_{slot}$, and that have been substantively extracted from received environment by the FS despreader (147); and except for the baseband demodulator (148) that demodulates the resultant substantively extracted baseband signals provided by the despreader (147). The baseband source signals transmitted from the uplink transmitters must contain sufficient information to remove any ambiguities remaining in the despreader output signals.

As shown in FIG. 36, at the uplink despreader, dwell $k_{dwell}$ is despread over time frame $n_{frame}$ by the sequential steps of:

Organizing the demultiplexer output signal sequence $\{x_R(n_{smp};n_{frame},k_{dwell})\}_{n_{smp}=0}^{N_{smp}N_{chp}-1}$ into $N_{smp} \times N_{chp}$ matrix $X_R(n_{frame},k_{dwell})$, where $N_{smp}$ is the number of received baseband samples per chip in the dwell at the demultiplexer output sampling rate (154), given by $$X = \begin{pmatrix} x(0) & \cdots & x(N_{smp}(N_{chp}-1)) \\ \vdots & \ddots & \vdots \\ x(N_{smp}-1) & \cdots & x(N_{smp}(N_{chp}-1)+N_{smp}-1) \end{pmatrix} \quad (Eq\ 19)$$

for general received data sequence $\{x(n_{smp})\}_{n_{smp}=0}^{N_{smp}N_{chp}-1}$.

Removing the receive spreading code (155) from $X_R(n_{frame},k_{dwell})$, using algorithm $$X_R(n_{frame},k_{frame}) \leftarrow X_R(n_{frame},k_{frame})\text{diag}\{c_R^*(n_{frame},k_{frame})\} \quad (Eq\ 20)$$

where $c_R(n_{frame},k_{dwell})$ is the $N_{chp} \times 1$ receive spreading code vector over dwell $k_{dwell}$ and time frame $n_{frame}$, and where diag$\{\bullet\}$ is the vector-to-diagonal matrix conversion operation and $(\bullet)^*$ is the complex conjugation operation.

Compute $N_{smp} \times L_{port}$ despread baseband signal matrix $Y_R(n_{frame},k_{dwell})$, using linear signal separation algorithm $$Y_R(n_{frame},k_{dwell})=X_R(n_{frame},k_{frame})W_R(n_{frame},k_{dwell}), \quad (Eq\ 21)$$

where $W_R(n_{frame},k_{dwell})$ is an $N_{chp} \times L_{port}$ linear combining matrix.

Convert the despread baseband signal matrix $Y_R(n_{frame},k_{dwell})$ back to a sequence of $1 \times L_{port}$ despread baseband signal vectors $\{y_R(n_{smp};n_{frame},k_{dwell})\}_{n_{smp}=0}^{N_{smp}-1}$ by applying an $N_{smp}$:1 parallel-to-series (P/S) conversion operation (157) to each row of $Y_R(n_{frame},k_{dwell})$.

In one embodiment, the despreading operations performed in the downlink FS despreader, shown in FIG. 37, are substantively equivalent to those shown in FIG. 36, except that they are only applied to time slots and frequency channels monitored by the downlink receiver.

If the baseband signal sequence possesses structure that can be exploited in an adaptation algorithm, then the CPDS adaptation procedure shown in FIG. 23 can be used to directly compute the linear combining matrix $W_R(n_{frame},k_{dwell})$. For the exemplary FS transceiver and network parameters described in Table 2, the baseband cyclic prefix introduces self-coherence that can be exploited using the auto-self-coherence (auto-SCORE) algorithm described in U.S. Pat. No. 7,079,480 entitled "Enhancing Security and Efficiency of Wireless Communications through Structural Embedding," by the present inventor.

If the spreading code is known except for an unknown frequency offset, then unstructured parameter estimation techniques that are well-known in the art, such as Multiple Signal Classification (MUSIC), can be used to detect and determine the frequency offset of every signal using the known receive spreading code, and equally well-known methods such as linearly-constrained power minimization (LCPM) can be used to develop linear combiner weights that can extract those signals from the received environment.

If the spreading code length $N_{chp}$ is much larger than the number of signals impinging on the receiver, e.g., at the downlink receiver in the exemplary environment, or in extreme long-range communication scenarios where the spreading gain of the modulation format is being used to raise the signal-to-noise ratio (SNR) of the signal above a thermal noise floor, then alternative methods that exploit the duality of the FS and MOS-DSSS spreading methods can be used to jointly detect and estimate signals using the known receive spreading code using an FFT-LS algorithm applied over a subset of the baseband signal samples. In this case, the receive spreading gain is treated as the signal, and the baseband signal samples are treated as the spreading code for purposes of signal detection and frequency offset estimation. Once this step has been accomplished, then the true linear combiner weights $W_R(n_{frame}, k_{dwell})$ can be constructed using an LCPM algorithm for each of the detected signals.

The extension of alternate FS spreading methods to transceivers employing polarization/spatial diverse multi-element antenna arrays, and to macrodiverse reception methods, is straightforward. The FS method should be especially well suited to strongly-macrodiverse networks, as the LCPM algorithm is not dependent on the time-bandwidth product of the baseband.

In yet a further embodiment, the network selects a particular implementation based on its strategic value, which is strongly influenced by the desired tradeoff between Grade of Service ('GoS') and the required Codec SINR (signal-to-interference-and-noise ratio). If the network is using a fully-blind, least-squares despreader, then between 10.5 dB and 15 dB required SINR, the performance change shifts; below that noise level the GoS rises as the number of hop channels decrease, so the best strategy is to minimize hops, which means spreading has a strong benefit. However, around 12-13 dB required SINR a 'crossover' effect is experienced, after which the GoS drops as the number of hop channels decrease, so the best strategy then becomes to maximize hops, which means there is no experienced benefit without scheduling. (This may be changed if the signalers are not experiencing the 1 bit/symbol Shannon limit of transmission capacity.) If, however, the network is using a Matched-Filter despreader ('MF'), the changeover point is significantly different; it occurs nearly at 0 dB require SINR. Under these conditions an 8.6 dB Forward Error Correction ('FEC') coding gain (0.5 dB codec input SINR) is required before any 'ad hoc' MF spreading provides a benefit; while above this, there is no benefit to any MF spreading without FEC (so again, scheduling is required). An FEC can be part of an error detection/correction decoder for a coded communication system in which information bits are "encoded" with redundant parity bits at the transmitter, which are then used to detect and (more typically) correct for errors in the received bits or signal.

In one embodiment, the present description assumes the "code generation" process is the result of the hardware on which the method is effected performing operations outside the scope of the invention, in order to add bits to the input information stream that can be used to detect packet errors, and to correct for such errors if possible in the Symbol demodulator, which is also outside scope of the invention. The invention does not necessarily enhance this process beyond the means for doing so which are obvious extensions of the approach to those experienced and skilled in the field(s) of this invention, but can allow such enhancements to be added or incorporated.

In another embodiment, one possible feature of the present description is that it provides a useable base on which further enhancements can be more effectively deployed. One such specific further enhancement is the use of macrodiverse solutions, particularly for the CPDS; and a further sub-enhancement of that therein is a weakly macrodiverse solution where the SM can be demodulated at any DAP to provide later signal improvement.

Additionally, in one embodiment, another possible feature of the present description is that its use of a blind despreading algorithm renders the network's communications interference-excising, creates far greater tolerance, and operates in conditions of greater variability of transmit power ranges. Additionally, because the transmissions are 'open loop' (no requirement for a return 'ack' or handshake) both power management and signal feedback overheads are greatly simplified or reduced.

Still yet, in another embodiment, one possible feature of the present description is that its flexible incorporation of CPDS cyclic prefixes at the symbol and chip level, and its instantiation over discrete time-frequency dwells, either with fixed time framing, or with ad hoc time slotting, allow it to be deployed over a wide range of frequency bands, and over a wider range of network topologies, transmission ranges, and use scenarios. While the parameters given in Table 1 for one embodiment have been chosen to provide full compliance with FCC § 15.247 requirements for intentional radiators in that band, and for point-to-multipoint cellular network topologies, long-range transmissions, and Smart Grid use scenarios, it should be recognized that the embodiments in the present description can be applied to:

other frequency bands, including ISM bands currently used for 802.11 wireless local area networks (WLAN's), 802.15 wireless personal area networks (WPAN's), or cellular telephony networks, or very low frequency bands used for near-field communications (NFC);

White Spaces deployments where frequency channels are dynamically and potentially noncontiguously allocated based on spectrum availability in different geographical areas;

other network topologies, including ad hoc point-to-point topologies, and mesh network topologies;

other transmission ranges, including extremely short ranges consistent with WPAN's and NFC links;

other M2M use scenarios, including RFID, short-range medical networks, embedded automotive networks, point-of-sale financial transaction networks, and so on; and heterogeneous cognitive networks where the modulation format is software defined and reformatted on a dynamic basis for different topologies and use scenarios;

In one embodiment, the alternate frame synchronous embodiment further enhances flexibility of the embodiments in the present description, by allowing the invention to be applied over extreme long ranges, e.g., consistent with airborne and satellite communication networks, and by allowing the invention to be used with, or overlaid on top of, transceivers employing arbitrary baseband modulation formats, e.g., LTE communication networks.

In another embodiment of this invention, a further possible feature of the embodiments in the present description is that networks may be formed comprising devices capable of playing different roles, so any device may be serving as at least one Signaling Machine ('SM') and any other device may be serving (at the same time) as one Data Aggregation Point ('DAP'). This is possible with each device comprising at least one antenna and one transceiver for exchanging wireless transmissions. In this embodiment the method will be comprising: incorporating into each transmission at each transceiver a Cyclic-Prefix Direct-Sequence ('CPDS') differentiator for that transmission, with time-channelized despreading at the receiver; fitting each transmission into a series of frames of Upload Transmissions ('UpLink') and Download Transmissions ('DownLink'); transmitting from any device on any UpLink; and, transmitting from any device on any DownLink.

Any specific subset of the method may be effected through any combination of hardware and software elements. Hardware elements already well-known and standard to the state of the are include a wide range of Central Processing Units (CPUs), Linear Processing Units (LPUs), Vector Processing Units (VPUs), and Signal Processing Units (SPUs), which in turn may comprise single, dual, quad, or higher combinations of lesser such elements. Hardware elements also include both programmable and re-programmable floating-point gate arrays (FPGAs), application-specific integrated circuits (ASICs), programmable read-only memory (PROM) units, erasable-and-programmable read-only memory (EPROM) units, and electronically erasable-and-programmable read-only memory (EEPROM) units. The conversion between digital and analog, and analog and digital, representations may be through DAC/ADC chips, circuitry, or other transformational means incorporating both hardware (transceivers, processors) and software elements. Accordingly all elements disclosed in the present description must be understood as being capable of being effected in a hardware-only, physically transforming device. However, as no human has either a radio (or other electromagnetic) transceiver capabilities, or the capabilities of any of the speed, precision and capacity of perception, comprehension, memorization, and continuing real-time transformation of such signals as required to effect embodiments in the present description, even though some elements may be incorporated in software, and the method as a whole can be abstractly comprehended by an individual human being, the method cannot be effected by any human being without direct, physical, and continuing assistance by an external device. Therefore the present description incorporates all existing and yet-to-be-devised hardware elements which instantiate and process the digital signals using the method herein, known to the present state of the art or effected as functional equivalents to the methods and techniques disclosed herein.

Some of the above-described functions may be composed of instructions, or depend upon and use data, that are stored on storage media (e.g., computer-readable medium). The instructions and/or data may be retrieved and executed by the processor. Some examples of storage media are memory devices, tapes, disks, and the like. The instructions are operational when executed by the processor to direct the processor to operate in accord with the embodiments in the present description; and the data is used when it forms part of any instruction or result therefrom.

The terms "computer-readable storage medium" and "computer-readable storage media" as used herein refer to any medium or media that participate in providing instructions to a CPU for execution. Such media can take many forms, including, but not limited to, non-volatile (also known as 'static' or 'long-term') media, volatile media and transmission media. Non-volatile media include, for example, one or more optical or magnetic disks, such as a fixed disk, or a hard drive. Volatile media include dynamic memory, such as system RAM or transmission or bus 'buffers'. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes.

Memory, as used herein when referencing to computers, is the functional hardware that for the period of use retains a specific structure which can be and is used by the computer to represent the coding, whether data or instruction, which the computer uses to perform its function. Memory thus can be volatile or static, and be any of a RAM, a PROM, an EPROM, an EEPROM, a FLASHEPROM, any other memory chip or cartridge, a carrier wave, or any other medium from which a computer can read data, instructions, or both.

I/O, or 'input/output', is any means whereby the computer can exchange information with the world external to the computer. This can include a wired, wireless, acoustic, infrared, or other communications link (including specifically voice or data telephony); a keyboard, tablet, camera, video input, audio input, pen, or other sensor; and a display (2D or 3D, plasma, LED, CRT, tactile, or audio). That which allows another device, or a human, to interact with and exchange data with, or control and command, a computer, is an I/O device, without which any computer (or human) is essentially in a solipsistic state.

The above description of the invention is illustrative and not restrictive. Many variations of the disclosed embodiments may become apparent to those of skill in the art upon review of this disclosure. The scope of the embodiments of the present description should, therefore, be determined not with reference to the above description, but instead should be determined with reference to the appended claims along with their full scope of equivalents.

While the present description has been described chiefly in connection with one embodiment, these descriptions are not intended to limit the scope of any of the embodiments to the particular forms (whether elements of any device or architecture, or steps of any method) set forth herein. It will be further understood that the elements or methods of the disclosed embodiments are not necessarily limited to the discrete elements or steps, or the precise connectivity of the elements or order of the steps described, particularly where elements or steps which are part of the prior art are not referenced (and are not claimed). To the contrary, the present descriptions are intended to cover such alternatives, modifications, and equivalents as may be included within the spirit and scope of the embodiments in the present description as defined by the appended claims and otherwise appreciated by one of ordinary skill in the art.

What is claimed is:

1. A method of data transmission, comprising:
  establishing a physical dwell structure, comprising a plurality of time slots and at least one frequency channel; and
  a data transmitter, in the course of transmitting data, varying data transmission properties in a manner known only to that data transmitter, comprising varying a spreading vector and at least one of the following data transmission properties: physical dwell, symbol mask and intended receiver;

wherein unpredictability of the data transmission properties provides for at least one of: security of the data; operation without scheduling of intercommunications; elimination of feedback paths; and operation without collision avoidance methods.

2. The method of claim 1, wherein the spreading vector is a random spreading vector derived from a physical phenomenon.

3. The method of claim 1, wherein the spreading vector is a pseudo-random spreading vector.

4. The method of claim 1, wherein at least one of the data transmission properties is varied in a manner unknown to the receiver.

5. The method of claim 1, wherein at least one of the data transmission properties is varied in a random manner.

6. The method of claim 1, wherein at least one of the data transmission properties is varied by selecting from a finite set of values a value for the at least one of the data transmission properties.

7. The method of claim 1, wherein the symbol mask is an unpredictable source symbol mask.

8. The method of claim 7, wherein the source symbol mask is a cyclic-shift, Zadoff-Chu code.

9. The method of claim 1, wherein the symbol mask is a receive symbol mask that is known to the intended receiver.

10. The method of claim 9, in which the receive symbol mask is unpredictably varied, thereby providing unpredictable variation of the intended receiver.

11. The method of claim 1, wherein the symbol mask is applied in the time domain.

12. The method of claim 1, wherein the symbol mask is applied in the frequency domain.

13. The method of claim 1, comprising varying physical dwell by varying a time slot.

14. The method of claim 1, comprising varying physical dwell by varying a frequency channel.

15. The method of claim 1, comprising establishing a framing structure in addition to the time slot and channel structure.

16. The method of claim 1 comprising varying the symbol mask, wherein the symbol mask is separated into an unpredictable source symbol mask and a receive symbol mask that is known to the intended receiver.

17. A method of data transmission, comprising:
establishing a physical dwell structure, comprising a plurality of time slots and at least one frequency channel;

obtaining transmit data by repeating a plurality of times data of a data burst; and a data transmitter, in the course of transmitting the transmit data, varying data transmission properties in a manner known only to that data transmitter, comprising varying a spreading vector and at least one of the following data transmission properties: physical dwell, symbol mask and intended receiver;

wherein unpredictability of the data transmission properties provides for at least one of: security of the data; operation without scheduling of intercommunications; elimination of feedback paths; and operation without collision avoidance methods.

18. The method of claim 17 comprising varying the spreading vector, wherein the spreading vector is separated into an unpredictable source spreading vector and a receive spreading vector that is known to the intended receiver.

19. The method of claim 17, comprising unpredictably varying the receive symbol mask, thereby providing unpredictable variation of the intended receiver.

20. The method of claim 17, wherein the data burst includes a cyclic prefix.

* * * * *